United States Patent
Smith

(10) Patent No.: US 10,345,078 B2
(45) Date of Patent: *Jul. 9, 2019

(54) METHOD AND SYSTEM FOR USING ENHANCED LOCATION-BASED INFORMATION TO GUIDE MUNITIONS

(71) Applicant: Rivada Research, LLC, Colorado Springs, CO (US)

(72) Inventor: Clint Smith, Warwick, NY (US)

(73) Assignee: Rivada Research, LLC, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/591,811

(22) Filed: May 10, 2017

(65) Prior Publication Data

US 2017/0328683 A1 Nov. 16, 2017

Related U.S. Application Data

(60) Provisional application No. 62/334,688, filed on May 11, 2016.

(51) Int. Cl.
   *F41G 3/02* (2006.01)
   *F41G 3/04* (2006.01)
   (Continued)

(52) U.S. Cl.
   CPC ............. *F41G 7/2233* (2013.01); *F41G 3/02* (2013.01); *F41G 3/04* (2013.01); *F41G 7/2206* (2013.01);
   (Continued)

(58) Field of Classification Search
   CPC ........ F41G 7/2233; F41G 3/02; G01S 5/0289; G01S 5/0072; G05D 1/12; G05D 1/107
   See application file for complete search history.

(56) References Cited

U.S. PATENT DOCUMENTS

| 5,855,339 A | 1/1999 | Mead et al. |
| 6,990,351 B2 | 1/2006 | Tsunehara et al. |
| (Continued) | | |

FOREIGN PATENT DOCUMENTS

| CN | 1688892 A | 10/2005 |
| CN | 101305567 A | 11/2008 |
| (Continued) | | |

OTHER PUBLICATIONS

International Search Report and Written Opinion received in connection with international application No. PCT/US2017/032094; dated Feb. 9, 2018.
(Continued)

*Primary Examiner* — Michael D Lang
(74) *Attorney, Agent, or Firm* — The Marbury Law Group, PLLC

(57) ABSTRACT

An ordnance munition is included in an intelligent ordnance projectile delivery system and equipped with targeting and guidance systems that allow the ordnance munition to collaborate with other devices to intelligently select targets and/or to guide the ordnance munition to its selected target. The ordnance munition may be configured to generate first location information based on its determined approximate location, send the generated first location information to a wireless transceiver in proximity to the first ordnance munition, and receive location information from the wireless transceiver in response. The ordnance munition may determine its more precise location based on the received location information, and generating second location information based on the more precise location. The ordnance munition may change or adjust its flight path or trajectory based on the generated second location information.

27 Claims, 41 Drawing Sheets

(51) Int. Cl.

| | | |
|---|---|---|
| *F41G 7/22* | (2006.01) | |
| *F41G 7/30* | (2006.01) | |
| *F41G 7/34* | (2006.01) | |
| *F41G 7/36* | (2006.01) | |
| *G01S 5/00* | (2006.01) | |
| *G01S 5/02* | (2010.01) | |
| *G05D 1/10* | (2006.01) | |
| *G05D 1/12* | (2006.01) | |
| *G01S 11/02* | (2010.01) | |

(52) U.S. Cl.
CPC ........... *F41G 7/2286* (2013.01); *F41G 7/308* (2013.01); *F41G 7/346* (2013.01); *F41G 7/36* (2013.01); *G01S 5/0072* (2013.01); *G01S 5/0263* (2013.01); *G01S 5/0289* (2013.01); *G01S 11/026* (2013.01); *G05D 1/104* (2013.01); *G05D 1/107* (2013.01); *G05D 1/12* (2013.01)

(56) References Cited

U.S. PATENT DOCUMENTS

| | | |
|---|---|---|
| 7,764,231 B1 | 7/2010 | Karr et al. |
| 7,769,395 B2 | 8/2010 | Fiatal et al. |
| 7,953,524 B1 | 5/2011 | Roggendorf |
| 8,200,251 B2 | 6/2012 | Huang |
| 8,306,552 B2 | 11/2012 | Sridhara et al. |
| 8,359,643 B2 | 1/2013 | Low et al. |
| 8,433,334 B2 | 4/2013 | Huang et al. |
| 9,161,175 B1 | 10/2015 | Smith |
| 9,374,799 B2 | 6/2016 | Batada et al. |
| 9,485,623 B2 | 11/2016 | Smith et al. |
| 2002/0005804 A1 | 1/2002 | Suprunov |
| 2004/0233097 A1 | 11/2004 | McKendree et al. |
| 2007/0232319 A1 | 10/2007 | Bells et al. |
| 2007/0239348 A1 | 10/2007 | Cheung |
| 2007/0275730 A1 | 11/2007 | Bienas et al. |
| 2009/0047973 A1 | 2/2009 | Macnaughtan et al. |
| 2009/0073045 A1 | 3/2009 | Supino et al. |
| 2009/0079622 A1 | 3/2009 | Seshardi et al. |
| 2009/0149202 A1 | 6/2009 | Hill et al. |
| 2009/0173820 A1 | 7/2009 | Bock |
| 2010/0062792 A1 | 3/2010 | Han et al. |
| 2010/0291973 A1 | 11/2010 | Nakahara |
| 2010/0318322 A1 | 12/2010 | Brauer et al. |
| 2011/0009130 A1 | 4/2011 | Wu |
| 2011/0117934 A1 | 5/2011 | Mate |
| 2011/0124347 A1 | 5/2011 | Chen et al. |
| 2011/0151892 A1 | 6/2011 | Vengroff et al. |
| 2011/0171973 A1 | 7/2011 | Beck et al. |
| 2011/0227788 A1 | 9/2011 | Lundgrean et al. |
| 2011/0276556 A1 | 11/2011 | Meier et al. |
| 2012/0129545 A1 | 5/2012 | Hodis |
| 2012/0286997 A1 | 11/2012 | Lin et al. |
| 2013/0030931 A1 | 1/2013 | Moshfeghi |
| 2014/0273920 A1 | 9/2014 | Smith |
| 2014/0334463 A1 | 11/2014 | Lipman et al. |
| 2015/0350836 A1 | 12/2015 | Smith |

FOREIGN PATENT DOCUMENTS

| | | |
|---|---|---|
| CN | 101720058 A | 6/2010 |
| JP | 2005-331423 A | 12/2005 |
| JP | 2010-69910 A | 4/2010 |
| WO | 2004008171 A1 | 1/2004 |
| WO | 2011/037214 A1 | 3/2011 |

OTHER PUBLICATIONS

First Office Action issued by State Intellectual Property Office for Chinese Application No. 201280050710.4 dated Oct. 31, 0214.

Mexican Office Action issued by the Mexican Patent Office for Mexican Application No. MX/a/2014/001745 dated May 19, 2015.

Japanese Office Action issued by the Japanese Patent Office for Japanese Application No. 2014-526179 dated May 12, 2015.

Russian Office Action issued by the Russian Patent Office for Russian Application No. 20140942/01(014916) dated May 16, 2015.

Chinese Office Action issued by the Chinese Patent Office for Chinese Application No. 201280050710.14 dated Mar. 20, 2015.

Communication Pursuant to Rules 70(2) and 70a(2) EPC issued by the European Patent Office for European Application No. 12824068.6 dated Mar. 5, 2015.

Extended European Search Report issued by the European Patent Office for European Application No. 12824068.6-1812 dated Feb. 16, 2015.

Zyren, "Overview of the 3GPP Long Term Evolution Physical Layer", Freescale Semiconductor, 3GPPEVOLUTIONWPP, pp. 1-27, Jul. 2007.

Keithley, "OFDM.MIMO Master Class Understanding the Physical Layer Principles of WPLAN, WiMAX and LTE", www.keithley.com, pp. 1-119, 2004.

Xiong, et al. "SecureAngle: Improving Wireless Security Using Angle-of-Arrival Information", Hotnets, pp. 1-6, Oct. 20-21, 2010.

3GPP, "3rd Generation Partnership Project: Technical Specification Group Radio Access Network; Evolved Universal Terrestrial Radio Access Network (E-UTRAN); Stage 2 functional specification of User Equipment (US) positioning in E-UTRAN (Release 9)", 3GPP TS 36.305, V9.3.0, pp. 1-52, Jun. 2010.

"Comments of Motorola Mobility, Inc and Motorola Solutions, Inc," before the Federal Communications Commission, Washington, D.C. 20554, Matter of Wireless E911 Location Accuracy Requirements (PS Docket No. 07-114) vs E911 Requirements for IP-Enabled Service Providers (WC Docket No. 05-196), pp. 1-20, Jan. 19, 2011.

3GPP, "3rd Generation Partnership Project; Technical Specification Group Core Network; Universal Geographical Area Description (GAD), (Release 1999)", 3G TS 23.032, V3.1.0, pp. 1-29, Mar. 2000.

3GPP, "LTE Evolved Universal Terrestrial Radio Access (E-UTRA); Physical Layer Procedures (3GPP TS 36.213 version 10.1.0 Release 10)", ETSI TS 136 213 V10.1.0 pp. 1-117, Apr. 2011.

3GPP, "LTE Evolved Universal Terrestrial Radio Access (E-UTRA); LTE Positioning Protocol (LPP) (3gpp is 36.355 Version 10.1.0 Release 10)", ETSI TS 136 355, V10.0.0 pp. 1-115, Jan. 2011.

3GPP, LTE; NAS Signaling for Control Plane LCS in Evolved Packet System (EPS), (3GPP TS 24.141 version 9.0.0 Release 9) ETSI TS 124 171, v9.0.0, pp. 1-19, Apr. 2010.

International Preliminary Report on Patentability received in connection with international application No. PCT/US2017/032094; dated Nov. 22, 2018.

METHOD AND SYSTEM FOR USING ENHANCED LOCATION-BASED INFORMATION TO GUIDE MUNITIONS

RELATED APPLICATIONS

This application claims the benefit of priority to U.S. Provisional Application No. 62/334,688, entitled "Method and System for Using Enhanced Location-Based Information to Guide Munitions" filed May 11, 2016, the entire contents of which are hereby incorporated by reference. This application is also related to U.S. Pat. No. 9,485,623, entitled "Method and System for Providing Enhanced Location Based Trilateration" issued on Nov. 1, 2016, the entire contents of which are hereby incorporated by reference for all purposes.

BACKGROUND

Over the past several years, enemy combatants have become more effective at weaponizing civilians, utilizing civilian shields, and exploiting incidences of collateral damage for propaganda. As a result, militaries and governments are increasingly willing to purchase and use complex (and exceedingly expensive) guidance systems that are capable of neutralizing specific and well-defined targets without causing significant collateral damage. Accordingly, new and improved navigation and guidance solutions that allow for more precise control and delivery will be beneficial to civilians, militaries, governments, and other consumers of ordnances, munitions, projectiles, and aerial vehicles.

SUMMARY

The various aspects include methods of guiding a first ordnance munition, which may include determining, via a processor of the first ordnance munition, an approximate location of the first ordnance munition and generating first location information based on the determined approximate location, sending the generated first location information to a wireless transceiver in proximity to the first ordnance munition, receiving, in the first ordnance munition, location information from the wireless transceiver, determining, via the processor of the first ordnance munition, a more precise location of the first ordnance munition based on the location information received from the wireless transceiver and generating second location information based on the determined more precise location, and altering a flight path of the first ordnance munition based on the generated second location information. In an aspect, the method may include collecting sensor information from internal sensors of the first ordnance munition, the internal sensors including an accelerometer, a gyroscope, a magnetometer or a pressure sensor.

In a further aspect, determining the approximate location of the first ordnance munition and generating the first location information based on the determined approximate location may include using the collected sensor information to determine the approximate location of the first ordnance munition. In a further aspect, determining the more precise location of the first ordnance munition based on the location information received from the wireless transceiver and generating the second location information based on the determined more precise location may include using the collected sensor information to determine the more precise location of the first ordnance munition. In a further aspect, sending the generated first location information to a wireless transceiver in proximity to the first ordnance munition may include sending the generated first location information to a mobile vehicle via an antenna system that is symmetrical over a body of the first ordnance munition. In a further aspect, altering the flight path of the first ordnance munition based on the generated second location information may include altering the flight path of the first ordnance munition to a more accurate location of a primary target, or altering the flight path of the first ordnance munition to a new location of a mobile primary target.

In a further aspect, altering the flight path of the first ordnance munition based on the generated second location information may include altering the flight path of the first ordnance munition to a location of a secondary target in response to determining that a primary target is not available. In a further aspect, altering the flight path of the first ordnance munition based on the generated second location information may include changing the direction of one or more spoilers on the first ordnance munition.

In a further aspect, sending the generated first location information to the wireless transceiver in proximity to the first ordnance munition may include sending the generated first location information to an unmanned aerial vehicle, the unmanned aerial vehicle guiding a second ordnance munition to a target. In a further aspect, the first ordnance munition may include an encryption tag, and the method may further include using the encryption tag to implement authenticated encryption and authenticate the location information received from the wireless transceiver.

In a further aspect, the first ordnance munition may include a primary target and an identification friend or foe (IFF) system. In a further aspect, the method may include using the IFF system to determine whether the primary target may be classified as friendly, in which altering the flight path of the first ordnance munition based on the generated second location information may include altering the flight path in response to determining that the primary target may not be classified as friendly. In a further aspect, the method may include using the IFF system to determine whether a soldier may be classified as active or non-active, in which altering the flight path of the first ordnance munition based on the generated second location information may include altering the flight path in response to determining that the soldier may be classified as active. In a further aspect, altering the flight path of the first ordnance munition based on the generated second location information may include altering the flight path to avoid collateral damage.

Further aspects include an ordnance munition that includes a memory, and a processor coupled to the memory, in which the processor is configured with processor-executable instructions to perform operations that include determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information. In an aspect, the processor may be configured with processor-executable instructions to perform operations further including collecting sensor information from internal sensors of the ordnance munition, the internal sensors including an accelerometer, a gyroscope, a magnetometer or a pressure sensor.

In a further aspect, the processor may be configured with processor-executable instructions to perform operations such that determining the approximate location of the ordnance munition and generating the first location information based on the determined approximate location includes using the collected sensor information to determine the approximate location of the ordnance munition. In a further aspect, the processor may be configured with processor-executable instructions to perform operations such that determining the more precise location of the ordnance munition based on the location information received from the wireless transceiver and generating the second location information based on the determined more precise location includes using the collected sensor information to determine the more precise location of the ordnance munition. In a further aspect, the processor may be configured with processor-executable instructions to perform operations such that sending the generated first location information to a wireless transceiver in proximity to the ordnance munition includes sending the generated first location information to a mobile vehicle via an antenna system that is symmetrical over a body of the ordnance munition.

In a further aspect, the processor may be configured with processor-executable instructions to perform operations such that altering the flight path of the ordnance munition based on the generated second location information includes altering the flight path of the ordnance munition to a more accurate location of a primary target, or altering the flight path of the ordnance munition to a new location of a mobile primary target. In a further aspect, the processor may be configured with processor-executable instructions to perform operations such that altering the flight path of the ordnance munition based on the generated second location information includes altering the flight path of the ordnance munition to a location of a secondary target in response to determining that a primary target is not available. In a further aspect, the processor may be configured with processor-executable instructions to perform operations such that altering the flight path of the ordnance munition based on the generated second location information includes changing the direction of one or more spoilers on the ordnance munition.

In a further aspect, the processor may be configured with processor-executable instructions to perform operations such that sending the generated first location information to the wireless transceiver in proximity to the ordnance munition includes sending the generated first location information to an unmanned aerial vehicle, the unmanned aerial vehicle guiding a second ordnance munition to a target. In a further aspect, the ordnance munition includes an encryption tag, and the processor may be configured with processor-executable instructions to perform operations further including using the encryption tag to implement authenticated encryption and authenticate the location information received from the wireless transceiver.

In a further aspect, the ordnance munition includes a primary target and an identification friend or foe (IFF) system. In a further aspect, the processor may be configured with processor-executable instructions to perform operations further including using the IFF system to determine whether the primary target may be classified as friendly, in which altering the flight path of the ordnance munition based on the generated second location information includes altering the flight path in response to determining that the primary target may not be classified as friendly. In a further aspect, the processor may be configured with processor-executable instructions to perform operations further including using the IFF system to determine whether a soldier may be classified as active or non-active, in which altering the flight path of the ordnance munition based on the generated second location information includes altering the flight path in response to determining that the soldier may be classified as active. In a further aspect, in which the processor may be configured with processor-executable instructions to perform operations such that altering the flight path of the ordnance munition based on the generated second location information includes altering the flight path to avoid collateral damage.

Further aspects include a non-transitory computer readable storage medium having stored thereon processor-executable software instructions configured to cause a processor in an ordnance munition to perform operations including determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information.

Further aspects may include an ordnance munition having a processor configured with processor-executable instructions to perform various operations corresponding to the methods discussed above.

Further aspects may include an ordnance munition having various means for performing functions corresponding to the method operations discussed above.

Further aspects may include a non-transitory processor-readable storage medium having stored thereon processor-executable instructions configured to cause a processor to perform various operations corresponding to the method operations discussed above.

DETAILED DESCRIPTION

Figure 1:
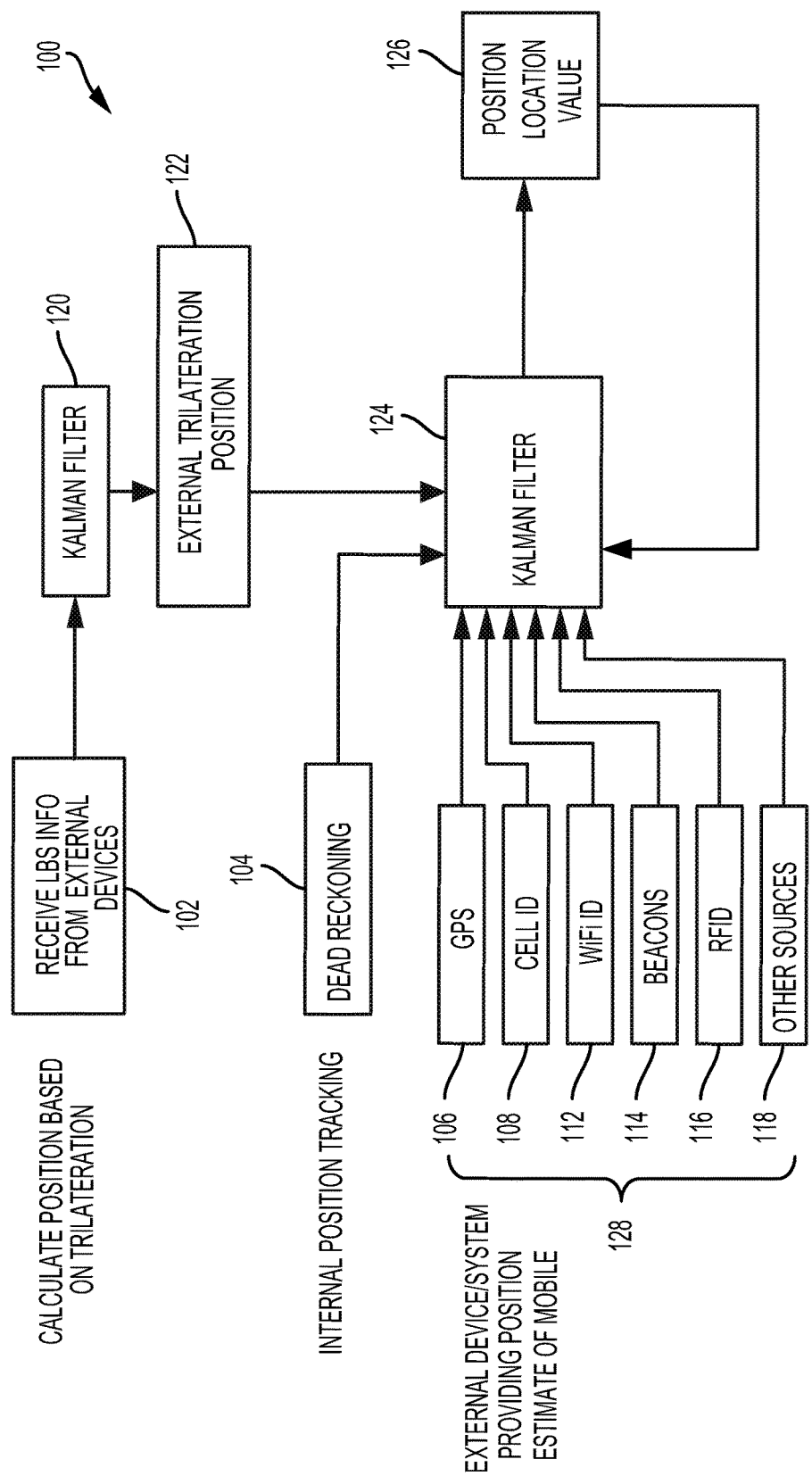
FIG. 1 is a block diagram illustrating a components and operations in an enhanced location based services (eLBS) trilateration system that may be included in and/or used by a targeting and guidance system of an ordnance munition to guide the ordnance munition to its target destination in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" or like is not necessarily to be construed as preferred or advantageous over other implementations.

In overview, the various embodiments include methods, and ordnance munitions that are equipped with hardware and/or configured with processor executable instructions to implement the methods, for intelligently selecting targets and efficiently guiding the ordnance munitions to its selected target.

A smart ordnance munition device (e.g., rocket, mortar, missile, artillery shell, aircraft ordnance, ordnance projectile, etc.) may include a processor that is configured with processor executable instructions to perform various operations to determine, after a launch event, its current approximate or rough location. The "rough location" may be a waypoint or information structure that includes an approximate longitude value, an approximate latitude value and/or an approximate altitude value. The first smart ordnance munition device may identify a second device that is in proximity to the first smart ordnance munition device, and send its determined rough location to the identified second device. The second device may be another smart ordnance munition device, a wireless transmitter, an unmanned aerial vehicle (UAV), a drone, etc. In response to sending its determined rough location, the first smart ordnance munition device may receive location information from the second device. The first smart ordnance munition device may use any combination of the generated or received location information to generate updated location information that is more precise than the determined "rough" location. For example, the first smart ordnance munition device may use the received location information to generate a second waypoint or information structure that includes a more accurate longitude value, a more accurate latitude value, and/or a more accurate altitude value that correct for microbursts or wind shear. The first smart ordnance munition device may select a new target and/or alter its flight path based on the updated location information (e.g., the generated more precise location information, second waypoint, etc.).

In some embodiments, the first and/or second devices may be included in as part of an intelligent ordnance munition delivery system or an intelligent targeting and guidance solution. In some embodiments, the first and second devices may be configured to self-organize to form a communication group or a coordinated attack group. In some embodiments, the first and second devices may be configured to work in conjunction with one another to self-select their respective targets, self-correct their respective flight paths, make in-flight course corrections, and/or select new targets after launch based on the collaborations or real-time communications.

Various embodiments may improve the performance and functioning of conventional munitions and targeting systems by improving their accuracy, efficiency, and effectiveness, as well as by providing them with additional coordination, control, guidance, targeting, collaboration, and communication capabilities. Additional benefits and improvements provided by the various embodiments will be evident from the disclosures below.

Accurately delivering ordnance munitions (e.g., ammunition, rockets, mortars, missiles, unmanned vehicles, munitions, ordnances etc.) to a well-defined target is fraught with difficulties. This is because modern targeting and guidance solutions must generally account for a large number of different factors that could affect the accuracy and precision of delivery. These factors may include communications limitations, coordination difficulties, environmental factors, and guidance issues. The various embodiments include intelligent ordnance munition delivery systems, targeting and guidance solutions, and/or ordnance munition devices that are configured to overcome these and other factors and limitations of conventional solutions to intelligently and accurately deliver an ordnance munition to its target.

Launching rockets to deliver objects (such as satellites) into low earth orbit or other orbits may require coordination among many different devices, components, and/or systems. Such coordination is also desirable for bringing down the rocket(s) safely after delivery of the payloads. Yet, conventional solutions are too complex, too cost prohibitive, and/or otherwise inadequate for coordinating or controlling a rocket after its launch. The various embodiments include systems, solutions and devices that overcome these and other limitations of conventional solutions so as to allow for better coordination and control of an ordnance munition (e.g., rocket, etc.) after its launch.

After delivery of a payload, a rocket may have useful thrust left (or some remaining fuel reserves). The remaining thrust/fuel could be used to return the rocket safely to earth (e.g., for later reuse). The remaining thrust/fuel could also be used to guide the rocket so that it lands in a location from which it can be readily recovered. The remaining thrust/fuel could also be used to dispose of the rocket by directing it's splashing down to the ocean. In all these situations, it would be advantageous to control and redirect the rocket so as to avoid any obstacles and/or to deliver the rocket to a precise location with minimal fuel reserve consumption. Yet, conventional solutions require using a significant amount of fuel, are extremely expensive, and/or are otherwise are inadequate for coordinating, controlling, or redirecting a rocket to a precise location. The various embodiments include systems, solutions and devices that are configured to overcome these and other limitations of conventional solutions so as to allow an ordnance munition (e.g., rocket, etc.) to better utilize its remaining useful thrust after the delivery of its payload.

After a rocket launch, it may be determined that a designated splash down area is occupied by vessels, such as fishing vessels, cargo vessels or foreign military vessels. As a result, a commander or controller could be required to redirect the rocket to avoid the identified obstacles and/or to deliver the rocket to a precise location, with minimal fuel consumption. Yet, redirecting the rocket in such situations via conventional solutions may require a significant amount of fuel and/or a large degree of complex coordination operations and/or communications among many different devices. The various embodiments include systems, solutions and devices that are configured to overcome these and other limitations of conventional solutions so as to allow for intelligently and efficiently controlling, guiding or redirecting an ordnance munition after its launch (or midflight, in-flight, etc.). For example, the various embodiments may allow a rocket having a designated splash down area that is later determined to be occupied by vessels to better utilize its remaining useful thrust to redirect itself to a new splash down area that is not occupied by a vessel. As another example, the various embodiments may allow a rocket having a predesignated splash down area to utilize its remaining useful thrust to redirect itself to a new splash down area that is occupied by an enemy vessel.

Guiding an ordnance munition (or any "non-wire guided" object) via conventional solutions may pose great difficulty and numerous technical challenges. These technical challenges are particularly difficult when the ordnance munition is a mortar round. For example, standard or conventional mortar rounds have very low accuracy and require firing for effect—and then adjusting the aim to correct for environmental factors, aim, human error and other such factors/conditions that may cause the projectile to miss the target.

Further, firing the first projectile may also be hazardous in certain environments, since the mere act of firing a mortar may reveal the location from which the projectile was fired.

The various embodiments include systems, solutions and devices (e.g., ordnance munitions in the form of intelligent mortars, etc.) that overcome the above-mentioned difficulties and technical challenges of conventional solutions, have a high level of accuracy, resist jamming, intelligently correct for man-made and environmental factors (e.g., aim, human error, microbursts, wind shear, etc.), and/or which do not reveal the launch location or the command and control location.

The various embodiments allow for launching multiple projectiles in a general direction of a target, and correct for any or all of above-mentioned factors or technical challenges midflight or in real time.

The various embodiments include components that allow ordnance munitions to make in-flight course corrections and/or to be efficiently controlled and guided (e.g., by altering their flight path after launch, etc.) without consuming a significant amount of fuel.

The various embodiments include components that allow ordnance munitions to collaborate, dynamically select their respective targets midflight, and make in-flight course corrections to hit their dynamically selected targets.

Environmental factors and man-made factors may interfere with flight paths and guidance of ordnance munitions after launch. For long range delivery, microbursts or wind shear may redirect a projectile and cause it to be off target. Man-made factors such as jamming may also limit communication with projectiles once they have been launch. The communications with the projectiles may also reveal a command and control location that may then be targeted based on these communications. Conventional projectiles, such as mortars, cannot determine their locations, communicate between each other, or redirect their trajectories.

The various embodiments may include ordnance munitions in the form of intelligent mortars that are equipped with processing and communications hardware and/or software that allows them to intelligent determine their current location, securely communicate with other projectiles (e.g., other mortars, etc.), change or redirect their trajectories, dynamically update their flight paths to adjust microbursts or wind shear, and/or instruct other ordnance munitions to alter their flight paths midflight, all without revealing the firing location or command and control location.

The various embodiments allow ordnance munitions to work in concert and/or to coordinate their efforts for intelligent projectile delivery. The various embodiments allow ordnance munitions to form coordinated attack groups.

Conventional solutions do not allow ordnance munitions, such as mortars, to be intelligently controlled or redirected after they are launched or fired. For example, if a target moves after a mortar has been fired, conventional mortars cannot adjust their flight path or trajectories mid-flight to reach the new location of the target. Nor can multiple mortars autonomously form a coordinated attack group or coordinate their efforts to intelligently select their respective targets mid-flight. The various embodiments equip mortars with hardware and/or software components (e.g., processors, memories, runtime systems, etc.) that allow them to collaborate midflight and intelligently select their targets. The mortars may adjust their flight paths or alter their trajectories to deliver a payload to an updated position of a target, to a secondary target, or to a safe location so as to not cause collateral damage.

Using conventional solutions, difficulties with coordination may arise when multiple ordnance munitions are fired towards one or more targets. If two or more teams are firing mortars, the inaccuracy of the standard mortars, combined with inability of the projectiles to communicate, may cause the mortar to miss their targets. By enabling the ordnance munitions to communicate between each other to determine their respective locations, coordinate, exchange targets, the various embodiments may allow the intelligent ordnance munition delivery system to maximize the number of targets that are hit. The various embodiments allow firing of projectiles in a general direction, and having the projectiles coordinate as to which targets each can reach and target accordingly.

In the commercial cellular wireless and automotive industries, the need to improve location position in both two and three dimensions continues to be a major focus. Presently GPS or A-GPS is the primary method that is used in the wireless and automotive industries for position determination. The FCC in the United States, however, has mandated positional accuracy and confidence for in-building situations where GPS positioning may not be obtainable. Such positional accuracy and confidence may be accomplished for in-building situations via enhanced location based service (eLBS) techniques. The various embodiments include intelligent ordnance munition delivery systems that implement and use eLBS and other enhanced location based techniques to better and more accurately deliver ordnance munitions in both outdoor and indoor environments.

Generally, enhanced location based techniques may be used to position a device (which may be mobile or on the move) to within 1 cubic meter (or finer). An example enhanced location based technique may include configuring a device processor in an ordnance munition to determine a rough location of the ordnance munition, group the ordnance munition with a wireless transceiver (or a second device, etc.) in proximity to the ordnance munition to form a communication group, send the determined rough location of the ordnance munition to the wireless transceiver, receive location information from the wireless transceiver, and determine a more precise location of the ordnance munition based on the location information received from the wireless transceiver. As another example, an enhanced location based technique may include a device processor collecting location information from a plurality of ordnance munitions in a communication group, computing more precise location information for the ordnance munition based on the location information collected from the plurality of ordnance munitions (e.g., by using horizontal data to determine a position relative to the Earth's surface, using vertical data to determine a height of the position relative to sea level, and generating three-dimensional location and position information based on the determined position and height), and using the generated location and position information to provide the location based service.

The various embodiments allow ordnance munitions to use enhanced location based techniques for in-flight course corrections. The flight course corrections may be undertaken based a result of performing enhanced location based techniques with a single device, or enhanced location based techniques on many devices operating in unison. A group of smart ordnances may use enhanced location based techniques to enhance their collective location information and navigation to a defined location.

Unlike some conventional solutions, the use of enhanced location based techniques with smart ordnance munitions does not require the use of a laser designation device or continuously illuminating the intended target. Also, the use of enhanced location based techniques with smart ordnance munitions enables the smart ordnance munition to self-correct or work as a group of smart ordnance munitions.

The target location or locations may not be known by all the smart ordnance munitions at time of launch but can be obtained either from one of the smart ordnance munitions or from a remote location. The remote location may be a central command or a forward observer using a targeting device such as a digital messaging device (DMD) or other method of communicating the desired target targets to the smart ordnance munitions. The target(s) may have 3 dimension associated with their location or be simply provided as 2 dimensions.

The smart ordnance munition may include a processor and communication circuitry that is configured to transmit data about its location back to the forward observer or command, enabling course correction coordinates for the target to be entered after launch. The processor may receive and use the course correction coordinates from forward observer or command for in-flight course corrections or to alter its trajectory or flight path.

The smart ordnance munition may be configured to form ad-hoc groups and, depending on the mission parameters, become a member of a defined group, or operate in an ad-hoc environment so as to allow others in the group to include the smart ordnance in its planned ordnance delivery method or as part of an intelligent ordnance munition delivery system.

When forming groups, the smart ordnance munition can share its latitude, longitude, and altitude, as well as velocity and relative bearing to aid in the position determination of the other smart projectiles.

The smart ordnance can also take advantage of other devices reporting their latitude, longitude, and altitude to aid in the actual determination of the smart ordnance munitions actual latitude, longitude, and altitude. The confidence interval associated with the other reporting devices that are not deemed friendly may be lower than those from friendly or known devices.

The proximity information exchanged between smart ordnance munitions may be used to prevent in-flight collisions. In addition, the smart ordnance munition may be configured to use a LTE subscriber module as the radio transceiver in some embodiments.

The smart ordnance munition may be configured to utilize a lower cost internet of things (IOT) device, which may be a wideband (MC), narrow band (NB) or long range (LORA) iOT device depending on the application and platform on which they are installed.

The telemetry method between devices may be achieved by via variety of radio and optics methods discussed in this application or known in the art. These mentions may include or utilize any or all of wideband pulsed lasers, GSM, UMTS, CDMA, sonar, ultrasound, sound, breadcrumb beacons, or similar components.

The distance that the smart ordnance munition can send data to and from if operating in a peer to peer configuration may be limited based on the range of the wireless technology media that is used in the smart projectile. However, if the smart ordnance munition uses a wireless technology media that has a central base station like a LTE eNodeB, which include small cell eNodeB's, the range may be extended for as long as coverage is available. The LTE eNodeB may be either fixed or one that is moving. The eNodeB that is fixed can be a private or public wireless network. The moving eNodeB may be on a vehicle that is on land, over water, a plane, UAV, Drone, Balloon or satellite.

When forming a group, smart ordnance munitions can use a combination of iOT devices, LTE subscriber modules and eNodeB's. The use of one type of transceiver device or multiple types of transceiver devices enables a wider range of ordnance delivery capabilities utilizing eLBS or enhanced location based capabilities. The eNodeB can either be used to help in the command and control functions or be part of the ordnance. The eNodeB is able to group smart ordnance munitions either by function, defined group, or ad-hoc.

The smart ordnance munition has a wireless transmitter and sensors in it to take advantage of enhanced location based capabilities. The ordnance munition along with sensors should to be able to sustain the rapid acceleration of launching. The electrical power required to produce the functions within the guidance system as well as the wireless transmitter may be supplied by an on-board miniature battery.

In an embodiment, the antenna system used for the smart ordnance munition is arranged so it is symmetrical over the smart ordnance munitions body. (basically a mimo configuration using vertical, horizontal, cross polarized or circular polarization) This configuration alleviates the issue of orientation while in flight with other smart ordnance projective, other devices and eNodeBs.

The cell ID or location may be provided by an eNodeB platform which is providing battle field LTE coverage either using a private or commercial radio frequency in the sky via a drone, UAV, balloon or even LEO satellite networks. The ordnance/UAV may obtain coverage from the drone in the sky. However the cell ID may or may not be provided with any accuracy except within a centroid of the flight pattern of the drone.

During flight, the smart ordnance munition is capable of altering its path either operating by itself or in conjunction with other smart ordnance munitions or devices which may be part of a defined group or those in an ad-hoc group formation.

Additionally, the guidance system can also determine whether the intended target it achievable based on nominal flight parameters like velocity, range to primary target and other factors. If the intended target is not achievable, an alternative target may be obtained from the initial telemetry information provided or telemetry provided in route to the primary or alternative target. In this manner, the smart ordnance munition can achieve the most effectiveness possible based on changing target positions, new threats or practicality issues of actually delivering the ordnance payload to the designated primary target.

The use of enhanced location based techniques coupled with the guidance system on the smart ordnance munition allows the determination of the deviation from the desired target coordinate. While in flight, the smart ordnance munition can maneuver itself with selective control, such as, with the extension of a spoiler for a de-spin or de-spun control section of the smart ordnance munitions. The spoiler(s) may be extended into the stream of air passing the smart ordnance munitions.

A microelectromechanical (MEM) gyro on the smart ordnance munition provides the rotation signal used in the control of a motor for the spoiler. The direction of the extension of the spoiler may be controlled by the guidance system that obtains the current position (e.g., a waypoint) from an enhanced location based component that is configured to implement and use enhanced location based techniques, and precomputes the path to the intended target. A waypoint may be an information structure that includes one or more information fields, component vectors, location information, position information, coordinate information, or any other location information suitable for conveying or communicating location information. For example, each waypoint may include one or more coordinate values (e.g., latitude and longitude values, etc.), an altitude value, a time value, a timestamp, ranking values, confidence values, precision values, a range value, and an information type identifier (e.g., GPS, Loran C, sensor, combined, etc.). The coordinate and altitude value may identify a three-dimensional location of the corresponding device. The timestamp may identify the time that the location was determined/captured. The range value may identify a distance between an ordnance and an external device.

In some embodiments, a first ordnance may be configured to determine its current location (or generate a current location waypoint) by performing operations that include: determining its rough location (e.g., by generating a waypoint or other information structure that includes location-based values, etc.), grouping itself with a second ordnance within a proximity (e.g., within 1 meter, within 10 meters, within 100 meters, 1 kilometer, etc.) to form a communication group, sending the determined rough location value to the other ordnances in the group, receiving on the first ordnance location information from the other ordnances (e.g., the second ordnance), determining a more precise location of the first ordnance based on the location information received from the other devices, and setting the current location (e.g., a waypoint or other information structure that includes location-based values, etc.) to the determined more precise location. As part of determining the rough location, the first ordnance may estimate its position and/or generate a position estimate. In some embodiments, the position estimate may include latitude, longitude and/or elevation information that is accurate to within one (1) meter or less.

The use of enhanced location based techniques for delivery of ordnances can also be extended to improved reconnaissance or surveillance with small UAV's where the stealth for size may require a lower profile.

In an embodiment, small UAV's equipped with enhanced location based capability can be used for delivery of ordnance in diverse environments where typical ordnance may not be practical to be used or ill-advised due to the potential for collateral damage.

The combination of enhanced location based techniques and UAV's enables reconnaissance as well an ordnance delivery to be achievable within buildings. In an embodiment, this may be accomplished where personnel are either using the UAV's to obtain close proximity situation awareness in the detection of enemy combatants, location of friendlies or other reconnaissance.

Additionally, with enhanced location based techniques and UAV's coupled with additional sensors, such as sonar or magnetic displacement detection can aid in the navigation and mapping of the location for use by personnel when entering a structure that can be above or below ground.

The UAV's in this instance can either be equipped with only reconnaissance capability or be equipped with ordnance delivery capabilities as well. The ordnance delivery may be a place and leave method, where the UAV delivers the ordnance and leaves the vicinity or the UAV has the ordnance integrated into its platform and upon reaching a defined location releases the ordnance.

With enhanced location based techniques, the UAV can either transmit sensor data or video images or both to a rear observer that can either be in close proximity to the UAV or in a remote location observing and or guiding some of its actions.

The use of enhanced location based techniques for determination of friend and foe is possible using a pseudo Identification Friend or Foe (IFF) system where the ordnance that is on an advance war fighter or drone has a unique encrypted tag. This tag is tied to a body sensor of the individual soldier so that, even if the sensor pack is removed or NFC is not obtained, the IFF indicates an unknown state.

Also the IFF system can be used to determine if the soldier is active or not by using a command which indicates an unknown state request authentication response by the individual using the code of the day or hour.

The use of enhanced location based techniques/components with this scenario can be used with other systems to properly identify friendly forces from those of combatants. This enables the ability to deliver ordnances with higher confidence in close fire situations.

The use of enhanced location based techniques for smart ordnance munition or UAV's utilizes trilateration. Enhanced location based components may leverage the concept of sensor fusion in an ordnance munition for the enhanced position to be achieved using a multitude of devices to achieve a 3 dimensional position with a high confidence of its correctness.

One of the challenges associated with using geo-spatial positioning technology is that a device's ability to acquire satellite signals and navigation data to calculate its geospatial location (called "performing a fix") may be hindered when the device is indoors, below grade, and/or when the satellites are obstructed (e.g., by tall buildings, etc.). The presence of physical obstacles, such as metal beams or walls, may cause multipath interference and signal degradation of the wireless communication signals when the device is indoors or in urban environments that include tall buildings or skyscrapers. In rural environments, the device may not have sufficient access to satellite communications (e.g., to a global positioning system satellite) to effectively ascertain its current location. These and other factors often cause existing geo-spatial technologies to function inaccurately and/or inconsistently, which may hinder an ordnance munition's ability to accurately guide itself to its target.

In order to overcome some the challenges associated with using geo-spatial positioning technologies, a processor in an ordnance munition may perform various enhanced location based trilateration operations to "perform a fix" or obtain a reliable positional fix. In some embodiments, the enhanced location based trilateration operations may include receiving location information (e.g., a waypoint including a coordinate value, an altitude value and a range value identifying a distance from an external device, etc.) from one or more external devices. The processor may determine the validity of each of the received waypoints, perform normalization operations to normalize the received valid waypoints, assign an overall ranking to each of the normalized waypoints, assign a munition-specific ranking to each of the normalized waypoints, and store the normalized waypoints in memory. The processor may select waypoints from memory based on a combination of the overall ranking and the ordnance munition-specific ranking associated with each waypoint, apply four selected waypoints to a kalman filter (e.g., the main Kalman filter illustrated in block 124) to generate a final location waypoint, and use the generated final location waypoint to guide the ordnance munition to its target.

FIG. 1 illustrates an example enhanced location based trilateration system and method 100 that may be included in, implemented, or used by a processor or targeting and guidance system of an ordnance munition to perform a location fix and/or guide an ordnance munition to its target. The output generated via performance of method 100 may include a location value (or "position location") that defines three (3) points from which a reliable positional fix may be obtained for an ordnance munition. The ordnance munition may be configured to use the generated location value to determine its current location, report its current location, select a target, modify its flight path, and perform other similar operations. In some embodiments, the location value may be a waypoint information structure.

In the example illustrated in FIG. 1, the processor in the ordnance munition receives location information (e.g., a waypoint including a coordinate value, an altitude value and a range value identifying a distance from an external device, etc.) from one or more external devices in block 102. The external devices may be ordnance munitions, UAV, or any other device that reports information that may be used to determine the position of the ordnance munition relative to the reporting devices. In some embodiments, one or more of reporting devices may be non-stationary devices, thereby enabling multiple waypoints to be established at discrete periods of time.

In block 120, the processor may apply the location information received in block 102 to a first Kalman filter. The processor may use the outputs generated by the first Kalman filter to generate external trilateration position information in block 122. The processor may apply the external trilateration position information to a main Kalman filter in block 124 to generate output in the form of enhanced location based position location information (or "eLBS information") in block 126. The generated eLBS information may include a position location value, a waypoint or another information structure that includes information suitable for defining three points from which a reliable positional fix may be obtained. The generated eLBS information may include more accurate, detailed or precise location information than the external trilateration position information generated in block 122.

In some embodiments, the processor may be configured to utilize dead reckoning (DR) techniques and capabilities of the ordnance munitions by taking advantage of advanced sensors, thereby enabling the ordnance munition to estimate how far it transverses over a particular period of time in any three-dimension space.

In block 104, the processor may receive dead reckoning (DR) information. The processor may also receive inputs from GPS in block 106, a Cell ID in block 108, a WiFi ID in block 112, beacons in block 114, RFIDs in block 116, and/or inputs from other external devices in block 118. The processor may apply any or all of the received inputs of blocks 102-118, 122 to the main Kalman filter in block 124 to generate the eLBS information.

The processor may receive any or all of the above-mentioned inputs or location information from active or passive external devices/systems. For example, the processor may communicate with an active device, such as location based server, to receive the location information in block 118. Alternatively or in addition, the processor may receive location information from a passive device in block 118, such an RFID chip that scans for the presence of device and/or which broadcasts location information periodically.

In some embodiments, the processor may be configured to apply the output generated in block 126 (e.g., the "eLBS information") to the main Kalman filter in block 124. The main Kalman filter may use the eLBS information in conjunction with other inputs to generate more accurate eLBS information.

Figure 2A:
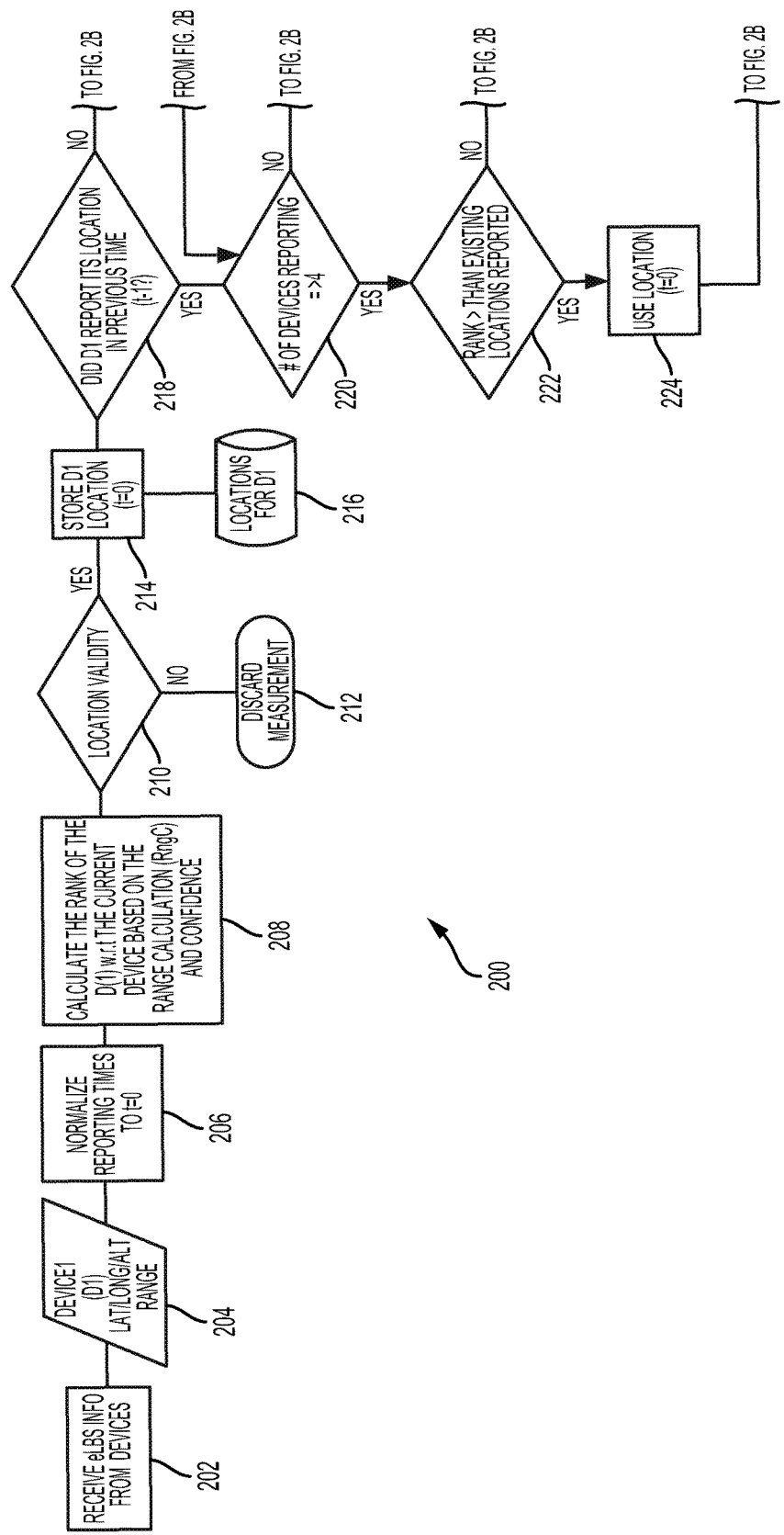
FIGS. 2A and 2B are flow diagrams illustrating methods of performing ordnance munition trilateration operations to guide an ordnance munition to its target destination in accordance with some embodiments.
Figure 2B:
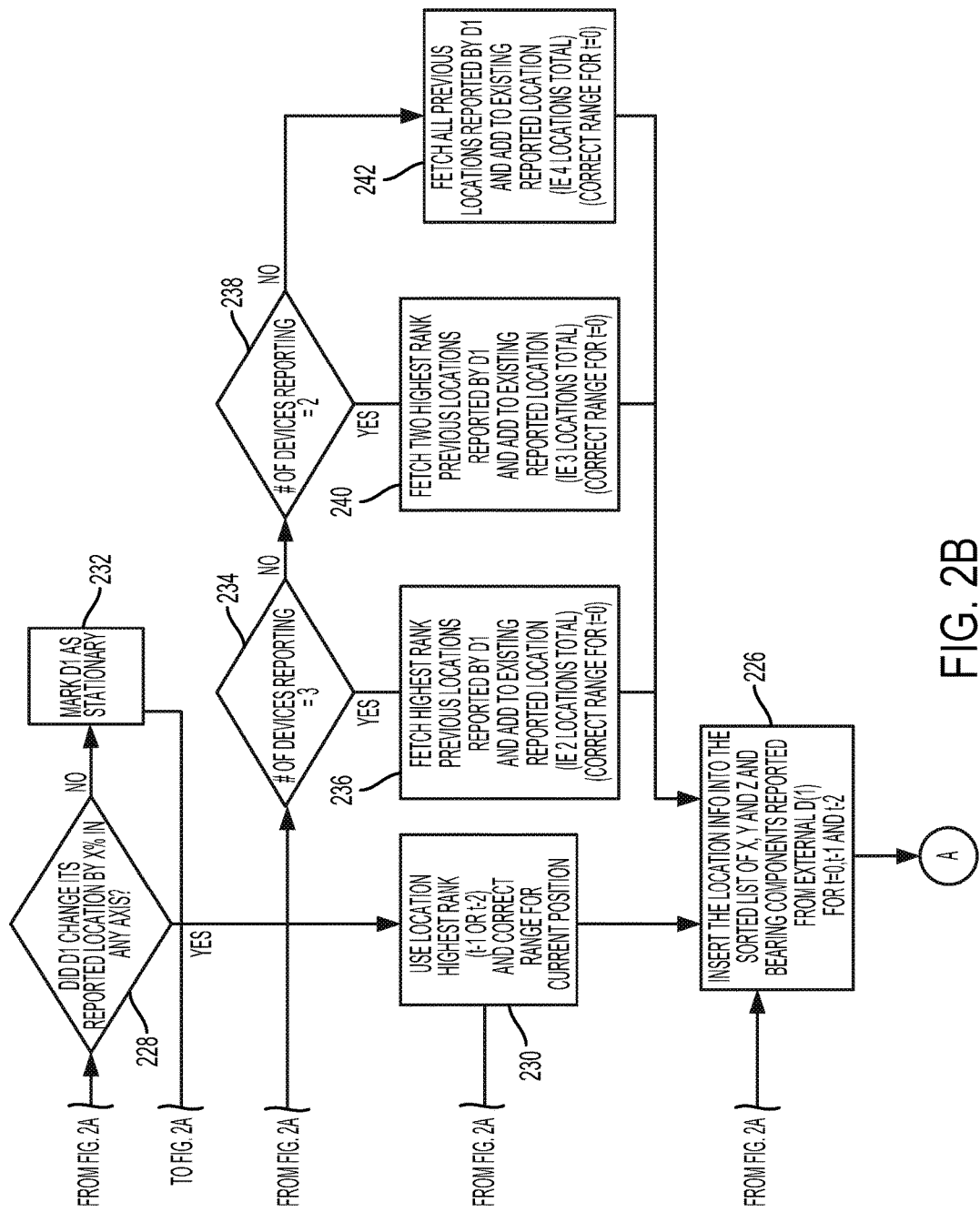

FIGS. 2A and 2B illustrate an ordnance munition trilateration method 200 that may be implemented and used by an ordnance munition and/or as part of an intelligent ordnance projectile delivery system to guide ordnance munitions to their targets in accordance with the various embodiments. In some embodiments, each ordnance munition in an intelligent ordnance projectile delivery system may include a targeting and guidance system that includes a processor, processing core, runtime system, components, modules, etc. that are configured to perform ordnance munition trilateration method 200.

With reference to FIG. 2A, in blocks 202 and 204, a processor in an ordnance munition may receive location information (eLBS information) and/or telemetry data from other devices (e.g., other ordnance munitions, a server, etc.), and determine whether the information (e.g., Lat, Lon, Alt, Range, etc.) reported by the other devices is valid.

In block 206, the processor may normalize the location information and telemetry data. In some embodiments, the processor may normalize the measurement to a common time based on the processors' cycle so the ad-hoc positions reported by all the devices and other sensors are normalized/synchronized to a unified time.

In block 208, the processor may rank the reporting devices based on a range calculation and/or a confidence calculation. In determination block 210, the processor may determine the validity of the information received from the reporting devices. In some embodiments, the validity (e.g., a first value, validity value, etc.) may be determined or evaluated in determination block 210 based on a relative position of the reporting device to itself (e.g., a second value, relative position value, etc.) and the confidence the device has that its position is correct (e.g., a third value, confidence value, etc.). In some embodiments, the processor may determine that information received from a reporting device is valid in response to determining that a computed validity value (or precision value, confidence value, etc.) exceeds a threshold value.

In block 212 the processor may discard values associated with the devices that fail to pass the validity test (i.e., determination block 210="No"). For example, the processor may discard values associated with the devices associated with a relative position value and/or a confidence value that fails to exceed one or more validity thresholds. In some embodiments, the processor may discard values by marking them for later deletion and/or by storing the values in a separate memory that is marked or labeled for deletion. In an embodiment, the processor may be configured to compare information from several devices that have been judged invalid in determination block 210 and discarded in block 212 to identify similarities. If several devices that have been judged invalid and discarded are found to have reported similar position information, the information from the discarded devices may later be deemed as possibly valid by the processor. As such, in some embodiments, the processor may be configured to retrieve and use discarded location values for further, other, or different location calculations.

If the location information and telemetry data is determined to be valid (i.e., determination block 210="Yes"), the processor may store the information in memory in blocks 214 and 216.

In various embodiments, the ordnance munition trilateration method 200 may include the processor making several decisions/computations regarding or relating to the measurements received, as well as the need to obtain previous positions or waypoints (WP), based on the amount or number of devices reporting to the anchor device. For example, in determination block 218, the processor may query whether the device reported its location in a previous time (t−1). If the answer is "Yes" (i.e., determination block 218="Yes"), the processor may query or determine whether at least four (4) devices have reported location values or WPs in determination block 220. If the answer to that query is "Yes" (i.e., determination block 220="Yes"), the processor may query whether the rank of the reporting device is greater than the rank of the devices that have already reported locations in determination block 222. If the answer to this query is "Yes" (i.e., determination block 222="Yes"), the processor may use the reported location to determine and set the location at a current time (t=0) in block 224. The reported location may be inserted into a list of sorted X, Y and Z bearing components for times t=0, t=t−1 and t=t−2 by the processor/system in block 226.

If the answer to the query in determination block 222 is "No" (i.e., determination block 222="No"), the processor may use the location of the highest rank at a previous time, such as (t−1) or (t−2), and correct the range for the current position in block 230. This location information may be passed to block 226 and inserted into a list of sorted X, Y and Z bearing components as discussed above. If the answer to the query in determination block 220 is "No" (i.e., determination block 220="No"), the processor may query whether at least three (3) devices have reported their locations or WPs in determination block 234. If the answer to the query in determination block 234 is "Yes" (i.e., determination block 234="Yes"), the processor may fetch the highest ranked previously reported locations by the device and adds the highest ranked two (2) reported locations to the existing two (2) reported locations from the other two devices. The four (4) reported locations may be used to determine the correct location for t=0 in block 236. The location information may be passed to block 226, as discussed above.

If the answer to the query in determination block 234 is "No" (i.e., determination block 234="No"), the processor may query whether at least two (2) devices have reported in determination block 238. If the answer to the query in determination block 238 is "Yes" (i.e., determination block 238="Yes"), the processor may fetch the three (3) highest ranked previously reported locations, and add them to the reported location from the device. The four (4) reported locations may be used to determine the correct location for t=0 in block 240. This location information may be passed to block 226 and inserted into a list of sorted X, Y and Z bearing components as discussed above.

If the answer to the query in determination block 238 is "No" (i.e., determination block 238="No"), the processor may fetch the four (4) highest ranked previously reported locations from the device. The four (4) reported locations may be used to determine the correct location for t=0 in block 242. This location information may be passed to block 226 and inserted into a list of sorted X, Y and Z bearing components as discussed above.

If the answer to the query in determination block 218 is "No" (i.e., determination block 218="No"), the processor may query if the device reported a change in location by a predetermined amount/percentage in any axis in determination block 228. If the answer is "Yes" (i.e., determination block 228="Yes"), the processor uses the location of the highest rank at a previous time, such as (t−1) or (t−2), and corrects the range for the current position in block 230. This location information may be passed to block 226 and inserted into a list of sorted X, Y and Z bearing components as discussed above.

If the answer to the query in determination block 228 is "No" (i.e., determination block 228="No"), the device may be marked as stationary in block 232.

The output of the ordnance munition trilateration method 200 for each device (e.g., each ordnance munition, etc.) may be fed into another device or method that utilizes the best reported positions from all the reporting devices so that the best position estimate can be achieved.

Figure 3A:
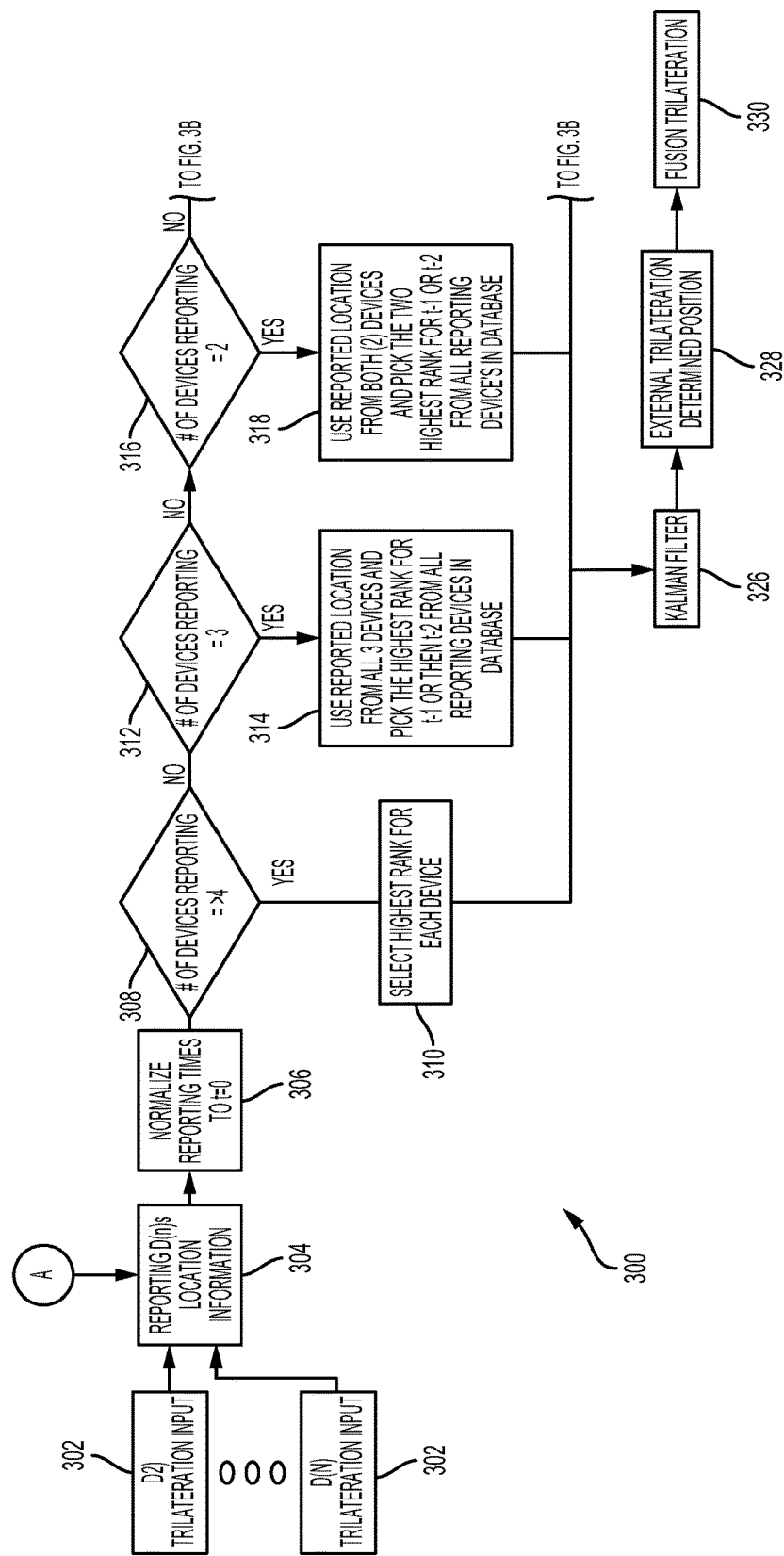
FIGS. 3A and 3B are flow diagrams illustrating methods of performing ordnance munition trilateration operations for multiple ordnance munitions to guide one or more of the ordnance munitions to their target destinations in accordance with some embodiments.
Figure 3B:
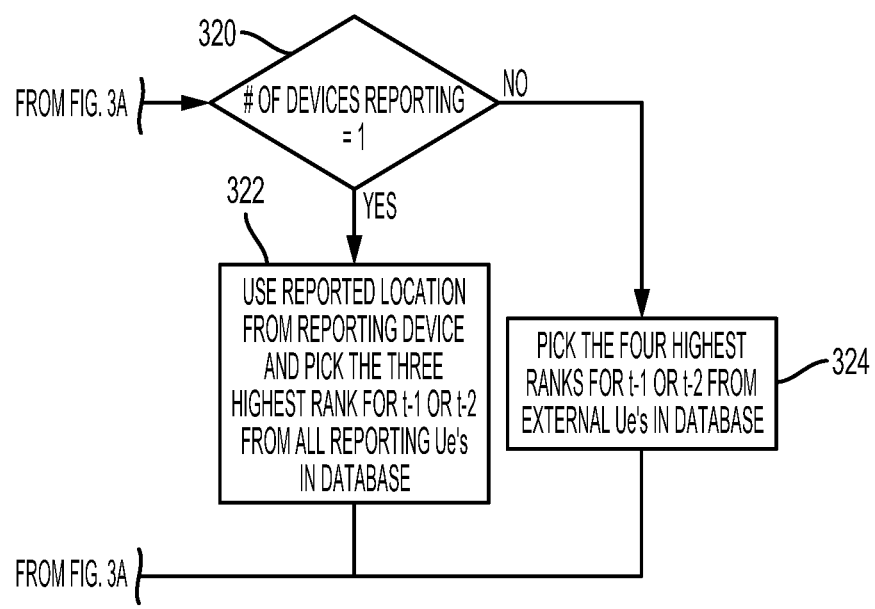

FIGS. 3A and 3B illustrate trilateration method 300 for multiple (N) devices 302. The trilateration method 300 may be implemented and used by ordnance munitions and/or components in an intelligent ordnance projectile delivery system to guide munitions to their targets in accordance with various embodiments. For example, a processor in the ordnance munition may be configured to perform trilateration method 300 and/or work in conjunction with a targeting and guidance system of the ordnance munition to guide the ordnance munition to its target. In some embodiments, the operations of trilateration method 300 may be performed after the operations of ordnance munition trilateration method 200.

With reference to FIGS. 3A and 3B, a plurality of devices 302 may report their locations, which may be compared to each other and ranked prior to be sent to a Kalman filter in block 326 with the appropriate matrix and weighting factors provided to an external trilateration determined position for time period 0 (t=0). The data from the multiple (N) devices may be stored in a memory in block 304. The reporting times may be normalized in block 306.

In determination block 308, the processor may determine or query whether the number of devices reporting is equal to or greater than four (4). If the answer is "Yes" (i.e., determination block 308="Yes"), in block 310 the processor may select the highest ranked location for each device. This information (e.g., the selected highest ranked locations, etc.) may be sent to a Kalman filter in block 326. The processor may use the result generated by the Kalman filter to generate an external trilateration position value in block 328. The processor may send the external trilateration position value to a fusion trilateration system in block 330 for use in fusion operations of the fusion trilateration method 400 illustrated in FIGS. 4A through 4C and discussed further below.

If the answer to the query in determination block 308 is "No" (i.e., determination block 308="No"), in determination block 312, the processor may query or determine whether the number of devices reporting their locations is equal to three (3) in block 312. If the answer is "Yes" (i.e., determination block 312="Yes"), in block 314 the processor may select for use the reported location (t=0) from all three (3) devices and the highest ranked location for time equal to t−1 or t−2 from the reporting devices. The selected information may be sent to a Kalman filter in block 326. The processor may use the result of the Kalman filter to generate an external trilateration position value in block 328. The external trilateration position value may be provided to the fusion trilateration system in block 330.

If the answer to the query in block 312 is "No" (i.e., determination block 312="No"), the processor may determine or query whether the number of devices reporting is equal to two (2) in block 316. If the answer is "Yes" (i.e., determination block 316="Yes"), the processor may select for use the reported location (t=0) from both devices and the two highest ranked locations for time equal to t−1 or t−2 from all the reporting devices in block 318. In block 326, the processor may send the selected information to a Kalman filter. The processor may use the result of the Kalman filter to generate an external trilateration position value in block 328. The external trilateration position value may be provided to the fusion trilateration system in block 330.

If the answer to the query in block 316 is "No" (i.e., determination block 316="No"), the processor may determine or query whether the number of devices reporting is equal to one (1) in block 320. If the answer is "Yes" (i.e., determination block 320="Yes"), the processor may select for use the reported location (t=0) from the reporting device may be used and the three highest ranked locations for time equal to t−1 or t−2 from all the reporting devices in block 322. In block 326, the processor may send the selected information to a Kalman filter. The processor may use the result of the Kalman filter to generate an external trilateration position value in block 328. The external trilateration position value may be provided to the fusion trilateration system in block 330.

If the answer to the query in block 320 is "No" (i.e., determination block 320="No"), the four highest ranked locations for time equal to t−1 or t−2 from all the reporting devices may be selected for use in block 324. In block 326, the processor may send the selected information to a Kalman filter. The processor may use the result of the Kalman filter to generate an external trilateration position value in block 328. The external trilateration position value may be provided to the fusion trilateration system in block 330.

Figure 4A:
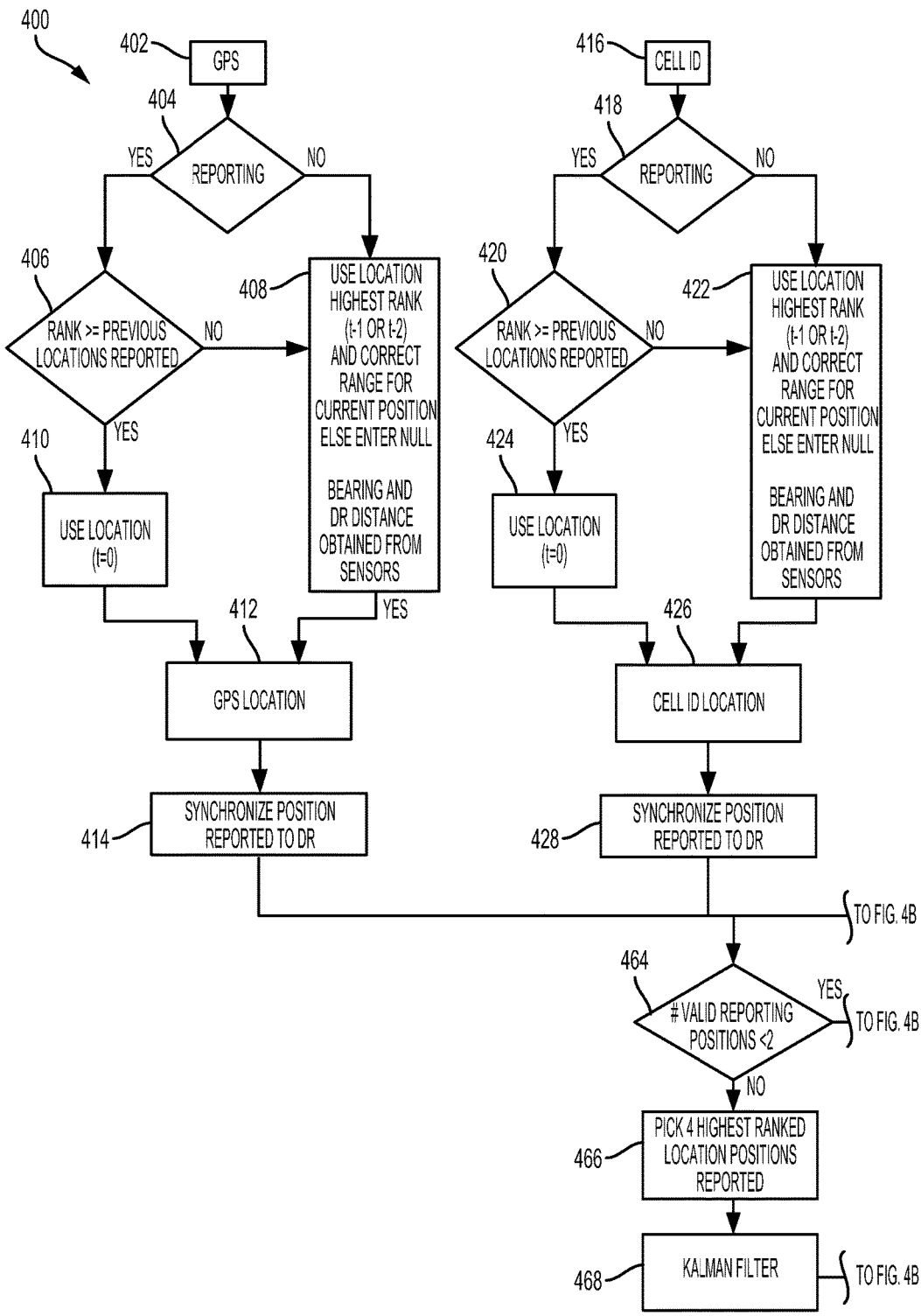
FIGS. 4A through 4C are flow diagrams illustrating methods of performing of fusion trilateration operations to guide an ordnance munition to its target in accordance with some embodiments.
Figure 4B:
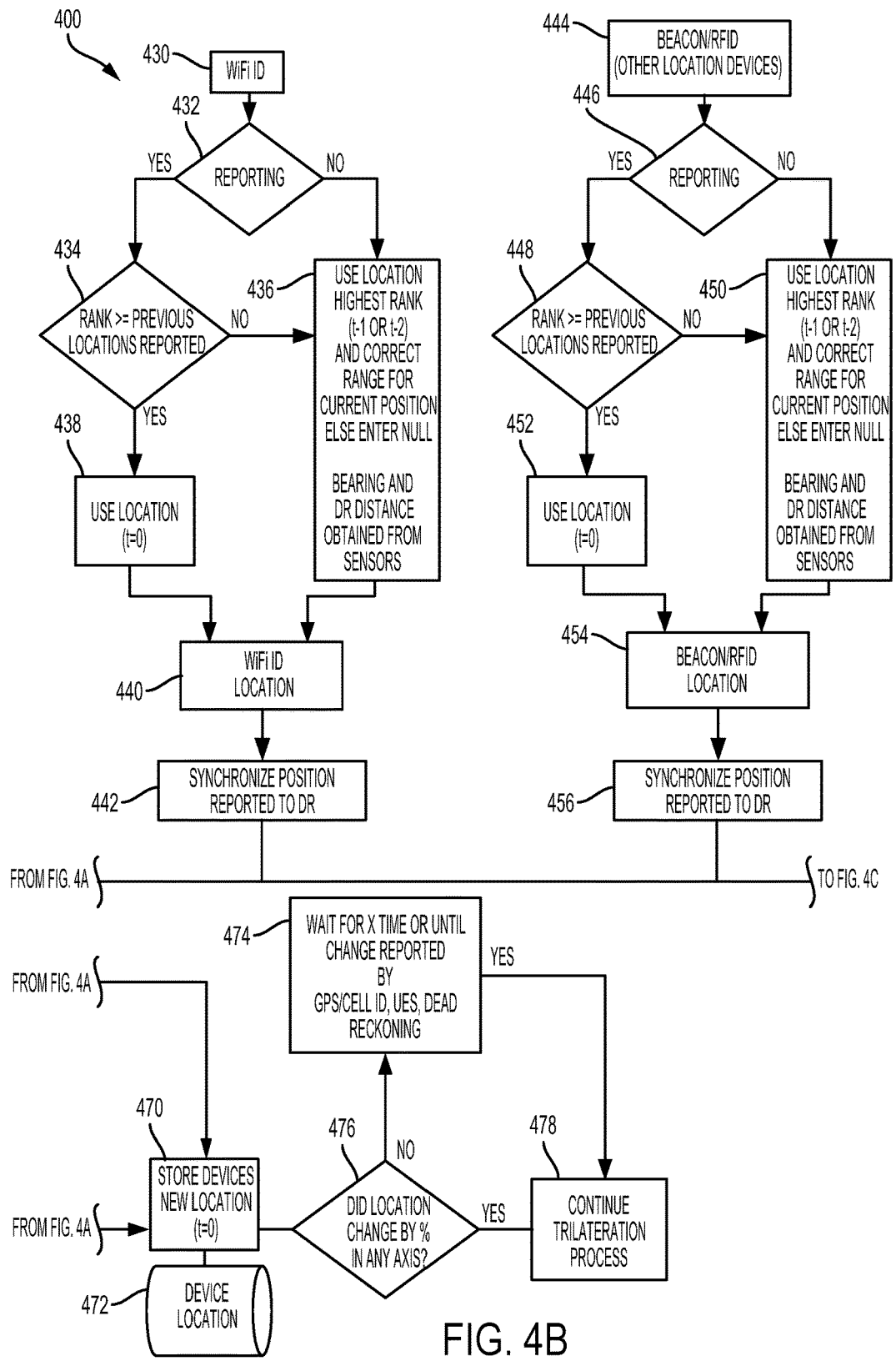
Figure 4C:
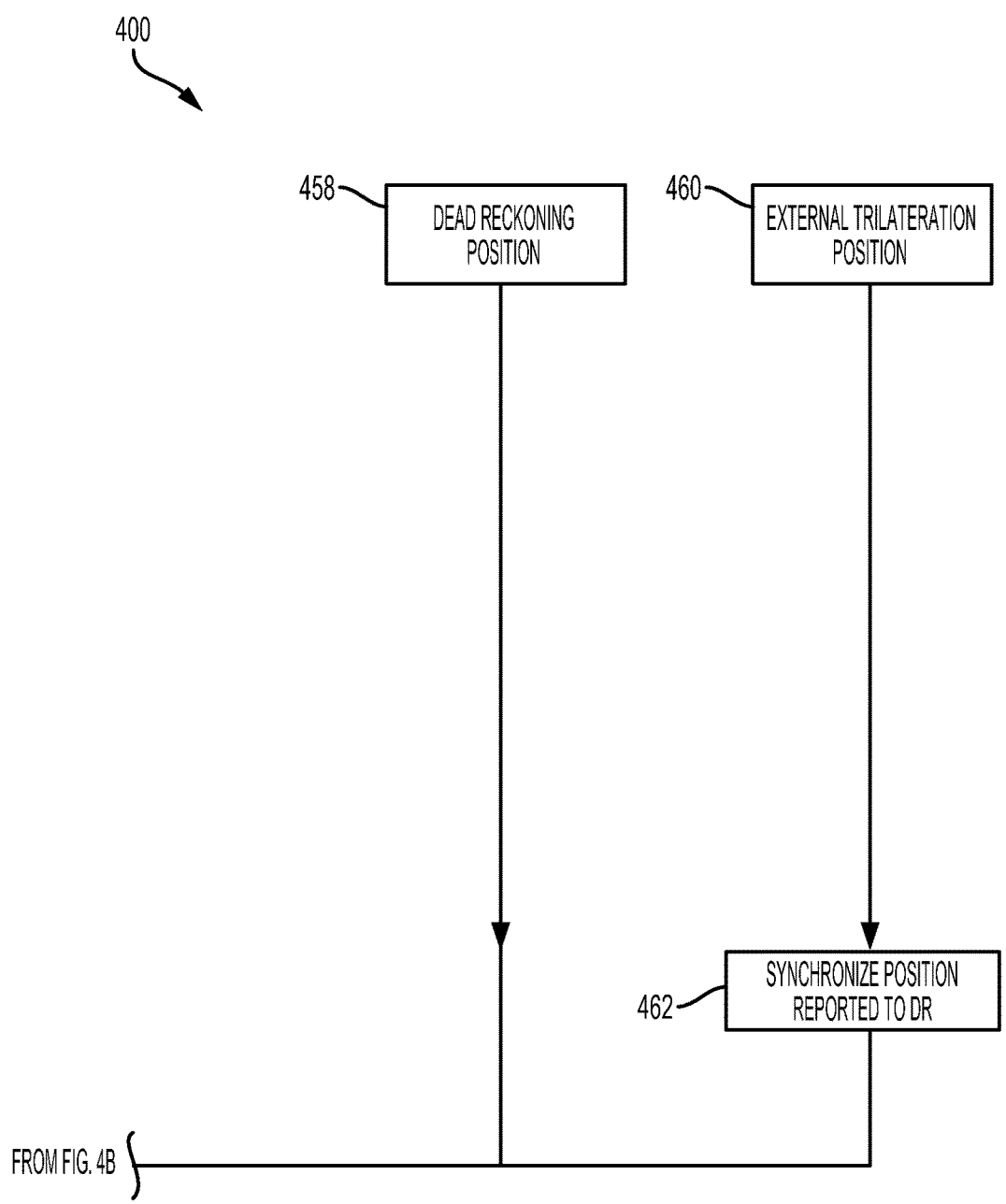

FIGS. 4A through 4C illustrate fusion trilateration method 400 according to an embodiment. The fusion trilateration method 400 may be implemented and used by the ordnance munitions or components in an intelligent ordnance projectile delivery system to guide munitions to their targets in accordance with various embodiments.

The fusion trilateration method 400 illustrated in FIGS. 4A through 4C incorporates position inputs from a variety of sources enabling the most robust position location confidence possible. In particular, FIGS. 4A through 4C show the various inputs in blocks 402, 416, 430, 444, 458, 460 providing positional information which include external and internal sources. The external sources include GPS in block 402, Cell ID in block 416, WiFi ID in block 430, Beacon/RFID in block 444 and other external position sources. Dead reckoning (DR) output in block 458 is also provided as part of the fusion trilateration process and is an internal reference for the device. The external trilateration process output in block 460 may also be used as an input into the fusion trilateration process. As part of the process involving external device trilateration, the use of previous positions may be used to achieve the necessary set of points from which a 3-dimension position can be calculated as discussed in more detail below.

For each of GPS in block 402, Cell ID in block 416, WiFi ID in block 430 and Beacon/RFID in block 444, the processor determines if these devices are reporting location information, blocks 404, 418, 432 and 446, respectively. If the answer is "Yes," the processor may query whether the current rank of the location is greater than or equal to previously reported locations, blocks 406, 420, 434 and 448, respectively. If the answer to this query is "No," the processor uses the highest ranked location information for t−1 or t−2 and makes a correction for the range, blocks 408, 422, 436, 450. Alternatively, a null value may be entered. The bearing and the dead reckoning distance may be obtained from internal sensors. If the answer to this query is "Yes" the provided location may be used as the current location (t=0) in blocks 410, 424, 438 and 452 respectively and in blocks 412, 426, 440 and 454 respectively. If the answer to the query in blocks 404, 418, 432 and 446 is "No," the processor uses the highest ranked location information for t−1 or t−2 and makes a correction for the range, blocks 408, 422, 436, 450. Alternatively, a null value may be entered. The bearing and the dead reckoning distance may be obtained from internal sensors. In this case, respective locations are assigned the highest ranked (t−1 or t−2) locations, blocks 412, 426, 440, and 454.

Next, the respective GPD, Cell ID, WiFi ID and Beacon RFID locations (blocks 412, 426, 440, and 454), as well as, dead reckoning location (block 458) and external trilateration location (block 460) are synchronized (blocks 414, 428, 442, 456 and 462) are queried as to whether the number of reporting positions is less than 2 If the answer to the query is "No," the 4 highest ranked locations are selected, block 466, and provided to a Kalman filter, block 468. The results of the Kalman filter, i.e. the location at t=0, is stored, blocks 470, 472. If the answer to the query in block 464 is yes, the single reported location is stored, blocks 470, 472.

After storing the location, the processor/system may query whether the new location changed from the previous location by a predetermined amount/percentage, block 476. If the answer is "Yes," the trilateration process is continued. If the answer, is "No," the processor waits a predetermined amount of time or until a change is reported by any of the various inputs in blocks 402, 416, 430, 444, 458, 460.

Figure 5:
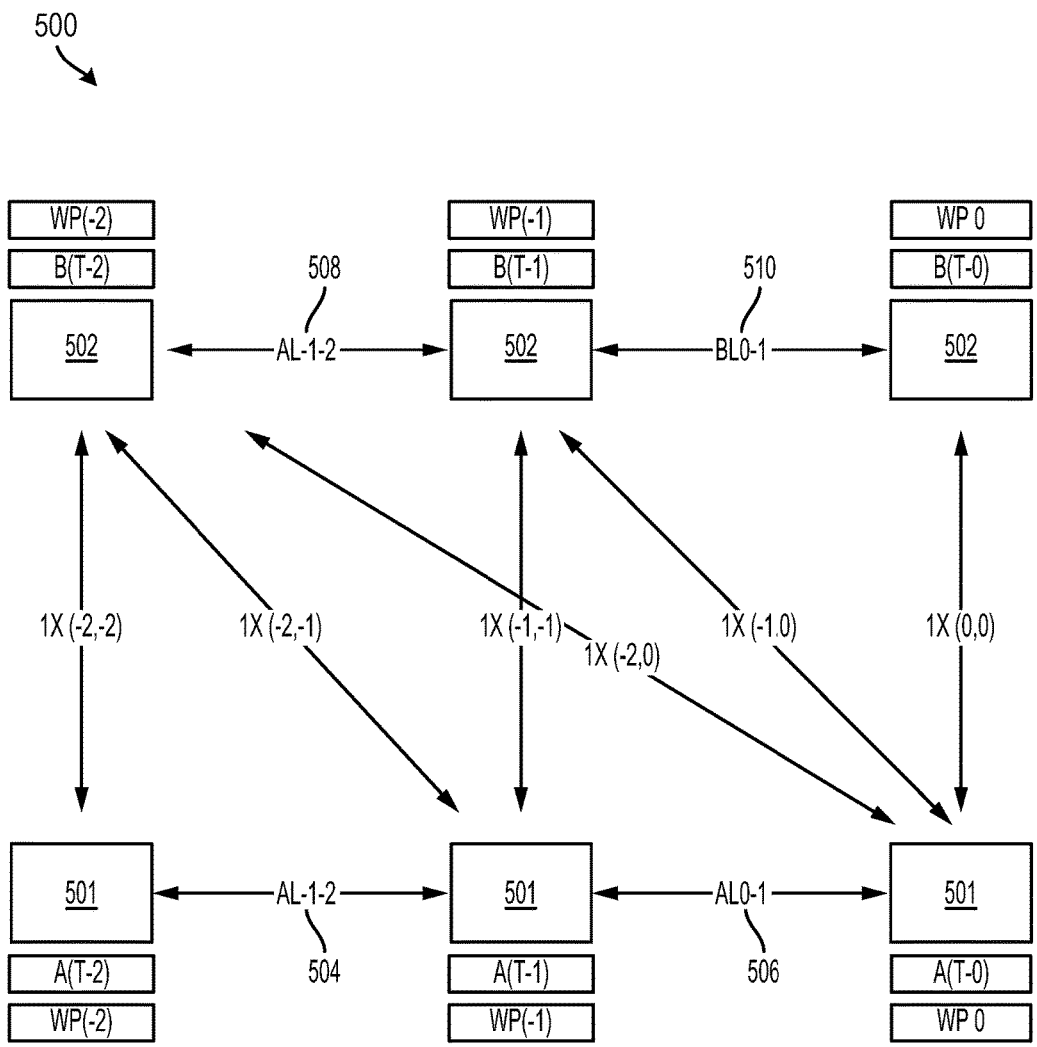
FIG. 5 is a component block diagram that illustrates components and communication links in a system that may be included in ordnance munitions that are configured to share location information that may be used to guide an ordnance munition to its target in accordance with the various embodiments.

FIG. 5 is a component block diagram that illustrates a system 500 suitable for sharing of location information (e.g., eLBS Information) between ordnance munitions according to an embodiment. In the example illustrated in FIG. 5, position at t=0 is reported by Device (x) to Device (1), each of which may be an ordnance munition of a plurality of munitions in an intelligent ordnance projectile delivery system. The range or distance between any two of these devices may be determined using a sounding/ranging method, time of flight, using radio communication, Received Signal Strength Indicator (RSSI), and other similar information or techniques. A range value (e.g., a value generated via sounding/ranging method) may be used to determine the confidence of the position reported which may be in addition to the confidence the Device(x) is reporting about its own location.

The concept is referred to as Pseudo Positioning where the previous locations of any device including the primary device, i.e. the one performing the position update, utilizes existing and previous positions reported to it from other devices, including itself. This enables the device to triangulate on itself with no other devices or it enables the device to triangulate using less than 3 devices by using previous positions as valid waypoints from which to obtain the waypoint to use for triangulation.

The system 500 includes two devices/ordnance munitions 501, 502 that are used to obtain four data points based on the motion of one or both of the ordnance munitions. In alternative embodiments, the concept or system illustrated in FIG. 5 may be extrapolated to any number of ordnance munitions (e.g., 3, 4, 5, 6 or more devices or ordnance munitions).

With reference to FIG. 5, a first ordnance munition 501 provides location information at times (t=t−2, t=t−1 and t=0) to a second ordnance munition 502. Similarly, the second ordnance munition 502 provides location information at times (t=t−2, t=t−1 and t=0) to first ordnance munition 501. The first ordnance munition 501 at t=0 may use the current location and two previous locations of the second ordnance munition 502 to determine its current location/position. The second ordnance munition 502 at t=0 may use the current location and two previous locations of the first ordnance munition 501 to determine its current location/position. These locations may also be used (e.g., by a processor in an ordnance munition) as a check for dead reckoning and/or positional validation.

In the example illustrated in FIG. 5, communications between the ordnance munitions 501, 502 occur at time t=0 (this includes sounding/ranging), and the location of an ordnance munition at time t=0 may be represented as (0,0). The past locations of an ordnance munition (e.g., ordnance munitions 501 or 502) may be represented as (−1,0) for time t=t−1, (−2,0) for time t=t−2, etc. Similarly, the estimated future location for the device at time t=t+1 may be represented as (1,0), etc.

Vector "AL-1-2" represents the distance 504 that the first ordnance munition 501 travels or moves between times t=t−2 and t=t−1. The vector "AL0-1" represents the distance 506 that the first ordnance munition 501 travels or moves between times t=t−1 and t=0. Similarly, vectors "BL-1-2" and "BL0-1" represent the distances 508, 510 that the second ordnance munition/ordnance 502 travels or moves between times t=t−2 and t=t−1 and between times t=t−1 and t=0, respectively.

Vectors 1X (−2,−2), 1X (−2,−1) and 1X (−2,0) represents sounding data (i.e., ranging) that is established between the ordnance munitions at time t=t−2. Vectors 1X (−1,−1) and 1X (−1,0) represents sounding data for time t=−1. Vector 1X (0,0) represents sounding data for time t=0. These six vectors may be adjusted based on dead reckoning information (or the information generated via the other techniques discussed in this application) and to account for the relative differences in values for either the first ordnance munition 501, the second ordnance munition 502 (B), or for both ordnance munitions 501, 502.

Due to the ranging information between A and B at t=−2, t=−1 and t=0, points B(t−2), B(t−1), B(t=0), A(t−2), A(t−1) and A(t=0) are known to the ordnance munitions 501, 502 after the communication exchange at time t=0. In some embodiments, the ordnance munitions 501, 502 may be configured to also compute, determine, and/or estimate point A(t+1) and point B(t+1). Based on the confidence values associated with these points, the ordnance munitions may select four points for use in determining its three-dimensional location and/or performing location-based operations (e.g., eLBS operations, etc.).

In some embodiments, the first ordnance munition 501 may be configured to estimate its future locations (at t=t+1, t=t+2), and send these estimates to the second ordnance munition 502 and vice versa. In addition, sounding data for 1X (−2,−2), 1X (−2,−1), 1X (−2,0), 1X (−1,−1), 1X (−1,0) and 1X (0,0) may provide vectors that may be used to determine the locations of the ordnance munitions 501, 502. In some embodiments, these vectors may be adjusted based on dead reckoning (DR) information to account for relative differences in the first ordnance munition 501, second ordnance munition 502, or both. Other vectors may be calculated, determined or computed for t=t+1, and used as a replacement and/or as a check value.

Figure 6:
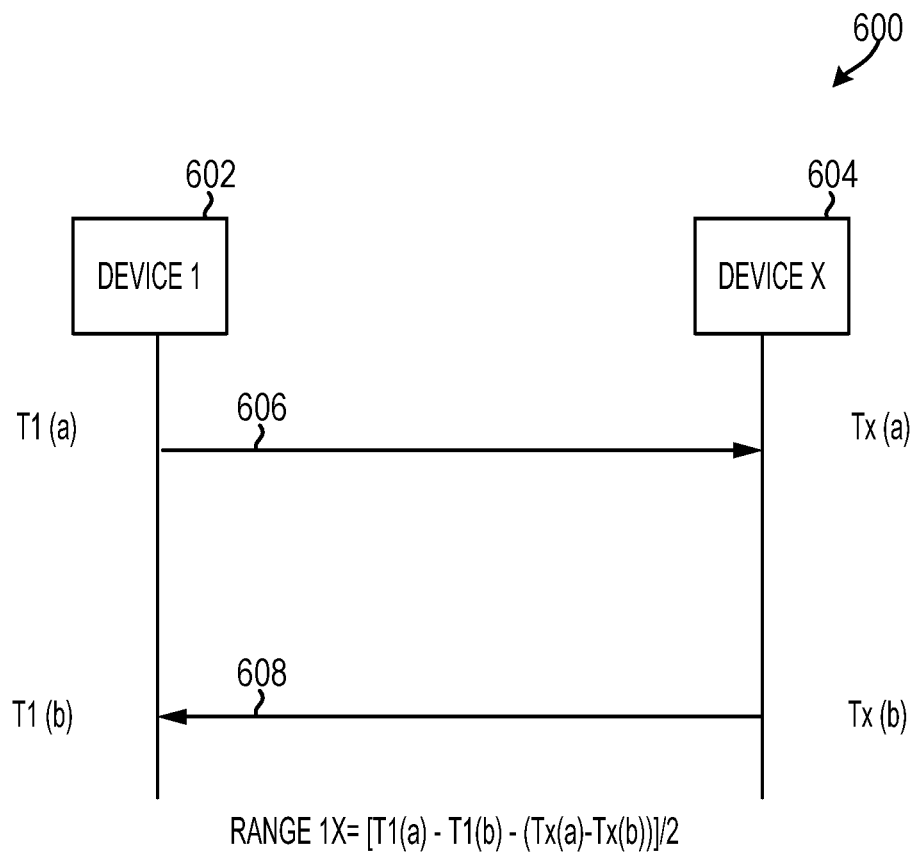
FIG. 6 is a diagram illustrating a method of performing time normalization operations in a system that may be included in an ordnance munition and used to guide the ordnance munition to its target in accordance with the various embodiments.

FIG. 6 illustrates an embodiment system 600 and method for determining the range between two or more ordnance munitions. The illustrated system 600 and method are particularly useful in situations in which there is no external time source from which all the ordnance munitions can synchronize. The illustrated method may be implemented and used by an ordnance munition or intelligent ordnance projectile delivery system where the delay associated with processing a request may be used to achieve pseudo synchronization.

In the example illustrated in FIG. 6, a first ordnance munition 602 sends a request 606 for position updates to an x ordnance munition 604. In this embodiment, x ordnance munition 604 and first ordnance munition 602 do not share a common clock. Therefore, x ordnance munition 604 reports in its response 608 how long it took from the time (Tx(a)) it received the request 606 from first ordnance munition 602 to the time (Tx(b)) it transmitted the response 608 to first ordnance munition 602. That is, x ordnance munition 604 reports the delay (Tx(b)−Tx(a)).

Because first ordnance munition 602 knows the time (T1(a)) it sent the request 606 message to x ordnance munition 604 and the time (T1(b)) it received the response 608 message from x ordnance munition 604, it knows the total time elapsed (T1(b)−T1(a)). By subtracting the delay (Tx(b)−Tx(a)) in x ordnance munition 604 to process the request 606, first ordnance munition 602 can determine the time of flight (TOF) or range between the devices. In the illustrated example, the Range 1X=[T1(a)−T1(b)−(Tx(a)−Tx(b))]/2.

The various embodiments may include an intelligent ordnance projectile delivery system that includes a plurality of ordnance munitions. Each ordnance munition may be equipped with hardware and/or software components that implement targeting and guidance solutions. The targeting and guidance solutions may use eLBS techniques so as to provide high value inputs into the guidance system of the ordnance munition. The targeting and guidance systems may use these high value inputs, in combination with target coordinates, to self-select a target, to self-correct its flight path, and/or to make an in-flight course correction. For example, a guidance system of the ordnance munition may adjust a spoiler control to steer the ordnance munition toward the updated position of its target (or toward a new target, etc.).

Figure 7:
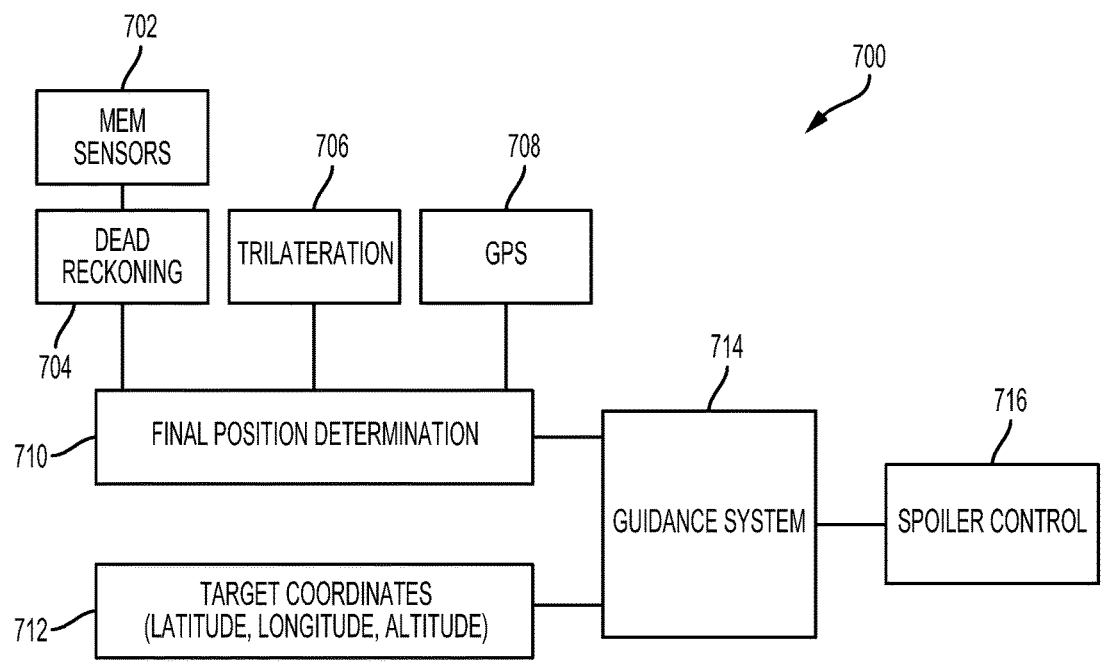
FIG. 7 is a block diagram illustrating components in a system configured to use an enhanced location based services and techniques to determine the final position of an ordnance munition in accordance with the various embodiments.

FIG. 7 illustrates a targeting and guidance system 700 that may be included in an ordnance munition (e.g., ordnance munition 501, etc.) configured use eLBS techniques in accordance with the various embodiments. In the example illustrated in FIG. 7, the system 700 includes microelectromechanical (MEM) sensors 702, a dead reckoning 704 component, a trilateration 706 component, a GPS 708 component, a final position determination 710 component, a target coordinates 712 component, a guidance system 714, and a spoiler control 716 component. Each of these components 702-716 may include hardware, software, firmware, or combinations thereof. The MEM sensors 792 may include accelerometers, gyroscopes, and the like.

In some embodiments, the system 700 may also include geo-spatial positioning sensors (e.g., GPS transceiver, etc.), distance measuring sensors (e.g., a laser, sonic range finder, etc.), orientation sensors (e.g., up, down, level, etc.), sensors for monitoring physical conditions (e.g., vibration, pressure, location, direction, motion, orientation, etc.), a camera, etc. In some embodiments, the system 700 may include one or more processors and memories for receiving information and executing software applications.

In some embodiments, the MEM sensors 702 may be configured to generate or provide dead reckoning location information via the dead reckoning component 704. The system 700 may also use trilateration and GPS information generated via the trilateration 706 component and/or the GPS 708 component. The dead reckoning, trilateration and GPS information units may be used to determine a precise location of the ordnance via the final position determination 710 component, which may generate and store the precise location as a value, waypoint or other information structure in memory. The target coordinates 712 component may be configured to generate, retrieve and/or provide target coordinates (latitude, longitude, and altitude) to the guidance system 714. The guidance system 714 may be configured to use the precise location and the target coordinates to determine whether the flight path of the ordnance munition should be adjusted in order to hit the target and/or to navigate the ordnance munition to a predefined waypoint. If flight path requires adjustment, the guidance system 714 may send signals to the spoiler control 716 component, which in response, performs various operations to extend, retract, rotate or other adjust the spoilers to affect the desired change in flight path.

Figure 8:
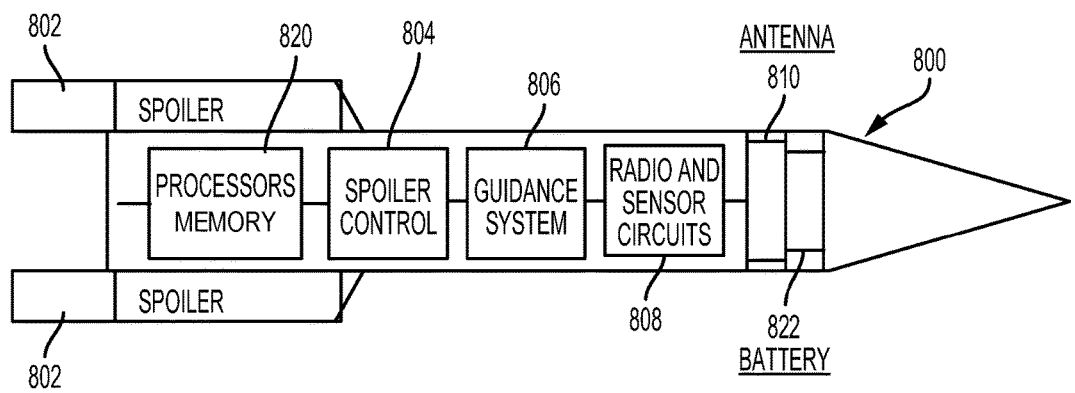
FIG. 8 is an illustration of an ordnance munition that is be equipped with an intelligent navigation and guidance solution for more precise control and delivery of payloads in accordance with the various embodiments.

FIG. 8 is an illustration of an ordnance munition 800 that could be configured in accordance with the various embodiments. In the example illustrated in FIG. 8, the ordnance munition 800 includes a plurality of spoilers 802, a spoiler control 804 component, a guidance system 806, radio and sensor circuits 808, and antennas 810 for external communication. The ordnance munition 800 may also include one or more processors and memory 820 component for executing software applications and/or controlling the operations of the components included in ordnance munition 800.

In various embodiments, the plurality of spoilers 802 may include 2, 3, 4, 5 or 6 spoilers. The antenna 810 may be configured such that the orientation of the antenna 810 or the ordnance munition 800 is not a factor for communication, using a multiple-input and multiple-output or mimo configuration that has antennas which are polarized either vertical, horizontal, cross polarized or circular polarization or a combination of these polarizations. In an embodiment, the antenna 810 may have a circumferential configuration and/or may surround the ordnance munition 800. In an embodiment, the antenna 810 may protected by a radome or other structural weatherproof enclosure that is made of a suitable material. Due to the short life span of the ordnance munition 800, in some embodiments, the processors 820, radio and sensor circuits 808, guidance system 806 and spoiler control 804 may be powered by a battery 822.

In some embodiments, the radio and sensor circuits 808 in the ordnance munition 800 may include communications circuitry for wirelessly connecting ordnance munitions located within a relatively short distance of one another (e.g., 100 meters). The communication circuitry may provide or use a protocol that allows two ordnance munitions 800 to establish a secure communication link and exchange information. In some embodiments, the protocol may require that devices first establish a "trust relationship" before they are allowed to connect to one another. This trust relationship may be established via a pairing process in which a bond is formed between the two ordnance munitions 800. This bond may enable the ordnance munitions 800 to communicate with each other in the future without further authentication.

In some embodiments, the pairing process may be triggered by a specific request to create a bond. An ordnance munition 800 may also automatically trigger or initiate the pairing process each time the ordnance munition 800 is activated, launched or moved within a certain distance of another ordnance munition 800. Each ordnance munition 800 may store pairing information relating to current and previously established pairings in a paired device list (PDL) in the memory. This pairing information may include a name field, an address field, a link key field, and other similar fields useful for authenticating devices and/or establishing communications links.

In some embodiments, the ordnance munitions 800 may be configured to form a wireless personal area networks (also referred to as "ad hoc" or "peer-to-peer" networks). Each ordnance munitions 800 may belong to multiple ad hoc networks at the same time. In some embodiments, the ordnance munitions 800 may implement a master-slave structure in which a single master ordnance munition (referred to herein simply as the "master ordnance") may communicate with a plurality of slave ordnance munitions (herein simply "slave ordnance") in an ad hoc network. A master ordnance may communicate each of the slave ordnance that are within the same network as the master ordnance. In an embodiment, slave ordnance may communicate with the master ordnance, and the communications between two or more slave ordnance may be facilitated by the master ordnance. The master and slave ordnance munitions may have asymmetrical roles. An ordnance munitions 800 may simultaneously operate as a master ordnance in a first ad-hoc network and a slave ordnance in a second ad-hoc network.

In various embodiments, the ordnance munition 800 may be a short-range ballistic missile (SRBM), a medium-range ballistic missile (MRBM), an intermediate-range ballistic missile (IRBM), and intercontinental ballistic missile (ICBM), a submarine-launched ballistic missile (SLBM), a single stage missile, a multiple-stage missile, land-mobile launched missile, a silo launched missile, a missile equipped with multiple independently targetable reentry vehicles (MIRVs), a solid propellant rocket propulsion system missile, a liquid propellant rocket propulsion system missile, or any combination thereof. In some embodiments, the ordnance munition 800 may be a mortar fired exploding shell/round, such as an M252 81 mm medium weight mortar round or an Advanced Capability Extended Range Mortar (ACERM) round that includes GPS navigation, a laser seeker, infrared illumination (IR), and an advanced warhead or payload.

In some embodiments, the radio and sensor circuits 808 in the ordnance munition 800 may include one or more sensors for monitoring physical conditions (e.g., location, motion, acceleration, orientation, altitude, temperature, etc.). The radio and sensor circuits 808 in the ordnance munition 800 may also include any or all of a gyroscope, an accelerometer, a magnetometer, a magnetic compass, an altimeter, an odometer, and a pressure sensor. The sensors may also include various bio-sensors (e.g., carbon sensor, oxygen sensor, etc.) for collecting information pertaining to environment. In an embodiment, the ordnance munition 800 may include multiples of each sensor (e.g., two accelerometers, two gyroscopes, etc.).

In some embodiments, the radio and sensor circuits 808 in the ordnance munition 800 may include various additional or independent components/sensors for determining the geographic position/location, such as components for determining the radio signal delays (e.g., with respect to cell-ordnance towers and/or cell sites), performing trilateration and/or multilateration operations, identifying proximity to known networks (e.g., Bluetooth® networks, WLAN networks, WiFi, etc.), and/or for implementing other known geographic location technologies.

The processors and memory 820 component may store various different types of information about the ordnance munition 800. For example, the processors and memory 820 component may store values identifying the ordnance type and various characteristics of the ordnance, such as maximum range, effective range, blast radius, propellant type (e.g., solid or liquid, etc.), number of stages (e.g., single stage, multiple-stage, etc.), priority, rank, accuracy rating, etc. In some embodiments, the processors and memory 820 component may store a grid system or targeting grid, which may be an information structure (e.g., array, vector, map, etc.) or representation of a two-dimensional or three-dimensional target area.

In some embodiments, the ordnance munition 800 may include a tail unit, a main body that includes a payload cavity for receiving a payload, a fuse or detonator, and an explosive train operably connected to the fuse. In some embodiments the ordnance munition 800 may include a payload cavity that includes a payload, which may include an ordnance, ammunition, explosive materials, canisters, spheroids, flechettes or pointed steel projectiles, gun powder, rocket fuel, bombs, reactive materials, an oxidizing agent such as a fluoropolymer, metal liners or fragments, a warhead, metal powder, a halogen-containing polymer powder, and/or other similar materials or components known in the art.

The following examples (e.g., example described with reference to FIGS. 9 and 10) illustrate and explain how an example ordnance munition configured in accordance with the various embodiments may intelligently utilize eLBS techniques to locate its target. In a live fire situation, the enemy combatants could use a protected structure or any structure to hide. By intelligently utilizing eLBS techniques to precisely guide ordnance munitions to their target, the various embodiments reduce the effectiveness of hiding behind such structures.

Figure 9:
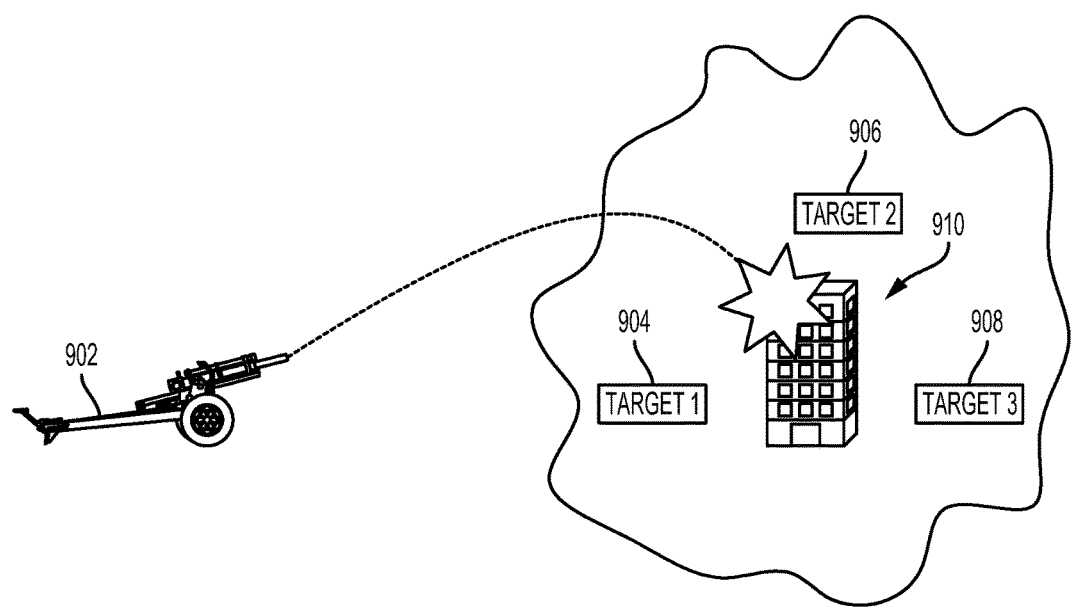
FIG. 9 is a block diagram illustrating components in a system that is configured to deliver an ordnance munition in accordance with an embodiment in which the intelligent navigation and guidance solution has not been activated.

FIG. 9 illustrates an ordnance munition that is fired from an artillery piece, in the form of a howitzer 902 (e.g., an M198 howitzer, M109 howitzer, etc.), toward a group of targets 904, 906, 908. The targets 904, 906, 908 are located near a building 910. In this example, multiple reasons, such as poor visibility, time to target and ranging issues, may contribute to any or all of the targets 904, 906, 908 being missed, and the building 910 being hit. Missing the targets 904, 906, 908 may cause collateral damage to the building 910 which, preferably, was to be left undamaged (since it is not a target itself).

Figure 10:
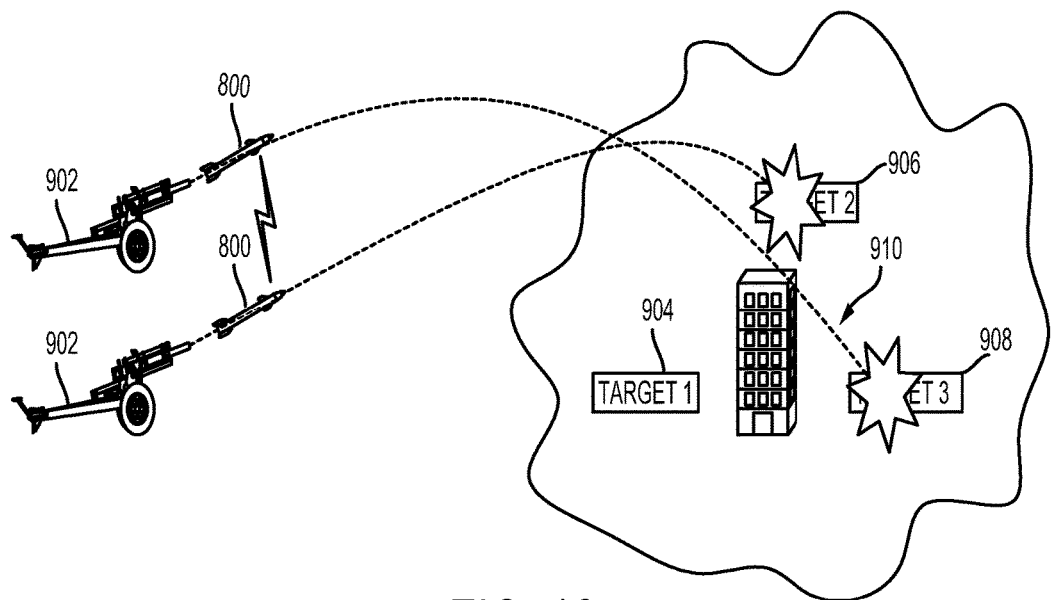
FIG. 10 is a block diagram illustrating components in a system that is configured to deliver ordnance munitions in accordance with an embodiment in which intelligent navigation and guidance solutions have been activated.

In the example illustrated in FIG. 10, a similar situation as FIG. 9 is depicted. However, in the example illustrated in FIG. 10, an artillery battery in the form of two howitzers 902 fire a plurality of ordnance munitions 800 towards targets 904, 906, 908. Each of the ordnance munitions 800 include a targeting and guidance system (e.g., guidance system 806 illustrated in FIG. 8, etc.) that implements or uses eLBS techniques to make in-flight course corrections. As a result, the ordnance munitions 800 successfully destroy their intended targets 906 with little or no collateral damage to the building 910.

In the example illustrated in FIG. 10, the coordinates of both target 906 and target 908 may be given to, sent to, or programmed in each of the ordnance munitions 800. The coordinates may be provided by a forward observer or via positions provided by a rear command Other possible sources of coordinates are discussed in more detail below.

In some embodiments, the ordnance munitions 800 may be configured so that the troops may point the artillery battery in the general direction (e.g., to within 30 degrees, etc.) of the targets 904, 906, 908 such that they do not expose their position to their targets for any significant length of time. That is, since the ordnance munitions 800 make intelligent course correction decisions in flight, they do not have to be fired directly towards their intended target. This reduces their visibility to their target.

Figure 11:
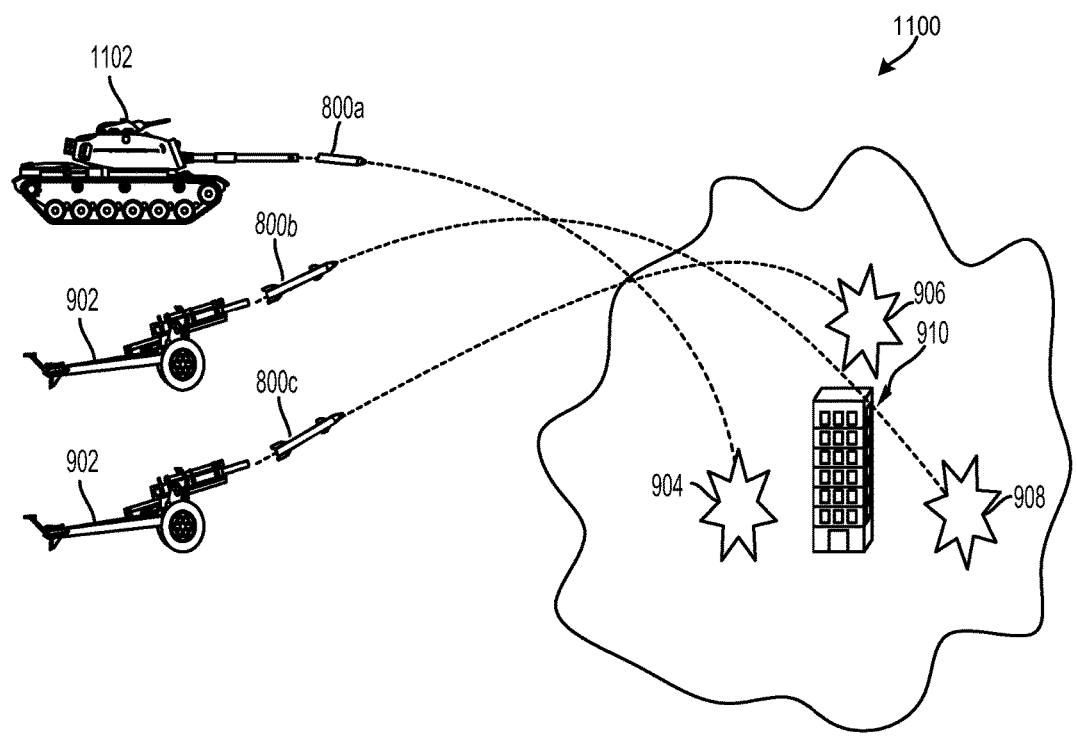
FIG. 11 is a block diagram illustrating additional components included in a system that may be configured to deliver ordnance munitions in accordance with the various embodiments.

FIG. 11 illustrates that different types of ordnance munitions may be configured to communicate and/or use eLBS techniques to dynamically select their targets and make in flight course corrections. In the example illustrated in FIG. 11, the system 1100 includes a tank 1102, two howitzers 902, three targets 904, 906, 908, and a building 910. The tank 1102 fires a first ordnance munition 800a that is of a first munition type, and the howitzers 902 each fire an ordnance munition 800b that is of a second munition type. In the illustrated example, the first munition type has a shorter range and/or a flatter flight trajectory than the second munition type.

The ordnance munitions 800a, 800b and 800c may include processors and communications circuitry, and may be configured to communicate and coordinate their operations so that the best equipped ordnance is selected for a given target. For example, during flight, the ordnance munitions 800a, 800b, 800c may collaborate to determine that the first type of ordnance munition 800a has a shorter range than other ordnance munitions 800b and 800c. The ordnance munitions 800a, 800b, 800c may also determine that the first target 904 is the closest target, and select the first target 904 for first ordnance munition 800a. In response, the ordnance munition 800a may alter its flight path to hit the first target 904. The remaining two ordnance munitions 800b and 800c may further collaborate to intelligently select one of second and third targets 906, 908, and update their flight paths to hit their respective targets. In this example, all three targets, 904, 906, 908 are destroyed, yet the building 910 is left undamaged.

In some embodiments, each ordnance munition 800 in an intelligent ordnance projectile delivery system may include a priority or rank value that may be used for conflict resolution. In some embodiments, one ordnance munition 800 in the intelligent ordnance projectile delivery system may be a master ordnance, and the remaining ordnance munition 800 in the intelligent ordnance projectile delivery system may be slave ordinances. If the master ordnance detonates or otherwise loses communication with the group, one of the slave ordinance in the system may transition into the master role. In an embodiment, the slave ordinances may transition into the master role based on the priority or rank.

In some embodiments, each ordnance munition 800 may include or use a targeting grid or a grid system, such as those illustrated in FIGS. 12, 13A-E, and 14A-14D. The grid system or targeting grid may be used by the targeting and guidance system of an ordnance munition 800 for target selection and navigation. In some embodiments, the grid system or targeting grid may be an information structure or representation of a two-dimensional or three-dimensional area.

Figure 12:
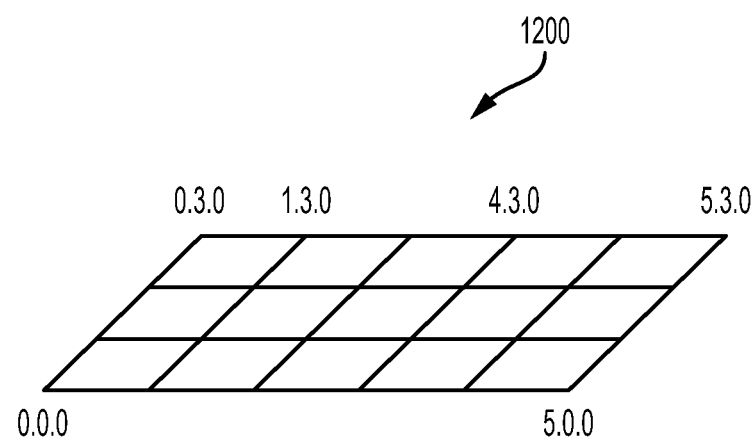
FIG. 12 is a block diagram illustrating an example two-dimensional grid system that could be used to deliver ordnance munitions in accordance with some embodiments.

FIG. 12 illustrates an example of a two-dimensional grid system 1200 that could be used for the delivery of an ordnance munition (e.g., ordnance munitions 800 illustrated in FIG. 8) in accordance with in an embodiment.

The two-dimensional grid system 1200 may be used by ordnance munitions and other components in an intelligent ordnance projectile delivery system to deliver improved lethality per ordnance payload. In the example illustrated in FIG. 12, the two-dimensional grid system 1200 includes four corner blocks and a plurality of middle blocks. The first corner block is labeled with coordinates 0.0.0. The second corner block has coordinates 0.3.0, the third corner block has coordinates 5.3.0, and the forth corner block has coordinates 5.0.0. The middle blocks include similar coordinates (e.g., 1.3.0, 4.3.0, etc.). An ordnance munition 800 may be configured to select one of the coordinate blocks as its target for the delivery of its payload.

Figure 13A:
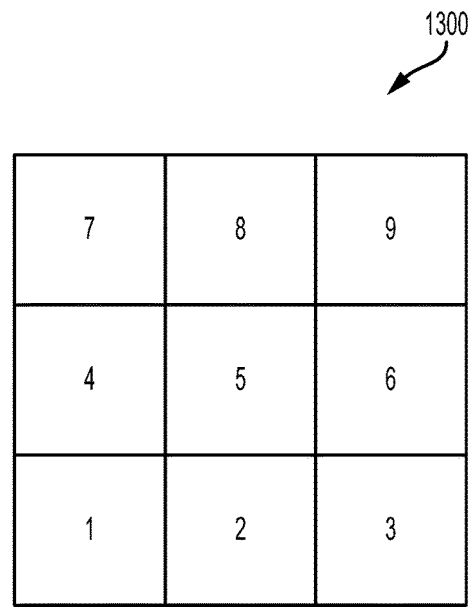
FIG. 13A is a block diagram illustrating an advanced two-dimensional grid system that may be used to deliver ordnance munitions in accordance with some embodiments.
Figure 13B:
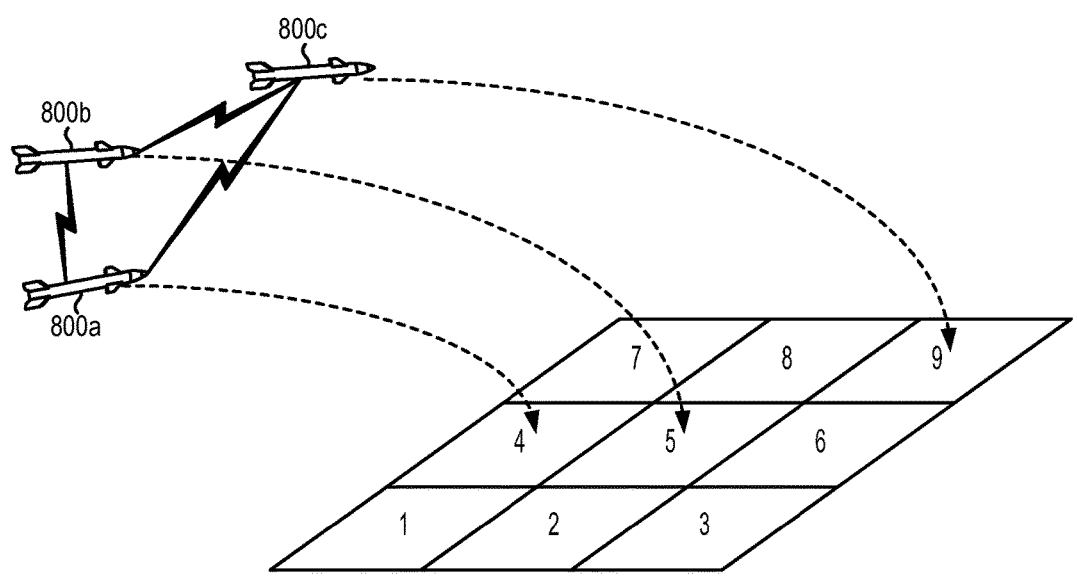
FIG. 13B through 13E are block diagrams that illustrate different uses of the advanced two-dimensional grid system for the delivery of ordnance munitions in accordance with various embodiments.
Figure 13C:
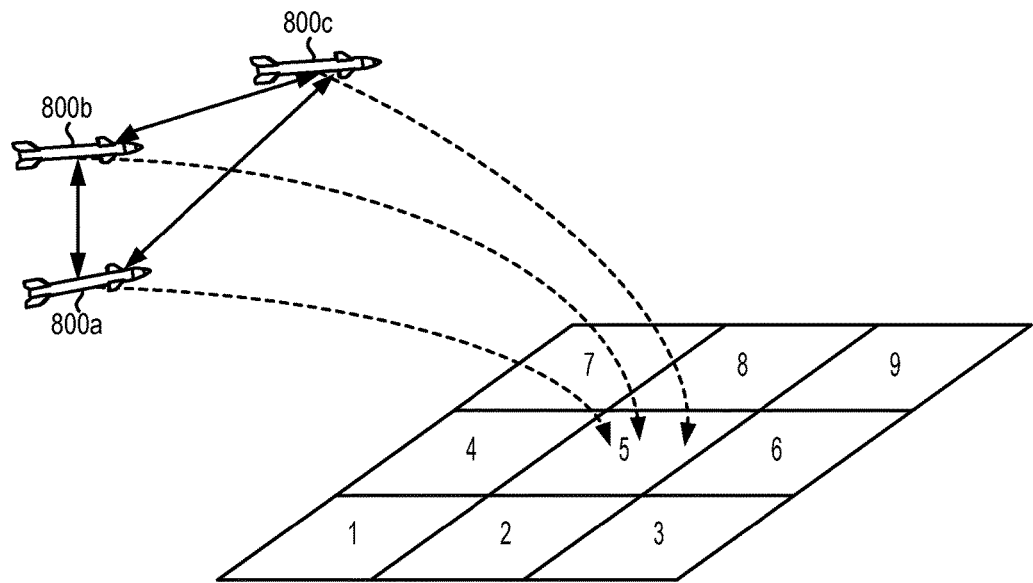

FIG. 13A illustrates another two-dimensional dimensional grid system 1300 that may be used according to the various embodiments. The two-dimensional dimensional grid system 1300 may be generated, programmed, stored, updated, and used by any or all of the components in the intelligent ordnance projectile delivery system, including each of the ordnance munitions 800. In an embodiment, the grid system 1300 may be a meter-by-meter grid representation of a physical area. In an embodiment, each of the grid positions 1 through 9 may represent a one square meter area of land. Smaller and larger grid sizes may be used, and the grid system 1300 need not be organized as squares. For example, the grid system 1300 may be organized as rectangles, hexagons or any other regular shape.

FIGS. 13B-13E illustrate examples of the use of two-dimensional grid system of FIG. 13A. In the example illustrated in FIG. 13B, three ordnance munitions 800a, 800b, 800c strike the two-dimensional dimensional grid system 1300 at positions 4, 5, and 9, respectively. In an embodiment, the ordnance munitions 800a, 800b, 800c may obtain their target information and coordinates prior to launch. In another embodiment, the ordnance munitions 800a, 800b, 800c may obtain their target information and coordinates in-flight. In either case, each ordnance munition 800a, 800b, 800c may adjust for latitude, longitude, and altitude (e.g., by performing eLBS operations) and/or make other target selection and/or course corrections while in flight and traveling toward the targets.

In some embodiments, the ordnance munitions 800a, 800b, 800c may collaborate and coordinate their operations so that a higher level of ordnance (e.g., a more powerful or penetrating ordnance, etc.) is directed on a specific target, such as a hardened target or a building or installation that has extra security features (e.g., a reinforced concrete bunker, etc.).

In an embodiment, the ordnance munitions 800a, 800b, 800c may be configured to coordinate their operations and adjust their flight paths so that they all hit precisely the same target location (within one meter) at slightly different times and/or in quick succession. In the example illustrated in FIG. 13C, all three ordnance munitions 800a, 800b, 800c make in-flight course corrections such that they all strike the grid system 1300 at position 5. This allows the ordnance munitions 800a, 800b, 800c to better penetrate hardened targets, targets buried deep underground, and other similar defensive military fortifications.

Figure 13D:
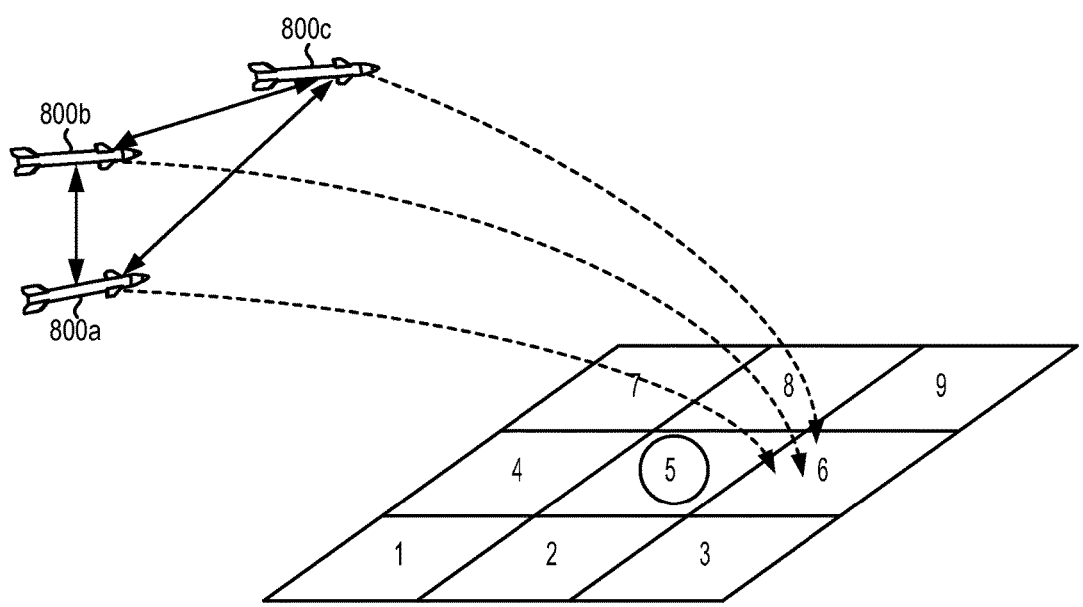

FIG. 13D illustrates and example in which the three ordnance munition 800a, 800b, 800c have an initial target at position 5 of the grid system 1300, but adjust their flight path during flight so that they all strike the grid system 1300 at position 6. The ordnance munitions 800a, 800b, 800c may strike position 6 in the grid system 1300 at the same time or at slightly different times (e.g., in quick succession, etc.). The ordnance munitions 800a, 800b, 800c may adjust their flight path in this manner to hit, for example, a moving target and/or to account for errors or inaccuracies in the original coordinates.

Figure 13E:
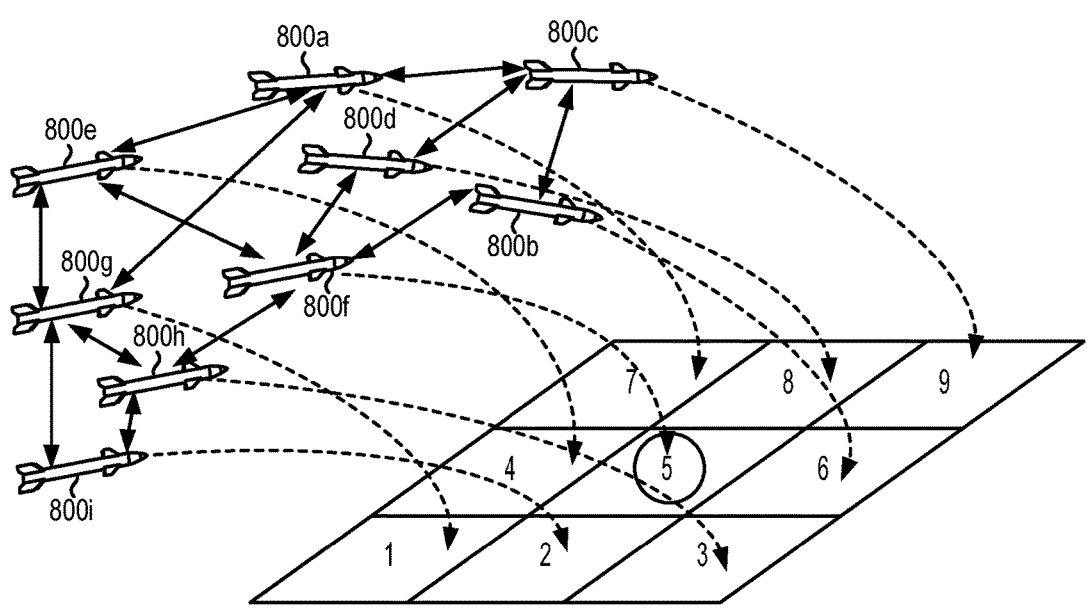

FIG. 13E illustrates that many ordnance munitions 800a through 800i (i.e. nine in this illustration) may launched towards a single initial target (position 5 of the grid system 1300 in FIG. 13E). The many ordnance munitions 800a through 800i may communicate in-flight to coordinate the delivery of their payloads, and adjust their flight paths so as to uniformly spread the damage across a target or grid system 1300. In the example illustrated in FIG. 13E, each of the ordnance munitions 800a through 800i selects one of grid positions 1 through 9 such that all nine positions/blocks in the grid system are hit at the same time or in quick succession.

In an embodiment, all of the ordnance munitions 800a through 800i may be fired from a single location (e.g., towards position 5 of the grid system 1300) and their flight paths adjusted during flight (e.g., towards one of grid positions 1 through 9 of the grid system 1300) to uniformly spread the damage. In an alternative embodiment, the many ordnance munitions 800a through 800i may be fired from different locations and their flight paths adjusted during flight to uniformly spread the damage.

In an embodiment, a three-dimensional targeting system or grid system may be used. Using a three-dimensional targeting system allows the ordnance spread to be in three dimensions. In these embodiments, some of the ordnance munitions may be adjusted so a target box or grid is defined with a defined spread. The spread may be determined either beforehand or in flight by the local ground forces. The spread may be determined locally or remotely.

Figure 14A:
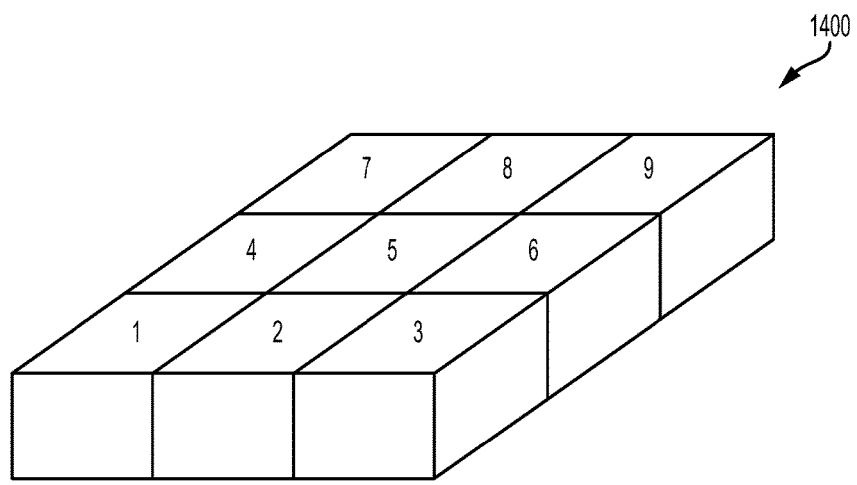
FIG. 14A is a block diagram illustrating an advanced three-dimensional grid system that may be used to deliver ordnance munitions in accordance with some embodiments.
Figure 14B:
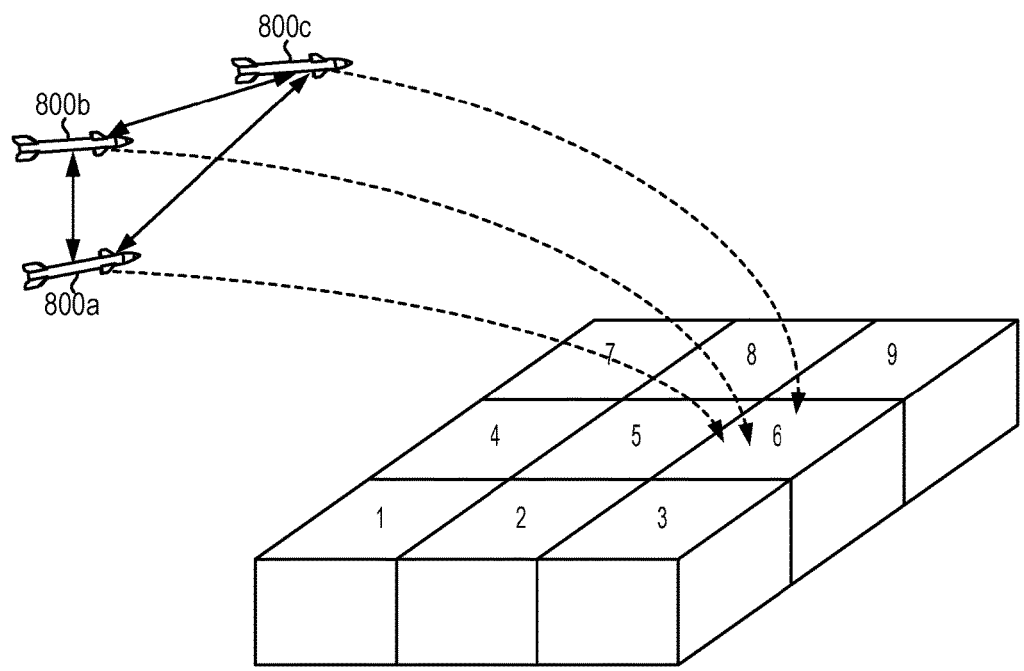
FIG. 14B through 14D are block diagrams that illustrate different uses of the advanced three-dimensional grid system for the delivery of ordnance munitions in accordance with various embodiments.
Figure 14C:
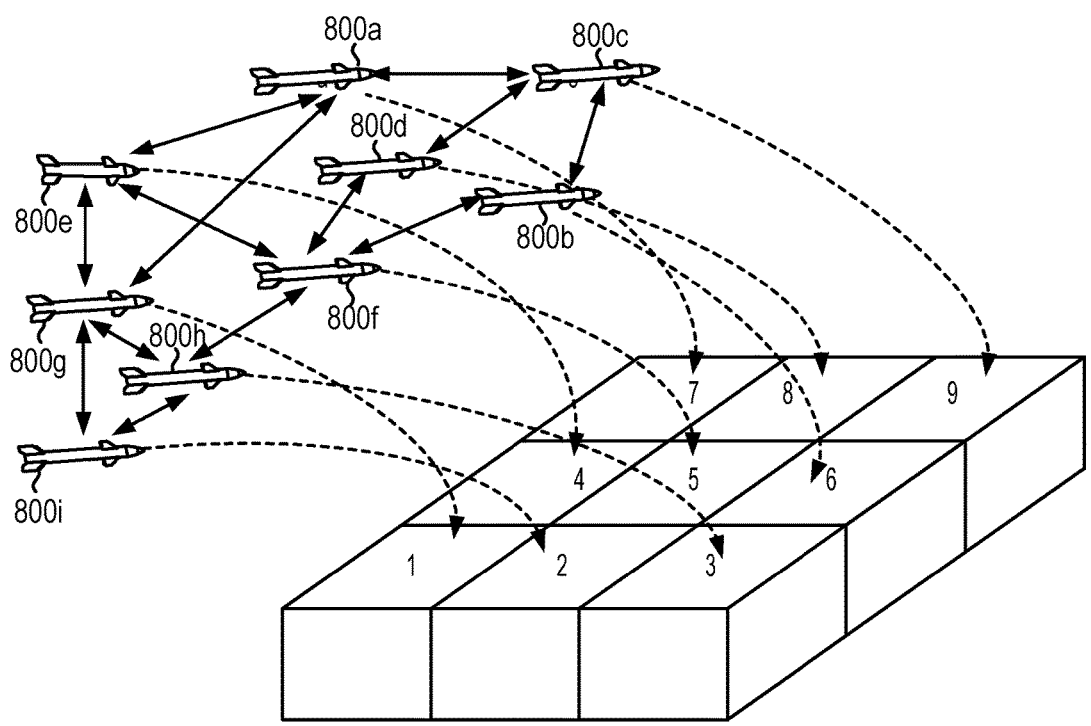
Figure 14D:
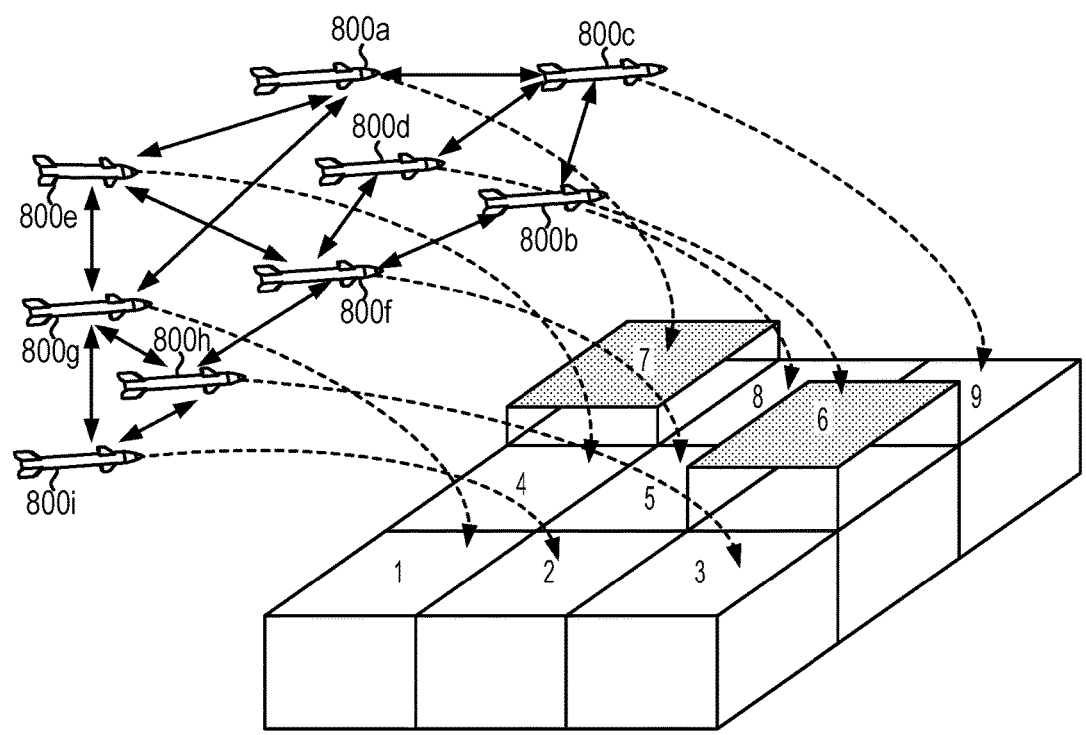

FIG. 14A illustrates an example of a three-dimensional grid system 1400 according to an embodiment. FIGS. 14B-14D are examples of use of the three-dimensional grid system 1400 of FIG. 14A.

FIG. 14B is an example of multiple ordnance munitions 800a, 800b, 800c coordinating their operations to strike a target at position 6 of the three-dimensional grid system 1400. FIG. 14C illustrates that many ordnance munitions 800a through 800i may communicate in-flight to coordinate the delivery of their payloads, and adjust their flight paths so as to uniformly spread the damage across a target or three-dimensional grid system 1400. FIG. 14D is similar to FIG. 14C, but illustrates that target selection and delivery of multiple ordnance munitions may factor in terrain differences, which may be represented in the grid. In the example illustrated in FIG. 14D, the three-dimensional grid system 1400 includes terrain data and/or identifies and accounts for terrain differences in blocks 6 and 7.

The ordnance munitions 800 may be configured to operate so as to allow target-coordinate-information of each of the ordnance munitions 800a through 800i to be updated while in flight.

In some embodiments, ordnance munitions 800a through 800i may include, elect, negotiate or select a master node (e.g., master ordnance munitions 800). The master node may have access to all the coordinates for the designated targets or destinations. The master node may be the master coordinator for in flight adjustments and target assignments of ordnance munitions 800a through 800i. The master node may allow real time adjustments to take place during the final stages of the delivery process for each of ordnance munitions 800a through 800i.

The three-dimensional grid system 1400 may allow various ordnance munitions to coordinate with each other using eLBS, thereby improving their positional information. This, in turn, enables the ability to make course corrections in flight using each other to improve their trajectories based on where each ordnance munition believes it is and with respect to each other ordnance munition. Velocity and acceleration (which may include gravitational pull, etc.) information may be factored in, which may be provided in three (3) dimensions to a localized Kalman filter as part of the covariant matrix. The Kalman filter may use this information to generate more accurate location information or eLBS information.

Figure 15:
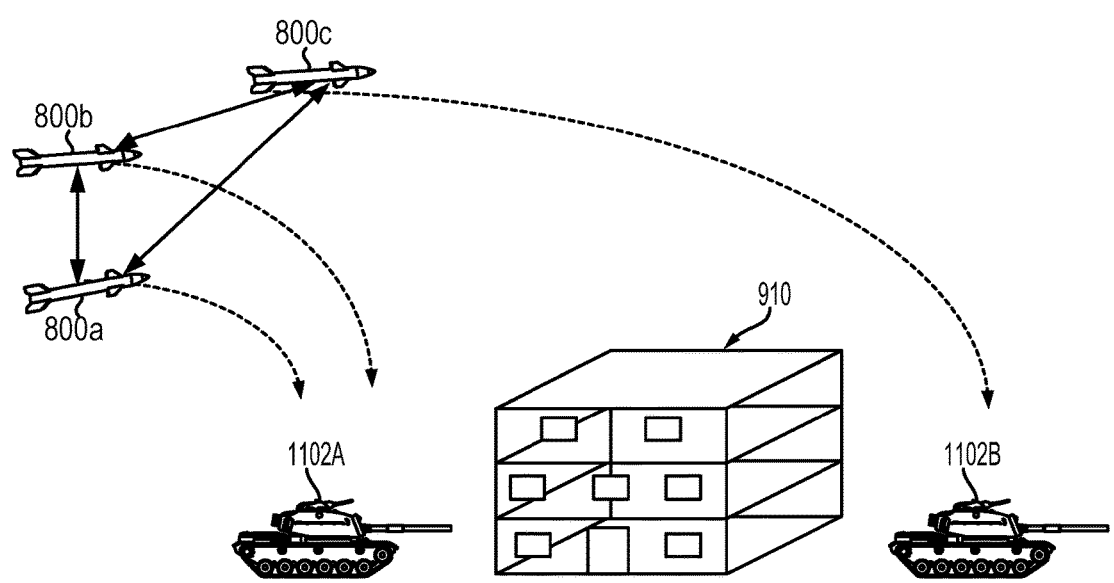
FIG. 15 is a block diagram illustrating various components, communication links, and information flows in a system configured to deliver ordnance munitions so as to avoid collateral damage when targeting combatants in accordance with the various embodiments.

FIG. 15 illustrates an intelligent ordnance projectile delivery system that includes ordnance munitions 800a, 800b, 800c configured to collaborate to avoid collateral damage when targeting combatants. The system includes a first ordnance munition 800a, a second ordnance munition 800b, and a third ordnance munitions 800c that are in-flight and traveling towards a first tank 1102A and a second tank 1102B. Building 910 is an obstacle that is susceptible to collateral damage. Using terrain data, the third ordnance munition 800c is targeted for the second tank 1102B, while the first and second ordnance munitions 800a and 800b target the first tank 1102A.

Figure 16:
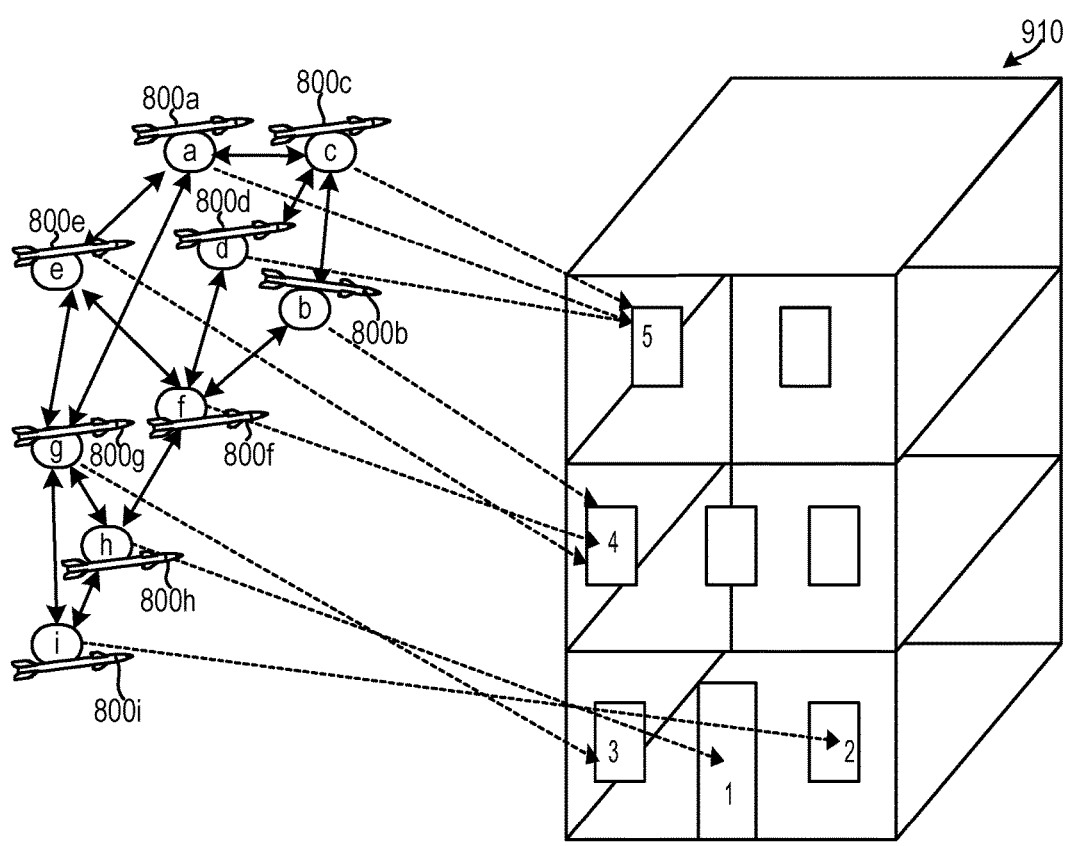
FIG. 16 is a block diagram illustrating various components, communication links, and information flows in a system configured to accurately deliver ordnance munitions to specific areas in a three-dimensional target.

FIG. 16 illustrates an example where a target can be defined as a three-dimensional target, such as a building 910, and ordnance munitions 800a through 800i may be delivered to different parts of the building 910 to achieve greater effect. In the example illustrated in FIG. 16, ordnance munitions 800a, 800b and 800d update their flight paths to hit target position 5 on the third floor of the building 910. Ordnance munitions 800b, 800e and 800f update their flight paths to hit target position 4 on the second floor of the building 910. Ordnance munitions 800h, 800i and 800g update their flight paths to hit target grid positions 1, 2 and 3, respectively, on the first floor of the building 910. The ordnance munitions 800a through 800i may coordinate their operations so that target grid positions 1 through 5 are hit at the same time or in quick succession. The ordnance munitions 800a through 800i may also coordinate their operations so that target grid positions 1 through 5 are hit in a specific order. For example, the ordnance munitions 800a through 800i may coordinate their operations so that ordnance munitions 800a, 800b and 800d hit target position 5 on the third floor of the building 910 before (e.g., 1 second before, 10 second before, 1 minute before, 5 minutes before, etc.) 800b, 800e and 800f hit target position 4 on the second floor of the building 910.

In some embodiments, eLBS may be used with small drones for the performance of reconnaissance. The drone may be informed of the location that is desired to be observed. Alternatively, eLBS may be used with small drones via a local control or remote (a command center) to report back a latitude, longitude, and altitude coordinates in GPS stressed environments.

Figure 17:
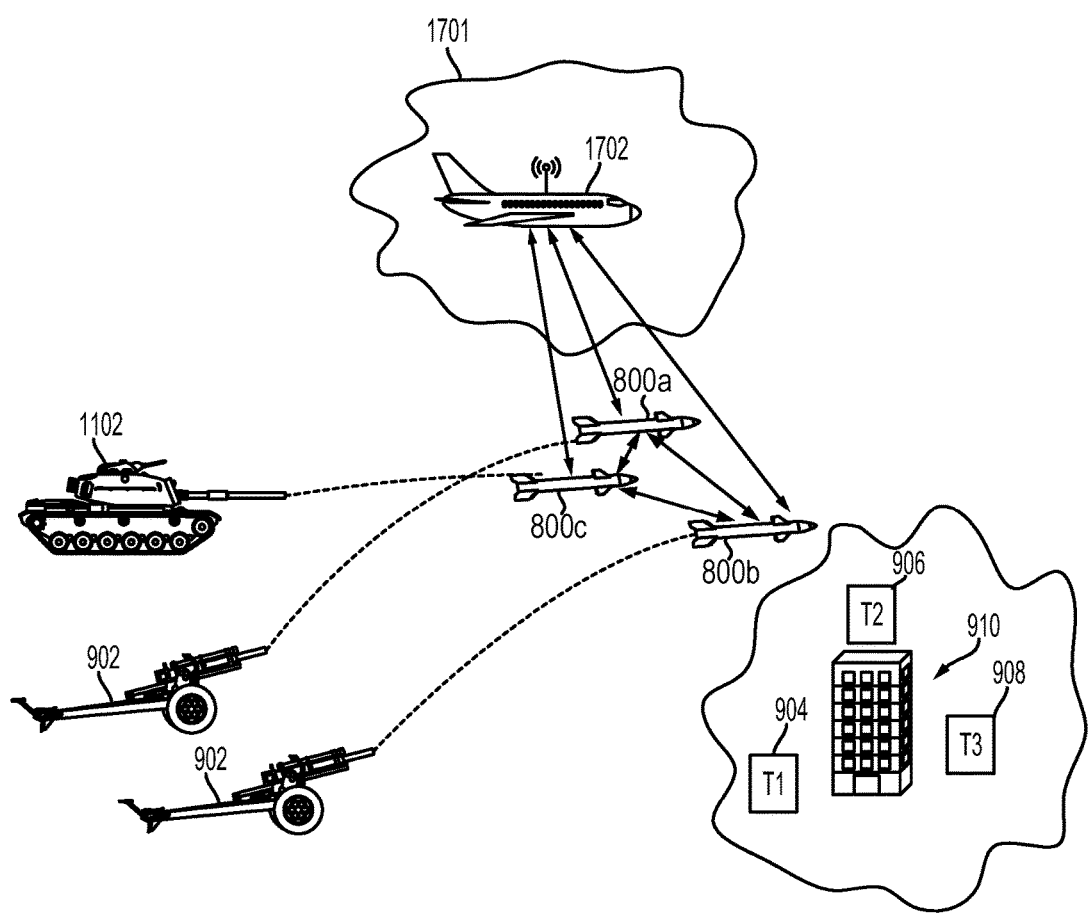
FIG. 17 is a block diagram illustrating various components, communication links, and information flows in a system configured to use an in-flight network for the command and control of ordnance munitions according in accordance with the various embodiments.

FIG. 17 illustrates an embodiment in which the ordnance munitions 800a, 800b, 800c may connect to a LTE network 1701 that covers the associated theatre (e.g., battlefield or area in which the mission is to take place, etc.). At launch, the ordnance munitions 800a, 800b, 800c may have coordinates for the potential target or targets. Alternatively, the ordnance munitions 800a, 800b, 800c may be launched prior to obtaining target coordinates. When activated, the ordnance munitions 800a, 800b, 800c, which may be fired from a variety of sources (e.g., howitzers 902, tanks 1102, etc.), begin communicating via the LTE network 1701. The LTE network 1701 may be located in and/or provided via an AWACS, UAV or high altitude drone 1702. The LTE network 1701 could also be terrestrial based and be part of a commercial or private wireless network. The LTE network 1701 may also include various communication links and means that are provided via satellites, such as GEO, MEO or LEO.

Each of ordnance munitions 800a, 800b, 800c, through connectivity with LTE network 1701, may receive its target coordinates from command and control for the theatre operations or from the personnel on the ground that could be one of the teams launching the ordnance or participating as a forward observer. The ordnance munitions 800a, 800b, 800c may obtain a three-dimensional target coordinates and compute their paths to the desired target. The ordnance munitions also make themselves available to communicate with other ordnance munitions for the purpose of improving in-flight position location information so as to improve the ability to navigate to the intended target. In an embodiment, one of ordnance munitions 800a, 800b, 800c may be configured to determine, during flight, that its primary target is not obtainable and select a secondary or alternative target that has been provided to it. Alternatively, one of ordnance munitions 800a, 800b, 800c, based on its reported telemetry to the local control or command, may be redirected to an alternative target based on current trajectory calculations, which may include trajectory adjustments that are possible for that particular ordnance munition (800a, 800b, or 800c).

Figure 18A:
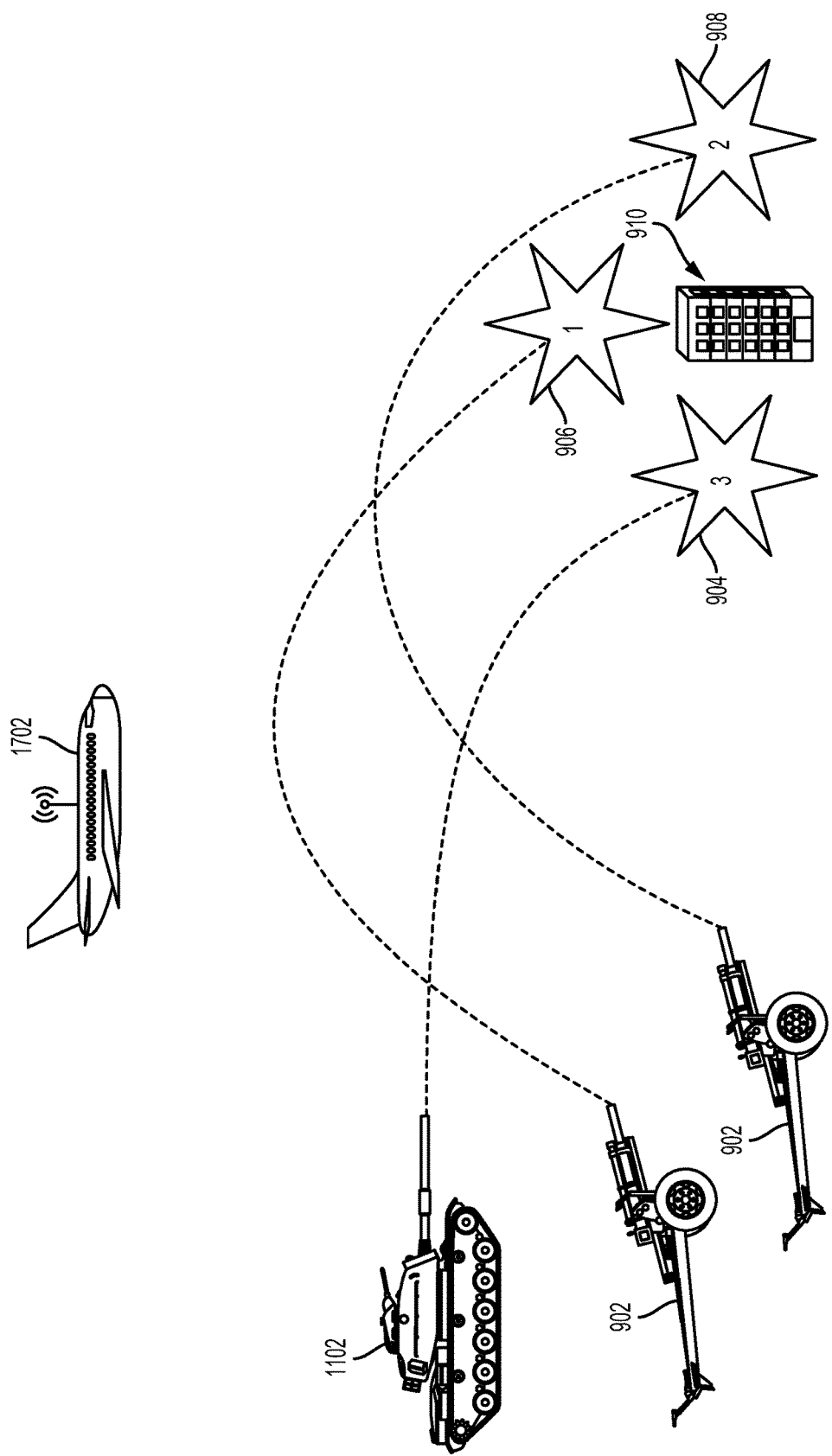
FIGS. 18A and 18B are block diagrams illustrating various additional or alternative components, communication links, and information flows that may be included and used in a system that is configured to use in-flight networking techniques to intelligently deliver ordnance munitions according in accordance with the various embodiments.

FIG. 18A depicts that situation where the ordnance munitions 800a, 800b, 800c from FIG. 17 communicate and collaborate for better in-flight path correction and/or so as to best deploy the available ordnance munitions 800a, 800b, 800c on the intended targets 904, 906, 908 for maximum effectiveness. In this embodiment, all three intended targets 904, 906, 908 are destroyed while the building 910 is left undamaged.

Figure 18B:
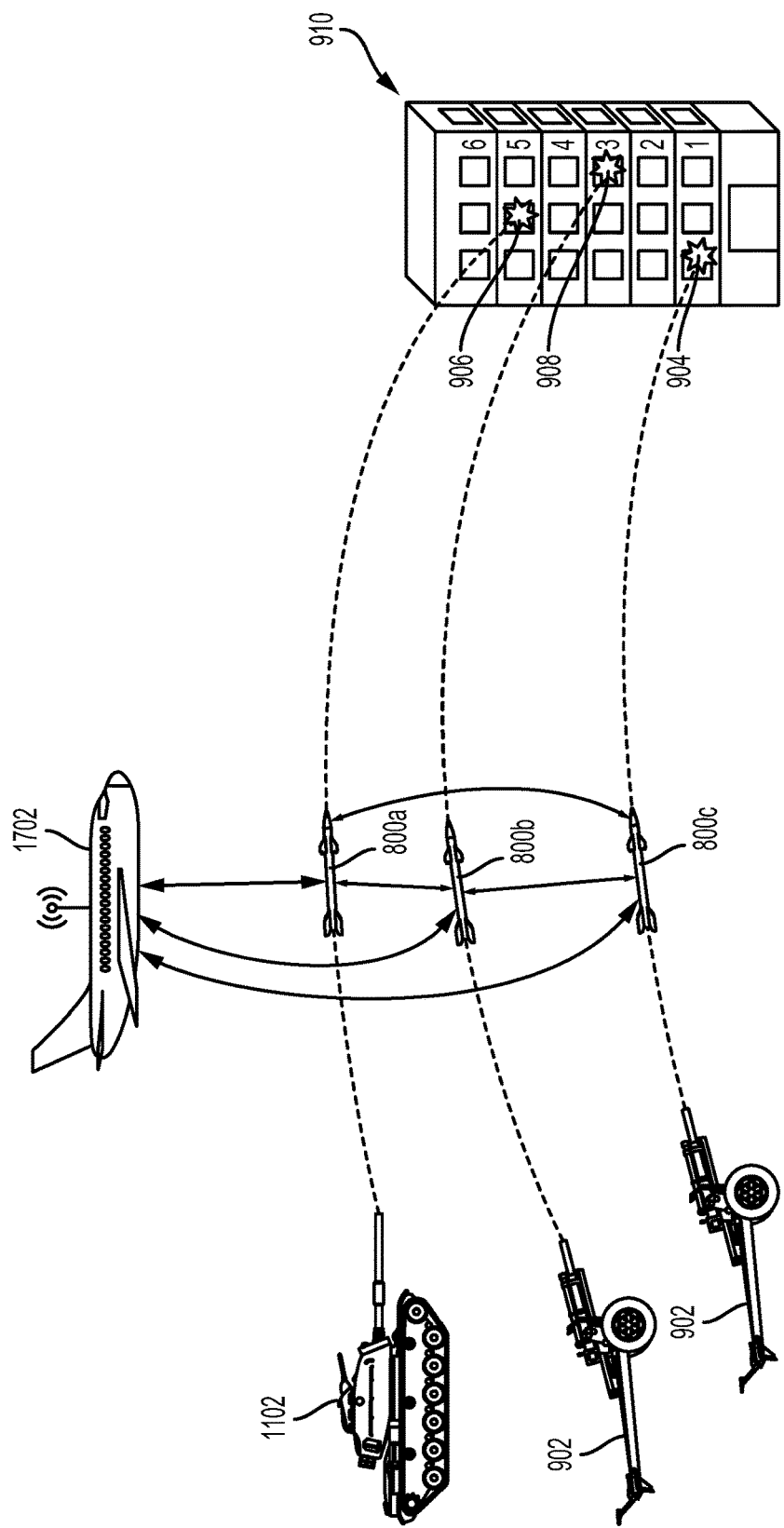

FIG. 18B illustrates an embodiment where the ordnance munitions 800a, 800b, 800c from FIG. 17 are coordinated to strike multiple different targets 904, 906, 908 in the same building 910. As illustrated, the ordnance munitions 800a, 800b, 800c may be directed to strike targets on different levels/floors of the building 910. In particular, ordnance munition 800a strikes target 906 on the fifth floor of the building 910, ordnance munition 800b strikes target 908 on the third floor of the building 910, and ordnance munition 800c strikes target 904 on the first floor of the building 910.

The embodiment for FIG. 18A depicts the ordnance munition 800a, 800b, 800c can use targeting information it was initially provided with by the local or forward observer with desired ranking of target values.

The embodiment for FIG. 18B depicts the ordnance munition 800a, 800b, 800c can either have (or not have) targeting information and the targeting information is provided by command and control where either the desired targets are given to the ordnance munition or reacquisition or new targets based on current situations are provided to the ordnance munition.

eLBS may also be used with small drones for the purpose of delivering an ordnance payload in tunnels or in selected areas of an existing building. eLBS in conjunction with a navigation system, e.g. AWACS, UAV, drone, may be used navigate to specific location, such as inside a tunnel location for delivery of the ordnance. With eLBS sending multiple drones is also possible and can be used to improve the positional accuracy as well as the payload delivery success.

Figure 19:
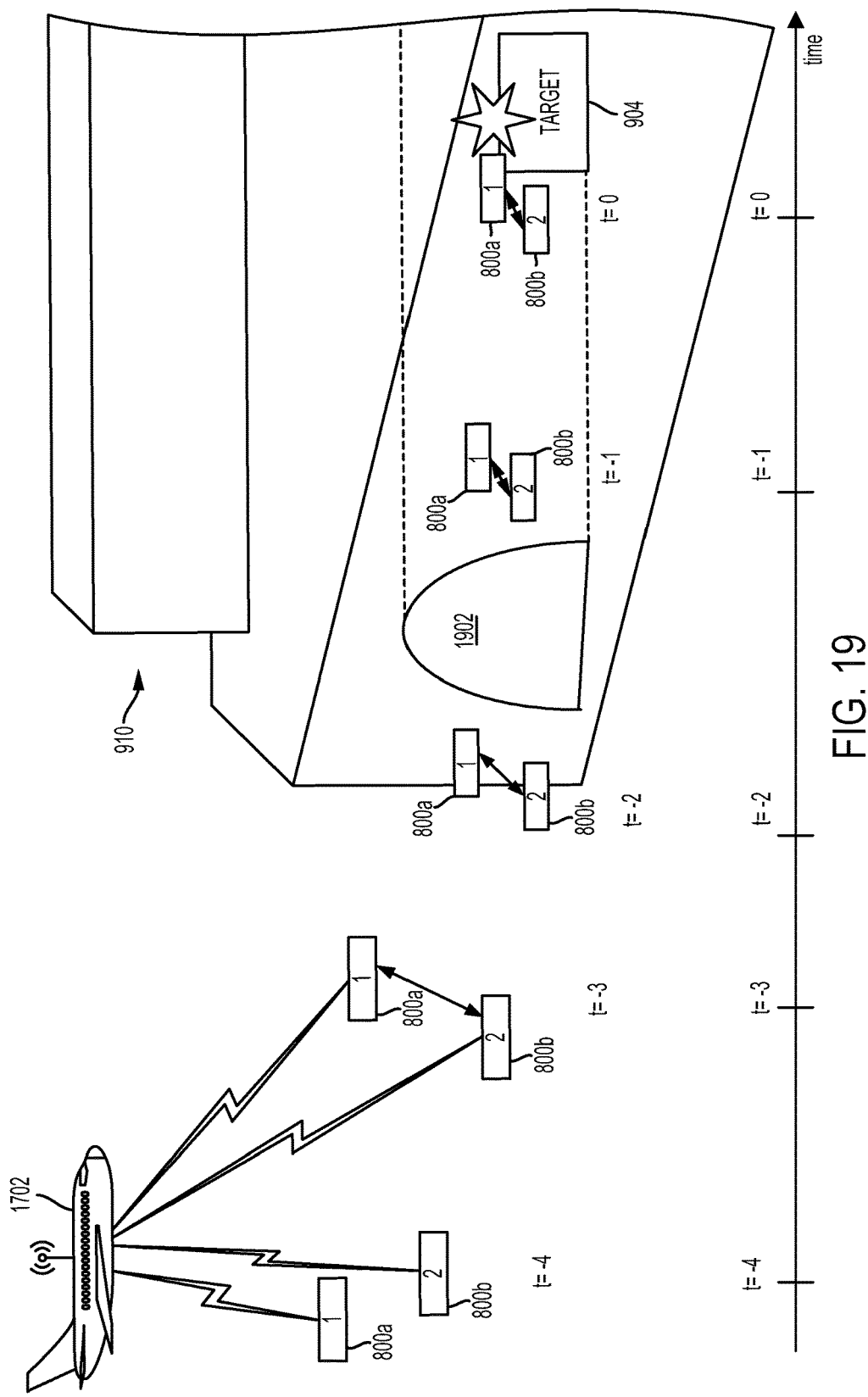
FIGS. 19 and 20 are block diagrams illustrating various components, communication links, and information flows in a system configured to use an in-flight network for the command and control of ordnance munitions, such as missiles, ordnance equipped drones or a reconnaissance drones, for at or below grade delivery in accordance with some embodiments.

FIG. 19 illustrates an example of ordnance munitions 800a and 800b (labeled as 1 and 2 in FIG. 19), each of which may be a projectile or a drone carrying a payload, ordnance, or reconnaissance equipment. In FIG. 19, the ordnance munitions 800a and 800b are carrying a payload or ordnance. At time t−4, the ordnance munitions 800a, 800b are sent from possibly different locations. The ordnance munitions 800a, 800b are communicating with command through the LTE network 1702 at time t=−4. At time t=−3, the ordnance munitions 800a, 800b are able to establish communication between themselves and improve their location position. At time t=−2, the ordnance munitions 800a, 800b refine their proximity to each other as they achieve an entry vector to the tunnel interior location 1902. At time t=−1, the ordnance munitions 800a, 800b are inside the structure 910 and have potentially lost communication with the LTE network but are using each other to improve their position toward the intended target 904. At time t=0, the ordnance munitions 800a, 800b deliver the payload or ordnance on the target 904.

Figure 20:
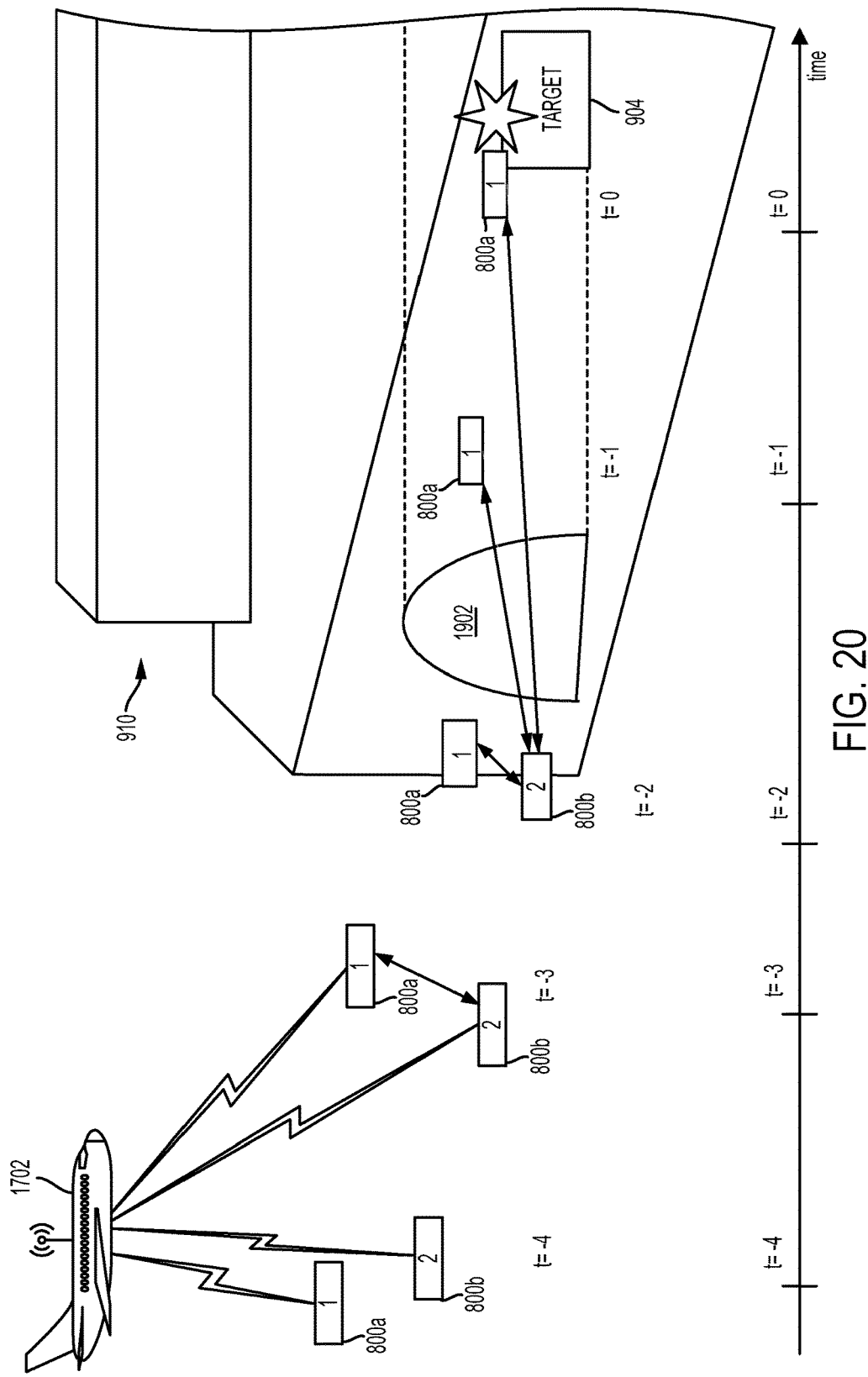

FIG. 20 illustrates a similar situation to that illustrated in FIG. 19. However, in the embodiment illustrated in FIG. 20, ordnance munition 800b remains outside the structure at time t=−2 and acts as a relay device for communicating to and from command or the local team. Ordnance munition 800b may provide video, telemetry, data, or other reconnaissance. At time t=−1, ordnance munition 800a is inside the structure 910 providing valuable recon. At time t=0, ordnance munition 800a has found a high value target 904 and either continues to relay information about the target 904 or delivers its ordnance payload to the intended target 904 while sending its coordinates and other vital telemetry to ordnance munition 800b until it detonates or can no longer function.

Figure 21A:
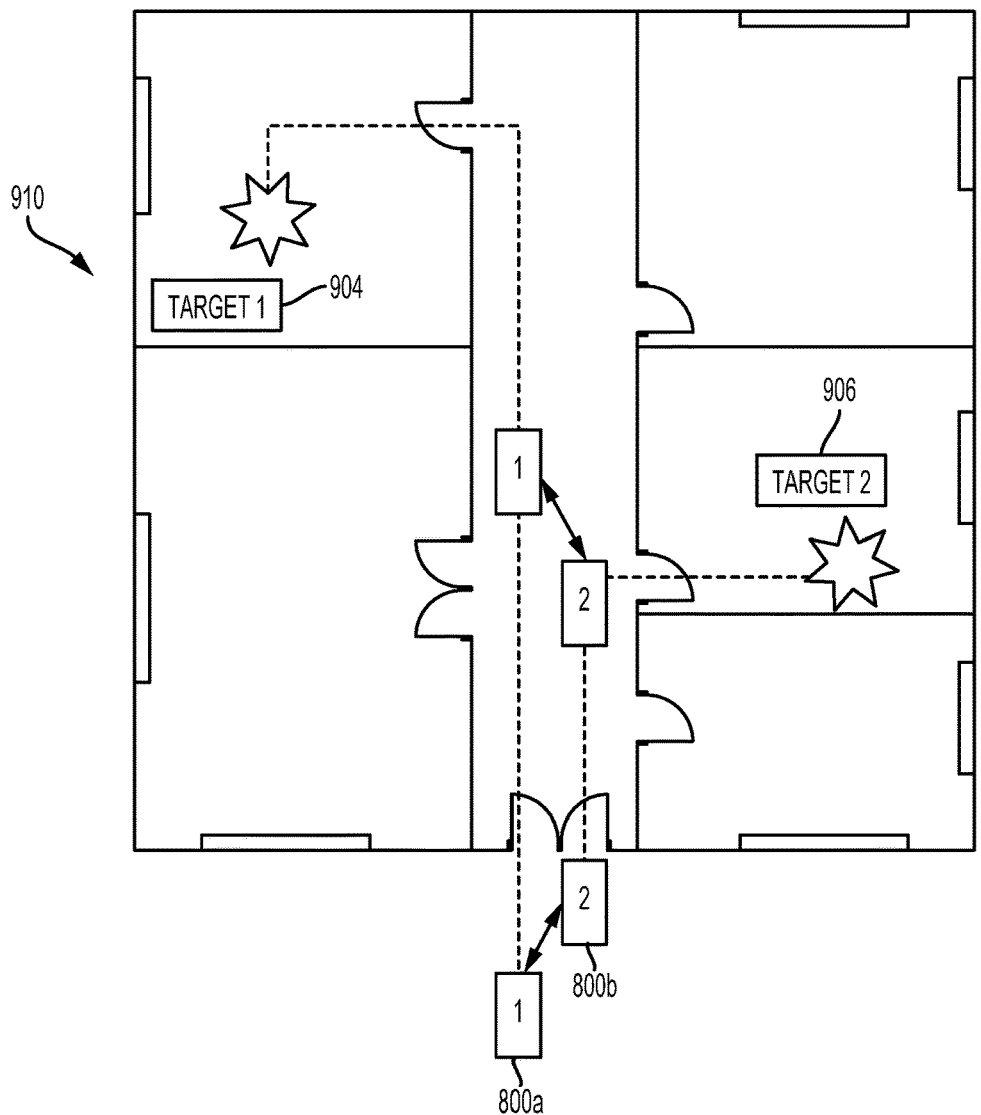
FIG. 21A is a plan view diagram illustrating components in a system that includes one or more drones configured enter and navigate a building to obtain reconnaissance and/or deliver an ordnance payload in accordance with some embodiments.

FIG. 21A depicts a potential situation where a drone or pair of drones 1, 2 enter a building 910 either to obtain reconnaissance or deliver ordnance 2106 to a target 904, 906. In the embodiment illustrated in FIG. 21A, two possible ordnance munitions 800a, 800b enter the structure 910 either with preloaded coordinates or with coordinates provided in real time via a LTE network navigate in the building 910. The ordnance munitions, while in range with each other, assist in each other's position coordinates. Sensors on the drones also help navigate in the close quarters of the facility 910. Upon reaching the designated or discovered targets 904, 906, the drones 1, 2 (ordnance munitions 800a and 800b) either retreat or deliver their payload to the target 904, 906.

Figure 21B:
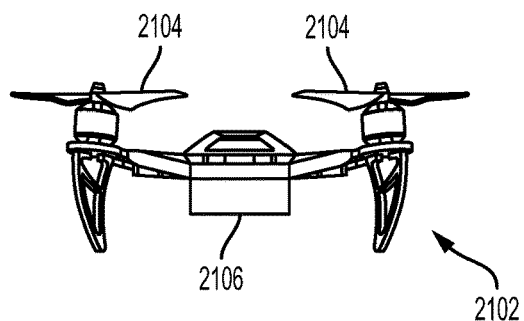
FIG. 21B is an illustration of an ordnance munition in the form of an ordnance-equipped drone that could be configured to accurately deliver its payload to a specific area within a three-dimensional target in accordance with some embodiments.

FIG. 21B is a schematic illustration of an ordnance munition in the form of a drone 2102 that is configured to deploy a payload 2106. In this embodiment, the drone 2102 includes rotors 2104 that allow the drone 2102 to hover. The drone 2102 may detonate its ordnance or otherwise deliver its payload 2106 while still carrying it. Alternatively, the drone 2102 may release its payload 2106, fly a safe distance away and detonate the ordnance 2106 remotely. In this manner, the target, 904, 906 may be destroyed without the loss of the drone 2106.

Figure 22A:
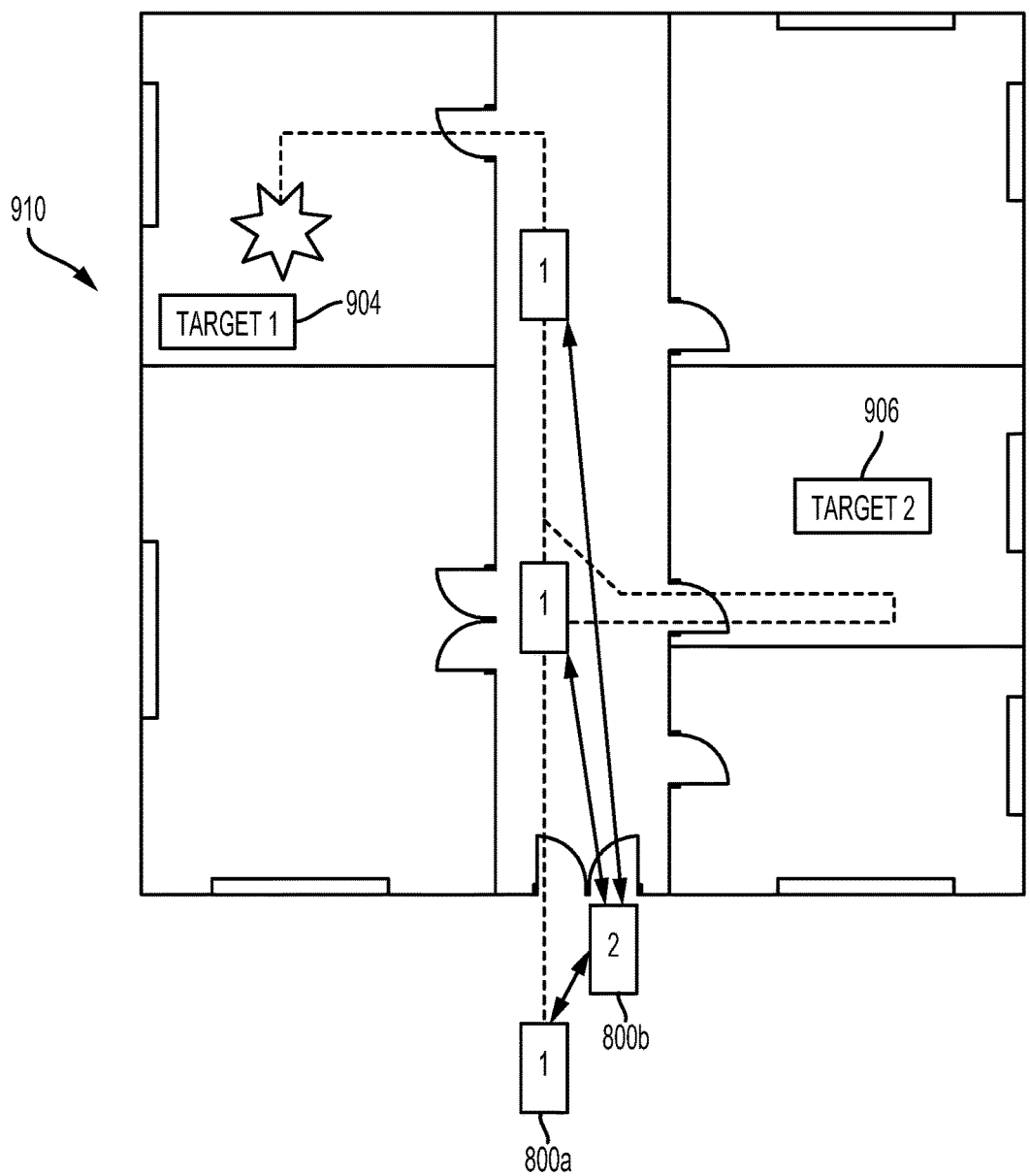
FIG. 22A is a plan view diagram illustrating components in a system that includes multiple drones configured work in conjunction with one another to obtain reconnaissance or deliver a payload to a specific area within a multi-dimensional target in accordance with an embodiment.

FIG. 22A illustrates a similar situation as that depicted in FIG. 21 except ordnance munition 800b remains outside the structure 910. Ordnance munition 800b provides a telemetry and other data including video relay function enabling the other ordnance munition 800a to provide reconnaissance of the structure 910 when LTE coverage may not be sufficient to enable the ordnance munitions to enter the structure 910. Ordnance munition 800b may also allow ordnance munition 800a to continue to relay vital recon back to local or central command or to a forward observer.

The use of sensors, including accelerometers, gyroscopes, magnetometers and pressure sensors, along with GPS receivers with ordnance munitions is becoming more prevalent. Therefore, enhancements for positional location provide an E-SMLC, in the case of LTE, the ability to not only utilize GPS or Network derived coordinate information but also to have an augmentation with sensors associated with the ordnance. The sensors may include accelerometers, gyroscopes, magnetometer and pressure sensors for refining and reducing some of the positional uncertainties that are in inherent to wireless positional determination.

Figure 22B:
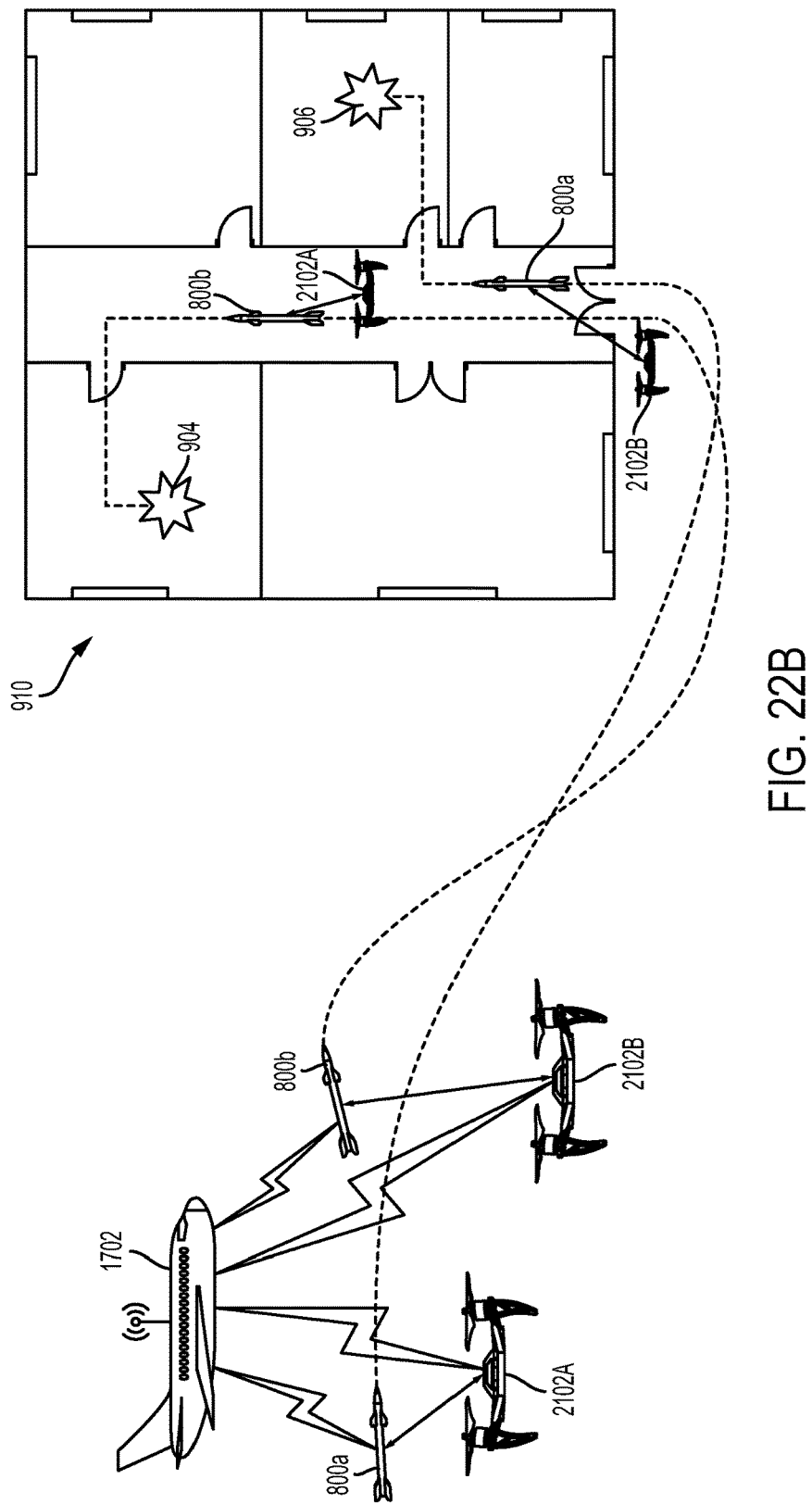
FIG. 22B is a block diagram illustrating various components, communication links, and information flows in a system configured to use an in-flight network for the command and control of multiple ordnance munitions that are configured work in conjunction with one another to obtain reconnaissance and/or deliver a payload to a specific area within a target in accordance with an embodiment.
Figure 23:
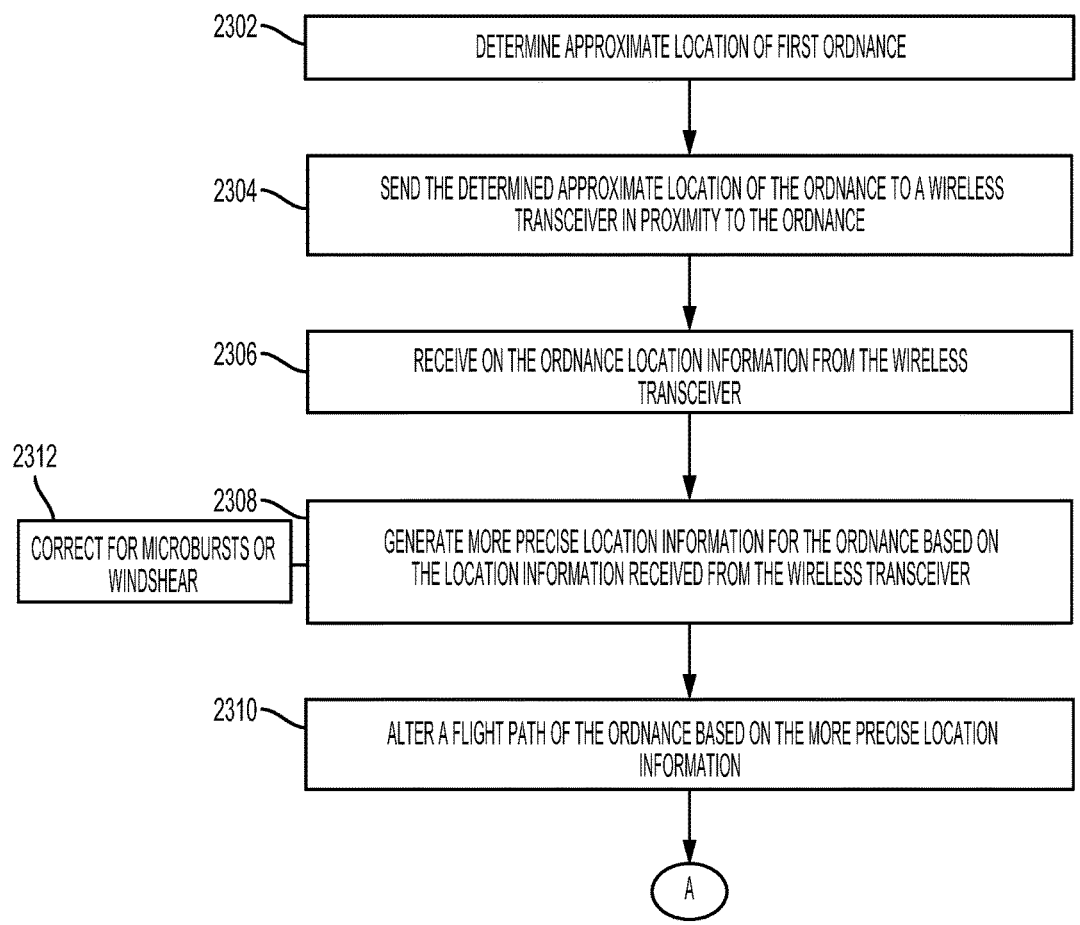
FIG. 23 is a process flow diagram illustrating a method for implementing an improved navigation and guidance solution in accordance with an embodiment.
Figure 24A:
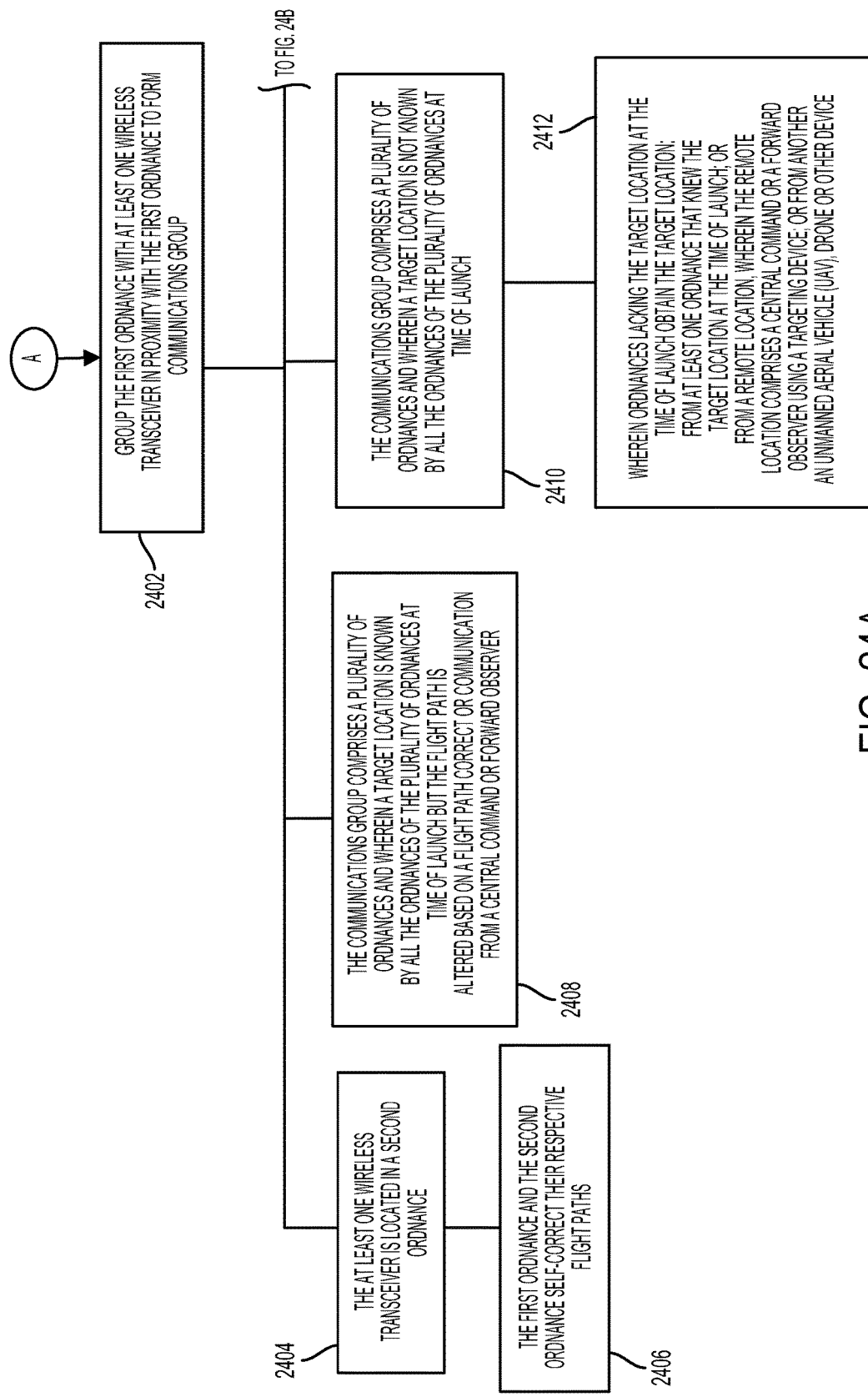
FIGS. 24A and 24B are process flow diagrams illustrating various methods for implementing improved navigation and guidance solutions that allow for more precise control and delivery ordnance munitions in accordance with the various embodiments.
Figure 24B:
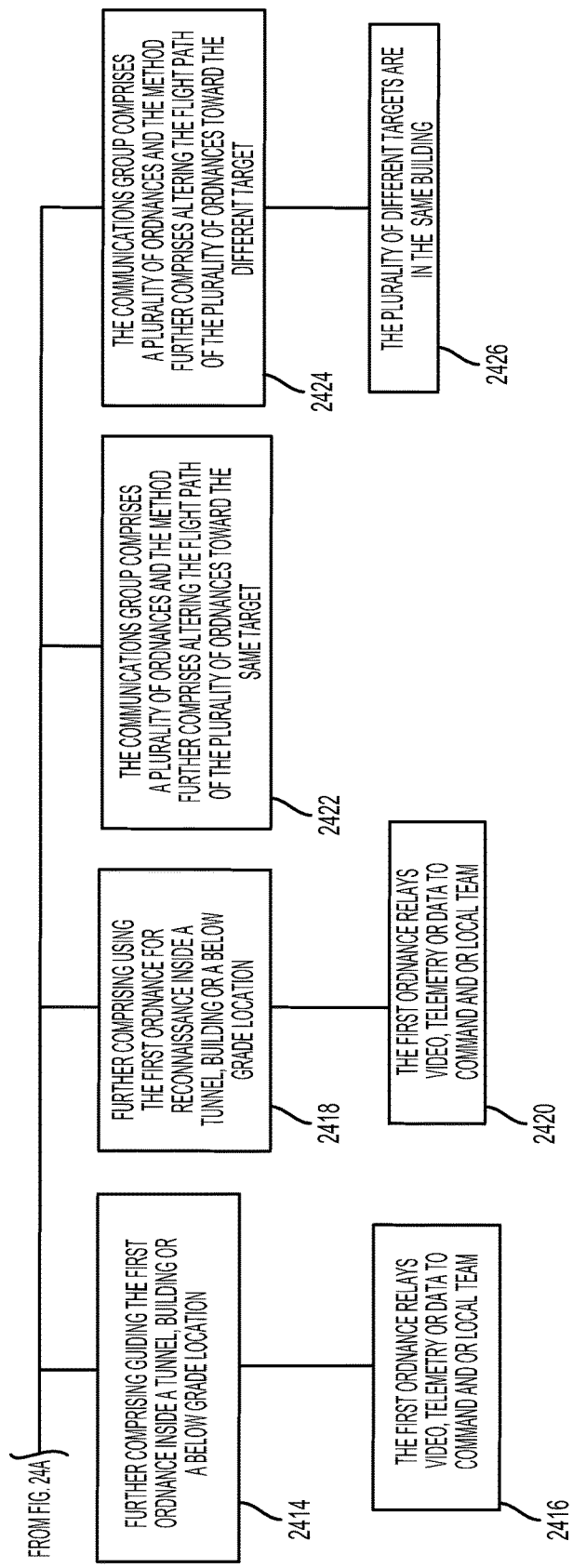
Figure 25A:
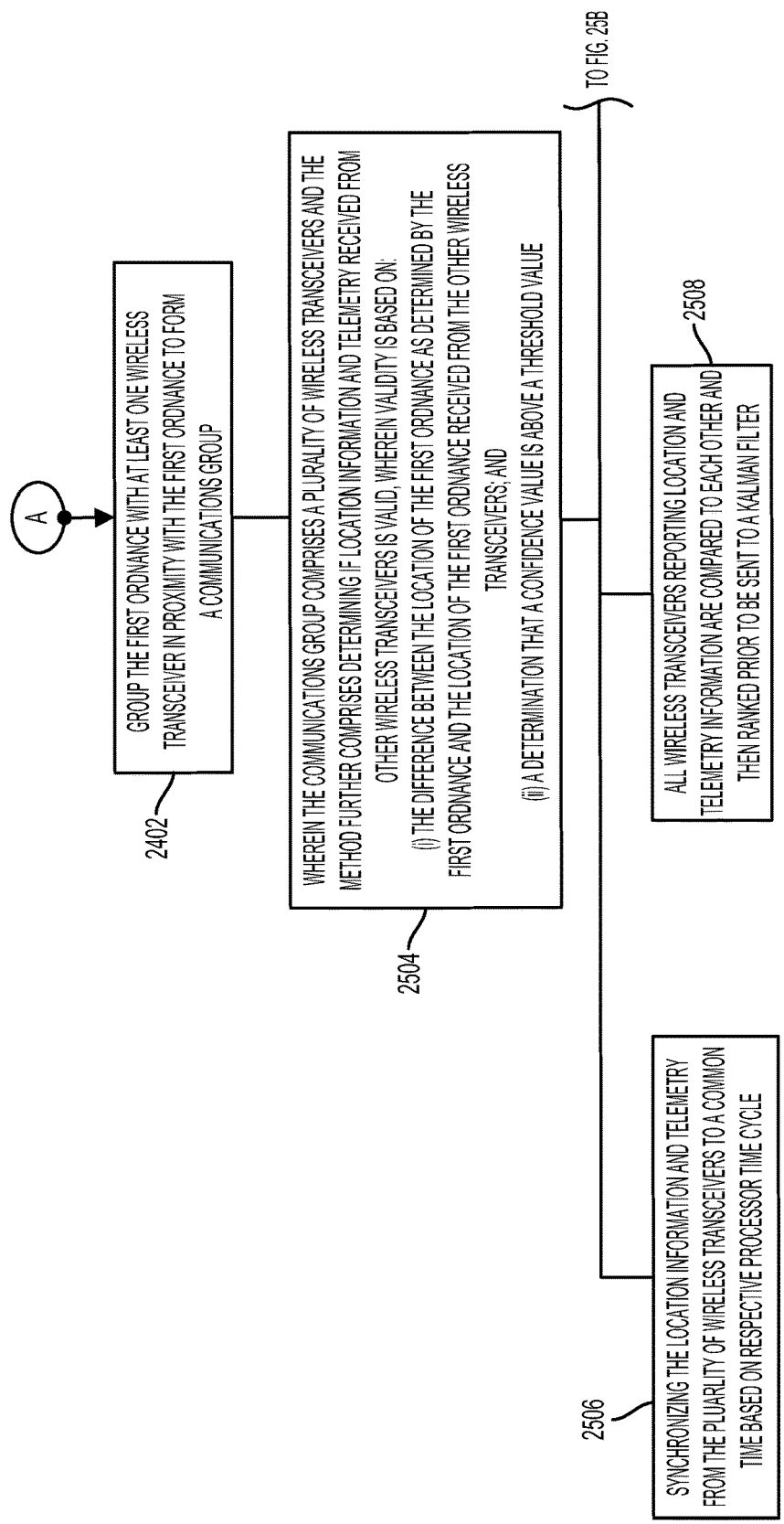
FIGS. 25A and 25B are process flow diagrams illustrating additional methods for implementing improved navigation and guidance solutions that allow for more precise control and delivery ordnance munitions in accordance with the various embodiments.
Figure 25B:
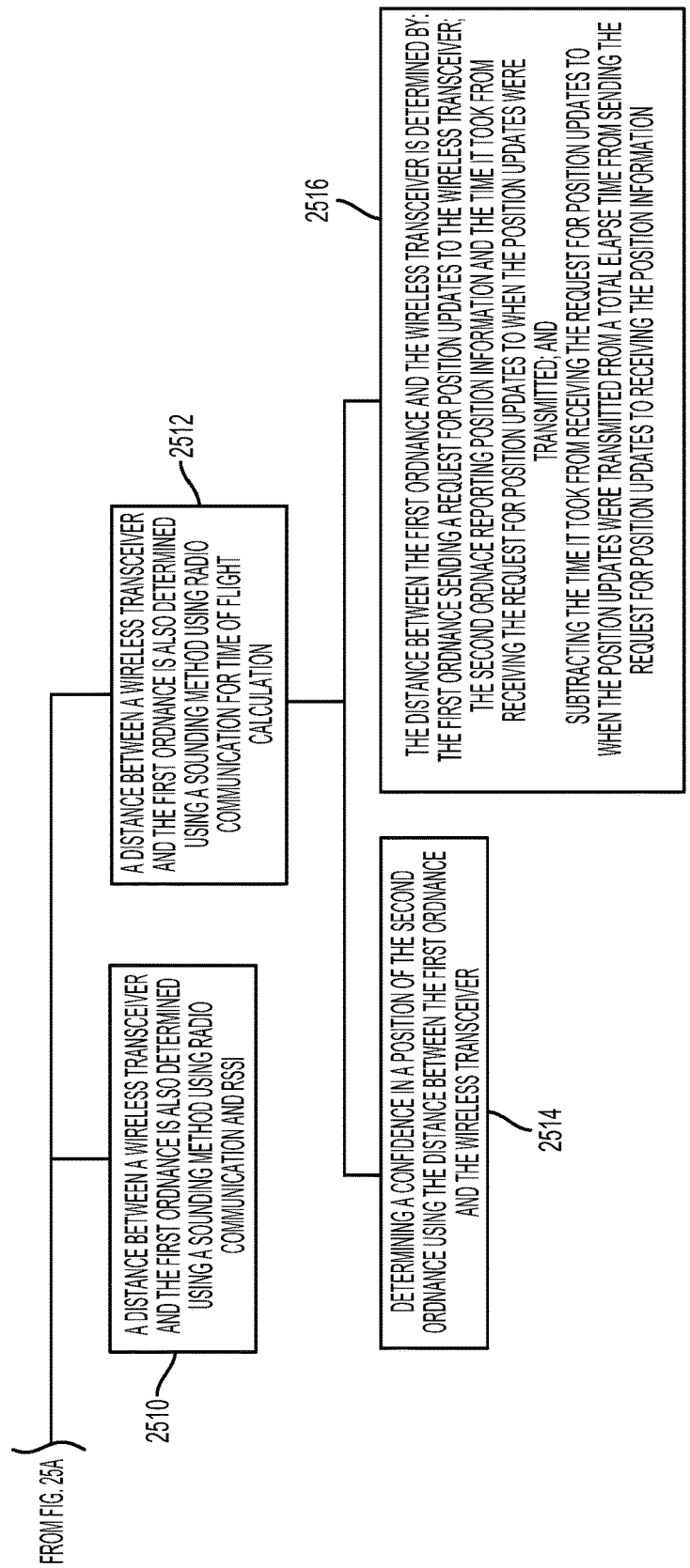
Figure 26:
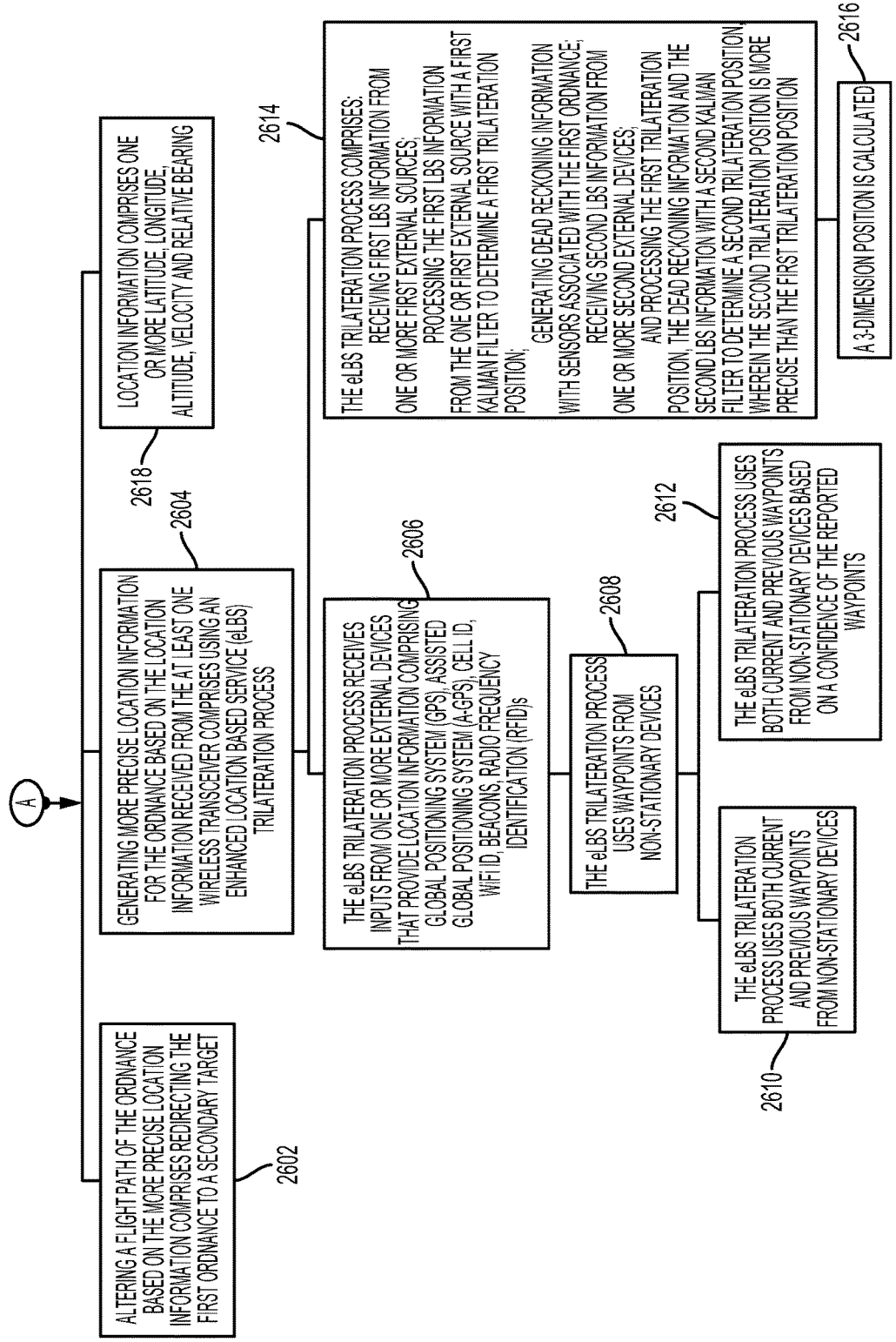
FIGS. 26 through 28 are process flow diagrams illustrating methods for implementing improved navigation and guidance solutions that allow for more precise control and delivery ordnance munitions in accordance with some embodiments.
Figure 27:
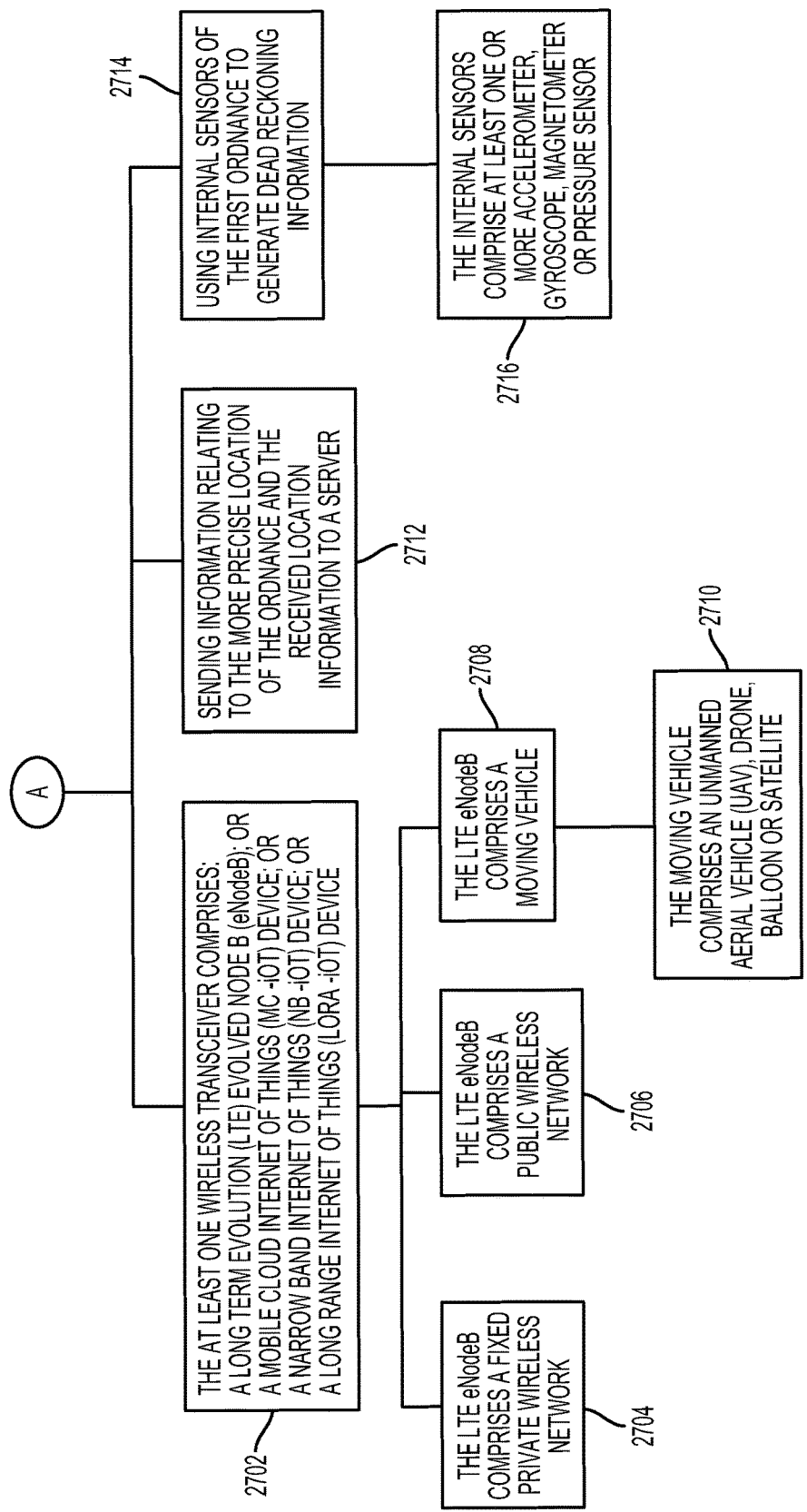
Figure 28:
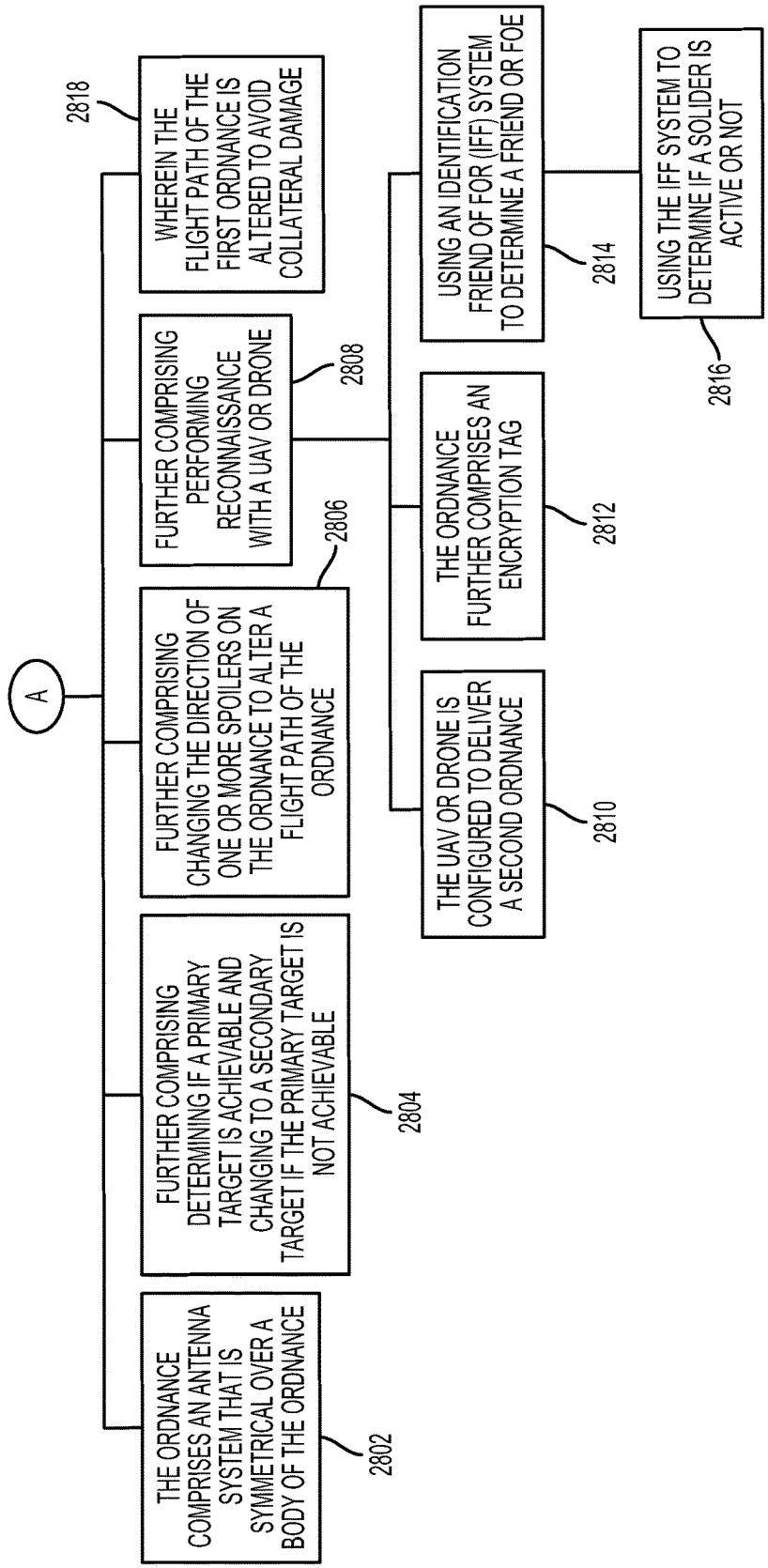

FIG. 22B illustrates an embodiment similar to the embodiment illustrated in FIG. 22A. However, the example illustrated in FIG. 22B, drones 2102A, 2102B coordinate with an LTEnetwork 1702 to direct ordnance munitions 800a, 800b to their respective targets 904, 906 in building 910. As in the previous embodiment, drone 2102B remains outside the building 910 and in contact with the LTE network 1702. Alternatively, drone 2102B may enter the building 910 and drone 2102A remain outside the building.

Various embodiments may include ordnance munition (e.g., ordnance munitions 800 illustrated in FIG. 8, etc.) that are equipped with a global positioning system (GPS) receiver that is in communication with multiple geo-spatial positioning and navigation satellites and a base tower in a communication network (e.g., LTE network, etc.). The ordnance munition may be configured to receive (e.g., via the GPS receiver) radio signals emitted by the satellites, measure the time required for the signals to reach the munitions, and use trilateration techniques to determine their geographical coordinates (e.g., latitude, longitude, and altitude coordinates, etc.) as well as the coordinate of other munitions. These munitions may send the geographical coordinates to the communication network at various times and/or in response to various conditions or events, such as upon initial acquisition with the communication network, in response to network-based requests, in response to third party requests, etc.

The communication network may be a telecommunication network or an ordnance-communications network. Similar to a typical cellular telecommunication network, an ordnance-communications network may include a plurality of cellular base stations coupled to a network operations center, which operates to connect communications (e.g., data calls) between ordnance munitions and with other network components or destinations. The connections may be accomplished via land lines (e.g., a POTS network, not shown) and the Internet. Communications between each of the munitions and the network may be accomplished via two-way wireless communication links, such as 5G, 4G, 3G, CDMA, TDMA, and other cellular or wireless communication technologies. The communication network may also include one or more servers coupled to or within the network operations center that provide connections to the Internet or a private data network like the sypernet. In some embodiments, the munitions may be configured to communicate with a radio access node, which can include any wireless base station or radio access point such as LTE, CDMA2000/EVDO, WCDMA/HSPA, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) for remote interconnection to the Internet, private data network and PSTN.

The ordnance munition may include a circuitry for wirelessly sending and receiving radio signals. The ordnance-communications network may include a plurality of radio access points having installed thereon additional radio equipment for measuring the location of the ordnance munition. For example, each of the ordnance munitions may transmit radio signals for reception by one or more (e.g., typically three) radio access points, and the radio access points may receive the transmitted signals and measure the signal strength and/or radio energy of the received signals to identify the location of the ordnance.

In an embodiment, the radio access points may be configured to determine the location of each of the ordnance munition relative to a known location of a network component, such as the illustrated radio access point, or beacon. In this manner, the additional radio equipment installed on the radio access points may provide the communication system (e.g., the ordnance-communications network, etc.) with similar functionality as is provided by a GPS receiver for signals received from the ordnance munition. For example, the radio equipment on one or more of the radio access points may measure how long it takes for the radio signal to travel from the ordnance munition to another radio access point, and using trilateration techniques (e.g., time of arrival, angle of arrival, or a combination thereof), the ordnance munition or a network server may estimate the location of the ordnance to within an accuracy of 100 to 300 meters. Once the network has estimated the latitude and longitude and altitude coordinates of each of the ordnance munition, this information may be used to determine the geo-spatial location of the ordnance munition, which may be communicated to other systems, servers or components via the Internet or private data network.

As discussed above with reference to FIGS. 7 and 8, each of the ordnance munition may include a speaker, microordnances, antennas for sending and receiving electromagnetic radiation, a processor, a memory and other similar components commonly included in modern computing devices. Each of the munitions may also include one or more sensors for monitoring physical conditions (e.g., location, motion, acceleration, orientation, altitude, etc.), such as a gyroscope, an accelerometer, a magnetometer, a magnetic compass, an altimeter, an odometer, and a pressure sensor. The sensors may also include various bio-sensors (e.g., carbon sensor, oxygen sensor, etc.) for collecting information pertaining to environmental conditions. The sensors may also be external to the ordnance and paired or grouped to the ordnance via a wired or wireless connection (e.g., Bluetooth®, etc.). In embodiment, the ordnance may include multiples of each sensor (e.g., two accelerometers, etc.).

In addition, the ordnance munitions may include other components/sensors for determining the geographic position/location, such as components for determining the radio signal delays (e.g., with respect to cell-ordnance towers and/or cell sites), performing trilateration operations, performing multilateration operations, identifying proximity to known networks (e.g., Bluetooth® networks, WLAN networks, WiFi, etc.), and/or for implementing other known geographic location technologies.

The ordnance munition may also include a system acquisition function configured to access and use information contained in a subscriber identity module (SIM), universal subscriber identity module (USIM), and/or preferred roaming list (PRL) to, for example, determine the order in which listed frequencies or channels may be attempted when the ordnance is to acquire/connect to a wireless network or system. In various embodiments, the ordnance may be configured to attempt to acquire network access (i.e., attempt to locate a channel or frequency with which it can access the wireless/communication network) at initial power-on and/or when a current channel or frequency is lost (which may occur for a variety of reasons). The ordnance munition may include pre-built in USIM, SIM, PRL or access point information.

Most conventional location determination solutions use distance estimation techniques that are based on single-carrier signals, and one of the fundamental operations in ground-based (or network-centric) location determination solutions is timing estimation of a first-arrival path of a signal. That is, a single-carrier signal transmitted between a transceiver and an ordnance munition may be received via multiple paths (i.e., multipath), and the multiple paths of the signal can have different received powers and arrival times. The received signal may be cross-correlated to distinguish the multiple paths of the received signal. In this method, it is generally assumed that the first-arrival path (e.g., first detected signal, strongest signal, etc.) is associated with the path traveling the shortest distance, and hence is the right value to use in estimating distance between the ordnance munition and the transceiver. Often, this first-arrival path is the strongest path due to zero or fewer reflections, relative to the other paths, between the transceiver and the ordnance.

In various embodiments, the first-arrival time of the identified first-arrival path may be used in addition to other parameters (e.g., an estimated signal transmission time and/or a time offset between clocks of the transceiver and the ordnance, etc.) to estimate distance between an ordnance munition and a network component (e.g., another ordnance, a transceiver, an access point, a base station, etc.). The first-arrival time may be estimated by the ordnance munition (e.g., based on the downlink received signal) or by the network component (e.g., based on an uplink received signal).

The location of the ordnance munition may also be determined by estimating the distance between the ordnance munition and a network component or other signal sources (e.g., a transceiver, ground or satellite-based signal sources, etc.). For example, the location of the ordnance munition may be determined by performing trilateration using estimated distances between multiple (e.g., three or more) transceivers and the ordnance munition.

Another location determination solution may include computing an observed time difference of arrival (OTDOA) value by measuring the timing of signals received from three network components (e.g., ordnance s, transceivers, access points, etc.). For example, an ordnance munition may be configured to compute two hyperbolas based on a time difference of arrival between a reference transceiver signal and signals of two neighbor transceivers. The intersection of the computed hyperbolas may define a position on the surface of the earth that may be used by various embodiments to determine the location of the ordnance.

The accuracy of such OTDOA solutions may be a function of the resolution of the time difference measurements and the geometry of the neighboring transceivers. As such, implementing an OTDOA solution may require determining the precise timing relationship between the neighboring transceivers. However, in existing asynchronous networks, this precise timing relationship may be difficult to ascertain.

In various embodiments, location measurement units (LMUs) may be added throughout a deployment region of an asynchronous network to measure/compute timing information for one or more network components (e.g., transceivers) relative to a high quality timing reference signal. For example, an ordnance or an LMU may determine the observed time difference between frame timing of transceiver signals, and the observed time difference may be sent to the transceiver or a radio network controller of the communication network to determine the location of the ordnance. The location of the ordnance may also be determined based on the observed time difference and assistance data (e.g., position of the reference and neighbor transceivers) received from the communication network.

Another location determination solution may include computing an uplink-time difference of arrival (U-TDOA) based on network measurements of the time of arrival of a known signal sent from the ordnance and received at multiple (e.g., four or more) LMUs. For example, LMUs may be positioned in the geographic vicinity of the ordnance to accurately measure the time of arrival of known signal bursts, and the location of the ordnance may be determined using hyperbolic trilateration based on the known geographical coordinates of the LMUs and the measured time-of-arrival values.

As discussed above, conventional location determination solutions are typically based on single-carrier signals. The various embodiments include a ground-based location determination solution based on multi-carrier signals. A location determination solution based on multi-carrier signals may improve the accuracy of the computed location information by, for example, improving the accuracy of the timing estimation (e.g., by expanding the bandwidth of cellular signals). Location determination solutions based on multiple carriers may be used in both the device-centric (e.g., ordnance-based) and network-centric (e.g., base station-based) approaches, and may be applied to both 3GPP and 3GPP2 wireless communication technologies.

In various embodiments, an ordnance may be configured to determine its geospatial location based on information collected from ordnance sensors (e.g. gyroscope, accelerometer, magnetometer, pressure sensor, etc.), information received from other ordnance munitions, and information received from network components in a communication system.

For wireless mobile networks, like LTE, the position location information accuracy should be improved for in-building or GPS stressed environments in addition to providing more accurate location information about where the ordnance munitions are actually located. This is true, whether the ordnance is used by a first responder, commercial cellular user or a combination of both.

Positional location improvement enables improved situation awareness, improved telemetry and improved overall communication with the incident commander. In addition, the ordnance's proximity location to other ordnance munitions may change dynamically allowing for resources to be added and/or reassigned as the need arises for operational requirements.

Two or more munitions/ordnance munitions may be organized into groups. Ordnance munitions within the same group may be part of the same network, or may be associated with different networks and/or network technologies. The ordnance munitions within the same group may also operate on different network operating systems (NOSs) and/or radio access networks (RANs).

Embodiments of the method are illustrated in FIGS. 23-28. An embodiment is drawn to a method of guiding a first ordnance munition, which may include a processor in the ordnance munition determining a rough location of the first ordnance munition, block 2302, and sending the determined rough location to a wireless transceiver in proximity to the ordnance munition, block 2304. The method also includes receiving on the ordnance munition location information from the wireless transceiver, block 2306, generating more precise location information for the ordnance munition based on the location information received from the wireless transceiver, block 2308 and altering a flight path of the ordnance munition based on the more precise location information, block 2310. In an embodiment, the ordnance munition is a rocket, mortar or missile. In another embodiment, the more precise location corrects for microbursts or wind shear, block 2312.

An embodiment further includes grouping the first ordnance munition with at least one wireless transceiver in proximity with the first ordnance munition to form a communications group, block 2402. In an embodiment, the at least one wireless transceiver is located in a second ordnance munition, block 2404. In an embodiment, the first ordnance munition and the second ordnance munition self-correct their respective flight paths, block 2406. In an embodiment, the communications group comprises a plurality of ordnance munitions and wherein a target location is known by all the ordnance munitions of the plurality of ordnance munitions at time of launch but the flight path is altered based on a flight path correct or communication from a central command or forward observer, block 2408.

In an embodiment, the communications group comprises a plurality of ordnance munitions in which a target location is not known by all the ordnance munitions of the plurality of ordnance munitions at time of launch, block 2410. In an embodiment, ordnance munitions lacking the target location at the time of launch obtain the target location: (1) from at least one ordnance that knew the target location at the time of launch or (2) from a remote location, wherein the remote location comprises a central command or a forward observer using a targeting device or (3) from another an unmanned aerial vehicle (UAV), drone or another device, block 2412. An embodiment further includes guiding the first ordnance munition inside a tunnel, building or a below grade location, block 2414.

In an embodiment, the first ordnance munition relays video, telemetry or data to command and or local team, block 2416. An embodiment further includes using the first ordnance munition for reconnaissance inside a tunnel, building or a below grade location, block 2418. In an embodiment, the first ordnance munition relays video, telemetry or data to command and or local team, block 2420. In an embodiment, the communications group includes a plurality of wireless transceivers and the method further comprises determining if location information and telemetry received from other wireless transceivers is valid, wherein validity is based on: (i) the difference between the location of the first ordnance munition as determined by the first ordnance munition and the location of the first ordnance munition received from the other wireless transceivers and (ii) a determination that a confidence value is above a threshold value, block 2504.

An embodiment further includes synchronizing the location information and telemetry from the plurality of wireless transceivers to a common time based on respective processor time cycle, block 2506. In an embodiment, all the wireless transceivers reporting location and telemetry information are compared to each other and ranked prior to be sent to a Kalman filter, block 2508. In an embodiment, a distance between a wireless transceiver and the first ordnance munition is also determined using a sounding method using radio communication and RSSI, block 2510. In an embodiment, a distance between a wireless transceiver and the first ordnance munition is also determined using a sounding method using radio communication for time of flight calculation, block 2512.

An embodiment further includes determining a confidence in a position of the second ordnance using the distance between the first ordnance munition and the wireless transceiver, block 2514. In an embodiment, the distance between the first ordnance munition and the wireless transceiver is determined by: (1) the first ordnance munition sending a request for position updates to the wireless transceiver, (2) the second ordnance reporting position information and the time it took from receiving the request for position updates to when the position updates were transmitted and (3) subtracting the time it took from receiving the request for position updates to when the position updates were transmitted from a total elapse time from sending the request for position updates to receiving the position information, block 2516.

In an embodiment, the communications group comprises a plurality of ordnance munitions and the method further comprises altering the flight path of the plurality of ordnance munitions toward the same target, block 2422. In an embodiment, the communications group comprises a plurality of ordnance munitions and the method further comprises altering the flight path of the plurality of ordnance munitions toward the different targets, block 2424. In an embodiment, the plurality of different targets are in the same building, block 2426.

In an embodiment, altering a flight path of the ordnance based on the more precise location information comprises redirecting the first ordnance munition to a secondary target, block 2602. In an embodiment, generating more precise location information for the ordnance based on the location information received from the at least one wireless transceiver comprises using an enhanced location based service (eLBS) trilateration process, block 2604. In an embodiment, the eLBS trilateration process receives inputs from one or more external devices that provide location information comprising global positing system (GPS), assisted global positing system (A-GPS), cell ID, WiFi ID, beacons, radio frequency identification (RFID)s, block 2606.

In an embodiment, the eLBS trilateration process may use waypoints from stationary and non-stationary devices, block 2608. Examples of stationary devices may include fixed beacon devices, eNodeB cells, fixed Internet-of-Things (IOT) devices, and other LTE devices that are stationary over the relevant period of time. In an embodiment, the eLBS trilateration process uses both current and previous waypoints from non-stationary devices, block 2610. In an embodiment, the eLBS trilateration process uses both current and previous waypoints from non-stationary devices based on a confidence of the reported waypoints, block 2612.

In an embodiment, the eLBS trilateration process includes: (1) receiving first LBS information from one or more first external sources, (2) processing the first LBS information from the one or first external source with a first Kalman filter to determine a first trilateration position, (3) generating dead reckoning information with sensors associated with the first ordnance munition, (4) receiving second LBS information from one or more second external devices and (5) processing the first trilateration position, the dead reckoning information and the second LBS information with a second Kalman filter to determine a second trilateration position, block 2614. The second trilateration position is more precise than the first trilateration position, block 2614. In an embodiment, a 3-dimension position is calculated, block 2616. In an embodiment, location information comprises one or more of latitude, longitude, altitude, velocity and relative bearing. In an embodiment, location information comprises one or more of latitude, longitude, altitude, velocity and relative bearing, block 2618.

In an embodiment, the at least one wireless transceiver comprises: (1) a long term evolution (LTE) evolved node B (eNodeB) or (2) a mobile cloud internet of things (MC-iOT) device or (3) a narrow band internet of things (NB-iOT) device or (4) a long range internet of things (LORA-iOT) device, block 2702. In an embodiment, the LTE eNodeB comprises a fixed private wireless network, block 2704. In an embodiment, the LTE eNodeB comprises a public wireless network, block 2706. In an embodiment, the LTE eNodeB comprises a moving vehicle, block 2708. In an embodiment, the moving vehicle comprises an unmanned aerial vehicle (UAV), drone, balloon or satellite, block 2710. An embodiment further includes sending information relating to the more precise location of the ordnance and the received location information to a server, block 2712.

An embodiment further includes using internal sensors of the first ordnance munition to generate dead reckoning information, block 2714. In an embodiment, the internal sensors comprise at least one or more accelerometer, gyroscope, magnetometer or pressure sensor, block 2716. In an embodiment, the ordnance comprises an antenna system that is symmetrical over a body of the ordnance, block 2802. An embodiment further includes determining if a primary target is achievable and changing to a secondary target if the primary target is not achievable, block 2804. An embodiment further includes changing the direction of one or more spoilers on the ordnance to alter a flight path of the ordnance, block 2806. An embodiment further includes performing reconnaissance with a UAV or drone, block 2804.

In an embodiment, the UAV or drone is configured to deliver a second ordnance, block 2810. In an embodiment, the ordnance further comprises an encryption tag, block 2812. An embodiment further includes using an identification friend or foe (IFF) system to determine a friend or foe, block 2814. An embodiment further includes using the IFF system to determine if a soldier is active or not, block 2816. In an embodiment, the flight path of the first ordnance munition is altered to avoid collateral damage, block 2818.

An embodiment is drawn to a first ordnance munition or drone having an ordnance including a wireless transceiver, one or more internal sensors, a guidance system, a storage medium and a microprocessor. The transceiver is configured to receive location information and the microprocessor includes instructions to generate a more precise location of the first ordnance munition based on an initial rough location and the received location information. The guidance system is configured to alter a flight path of the first ordnance munition or the drone having the ordnance based on the more precise location information. In an embodiment, the ordnance is a rocket, mortar or missile.

And embodiment is drawn to a group including the first ordnance munition or drone having an ordnance and further includes at least one wireless transceiver in proximity with the first ordnance munition to form a communications group. In an embodiment, the at least one wireless transceiver is located in a second ordnance. In an embodiment, the first ordnance munition and the second ordnance self-correct their respective flight paths. In an embodiment, the communications group includes a plurality of ordnance munitions and wherein a target location is known by all the ordnance munitions of the plurality of ordnance munitions at time of launch but the flight path is altered based on a flight path correct or communication from a central command or forward observer.

In the embodiment, the communications group comprises a plurality of ordnance munitions and wherein a target location is not known by all the ordnance munitions of the plurality of ordnance munitions at time of launch. In the embodiment, the at least one wireless transceiver in proximity with the first ordnance munition is located on a drone. In an embodiment, ordnance munitions lacking the target location at the time of launch obtain the target location: (1) from at least one ordnance that knew the target location at the time of launch, or (2) from a remote location, wherein the remote location comprises a central command or a forward observer using a targeting device, or (3) from another an unmanned aerial vehicle (UAV), drone or other device.

In an embodiment, the first ordnance munition is guided inside a tunnel, building or a below grade location. In an embodiment, the first ordnance munition relays video, telemetry or data to command and or local team. In an embodiment, the communications group includes a plurality of wireless transceivers and the microprocessor further determines if location information and telemetry received from other wireless transceivers is valid, wherein validity is based on: (i) the difference between the location of the first ordnance munition as determined by the first ordnance munition and the location of the first ordnance munition received from the other wireless transceivers; and (ii) a determination that a confidence value is above a threshold value.

In an embodiment, the microprocessor further synchronizes the location information and telemetry from the plurality of wireless transceivers to a common time based on respective processor time cycle. In an embodiment, all the wireless transceivers reporting location and telemetry information are compared to each other and ranked prior to be sent to a Kalman filter. In an embodiment, a distance between a wireless transceiver and the first ordnance munition is also determined using a sounding method using radio communication and RSSI. In an embodiment, a distance between a wireless transceiver and the first ordnance munition is also determined using a sounding method using radio communication for time of flight calculation. In an embodiment, a confidence in a position of the second ordnance is determined using the distance between the first ordnance munition and the wireless transceiver.

In an embodiment, the distance between the first ordnance munition and the wireless transceiver is determined by: (1) the first ordnance munition sending a request for position updates to the wireless transceiver, (2) the second ordnance reporting position information and the time it took from receiving the request for position updates to when the position updates were transmitted and (3) subtracting the time it took from receiving the request for position updates to when the position updates were transmitted from a total elapse time from sending the request for position updates to receiving the position information. In an embodiment, the communications group comprises a plurality of ordnance munitions and the flight path of the plurality of ordnance munitions is altered toward the same target. In an embodiment, the communications group comprises a plurality of ordnance munitions and wherein the flight path of the plurality of ordnance munitions is altered toward the different targets. In an embodiment, the plurality of different targets are in the same building.

In an embodiment, a flight path of the ordnance is altered based on the more precise location information and the first ordnance munition or drone having an ordnance redirected to a secondary target. In an embodiment, an enhanced location based service (eLBS) trilateration process may be used to generate the more precise location information. In an embodiment, the eLBS trilateration process receives inputs from one or more external devices that provide location information comprising global positing system (GPS), assisted global positing system (A-GPS), cell ID, WiFi ID, beacons, radio frequency identification (RFID)s. In an embodiment, the eLBS trilateration process uses waypoints from non-stationary devices. In an embodiment, the eLBS trilateration process uses both current and previous waypoints from non-stationary devices. In an embodiment, the eLBS trilateration process uses both current and previous waypoints from non-stationary devices based on a confidence of the reported waypoints.

In an embodiment, the eLBS trilateration process comprises: (1) receiving first LBS information from one or more first external sources, (2) processing the first LBS information from the one or first external source with a first Kalman filter to determine a first trilateration position, (3) generating dead reckoning information with sensors associated with the first ordnance munition, (4) receiving second LBS information from one or more second external devices and (5) processing the first trilateration position, the dead reckoning information and the second LBS information with a second Kalman filter to determine a second trilateration position, wherein the second trilateration position is more precise than the first trilateration position. In an embodiment, a 3-dimension position is calculated.

In an embodiment, location information comprises one or more of latitude, longitude, altitude, velocity and relative bearing. In an embodiment, the at least one wireless transceiver includes: (1) a long term evolution (LTE) evolved node B (eNodeB) or (2) a mobile cloud internet of things (MC-iOT) device or (3) a narrow band internet of things (NB-iOT) device or (4) a long range internet of things (LORA-iOT) device. In an embodiment, the LTE eNodeB comprises a fixed private wireless network. In an embodiment, the LTE eNodeB comprises a public wireless network. In an embodiment, the LTE eNodeB comprises a moving vehicle. In an embodiment, the moving vehicle comprises an unmanned aerial vehicle (UAV), drone, balloon or satellite.

In an embodiment, the one or more internal sensors generate dead reckoning information. In an embodiment, the internal sensors comprise at least one or more accelerometer, gyroscope, magnetometer or pressure sensor. An embodiment further includes an antenna system that is symmetrical over a body of the ordnance. Another embodiment further includes one or more spoilers on the ordnance to alter a flight path of the ordnance. In an embodiment, the UAV or drone is configured to deliver a second ordnance. In an embodiment the ordnance further comprises an encryption tag. An embodiment further includes an identification friend or foe (IFF) system to determine a friend or foe. In an embodiment, the IFF system determines if a soldier is active or not.

Another embodiment is drawn a non-transitory computer readable storage medium having stored thereon processor-executable software instructions configured to cause a processor in a first ordnance munition or drone having an ordnance to perform operations for generating a more precise location of the first ordnance munition or drone having an ordnance and altering the flight path of the first ordnance munition or drone having an ordnance based on the more precise location. The operations include determining a rough location of the first ordnance munition and sending the determined rough location of the ordnance to a wireless transceiver in proximity to the ordnance. The operations also include receiving on the ordnance location information from the wireless transceiver, generating more precise location information for the ordnance based on the location information received from the wireless transceiver and altering a flight path of the ordnance based on the more precise location information.

In an embodiment, the more precise location corrects for microbursts or wind shear. In an embodiment, the stored processor-executable software instructions are configured to cause a processor to perform operations further comprising grouping the first ordnance munition or drone having an ordnance with at least one wireless transceiver in proximity with the first ordnance munition to form a communications group.

Figure 29:
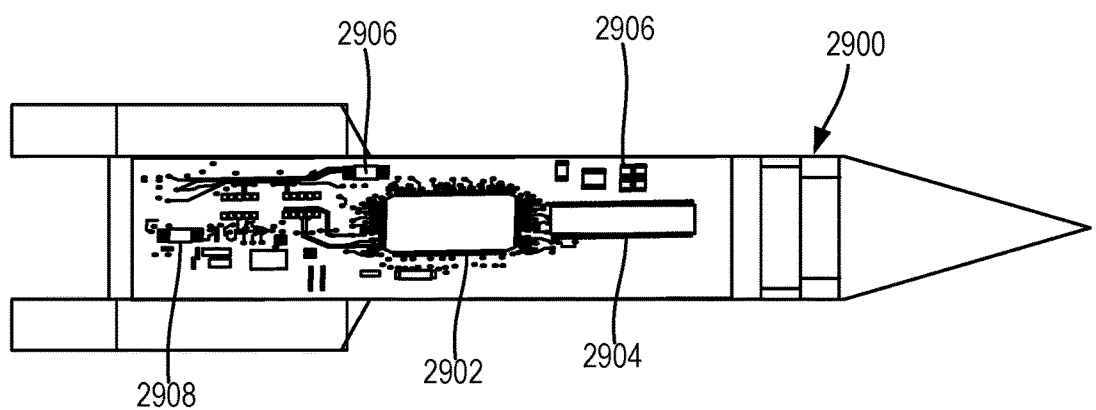
FIG. 29 is component block diagram illustrating an ordnance munition that is suitable for use in implementing the various embodiments.

FIG. 29 illustrates an ordnance munition 2900 suitable of implementing the various embodiments. In the example illustrated in FIG. 29, the ordnance munition 2900 includes a processor 2902 coupled to an internal memory 2904. The computing device 2904 may include a radio/antenna 2906 for sending and receiving electromagnetic radiation that is connected to a wireless data link and/or cellular telephone transceiver 2908 coupled to the processor 2902. In some embodiments, the ordnance munition 2900 may also include a touch surface, such as a resistive sensing touchscreen, capacitive sensing touchscreen, infrared sensing touchscreen, acoustic/piezoelectric sensing touchscreen, or the like. In some embodiments, the ordnance munition 2900 may also include physical buttons 2910 for receiving user inputs.

The processor 2902 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 2902. The processor 2902 may include internal memory sufficient to store the application software instructions. In some embodiments, ae secure memory may be in a separate memory chip that is coupled to the processor 2902. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 2902 itself.

Figure 30:
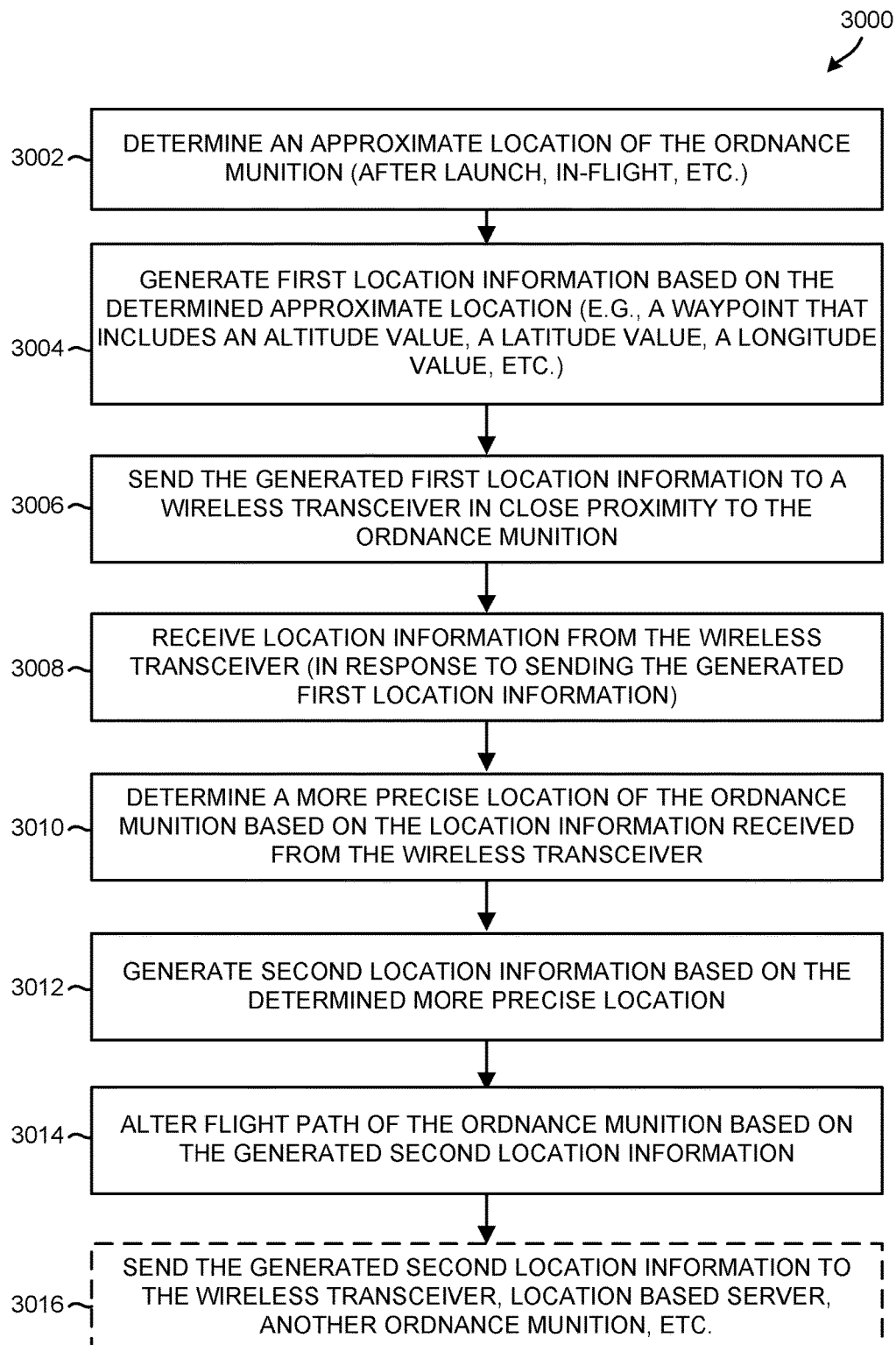
FIG. 30 is a process flow diagram illustrating a method of guiding an ordnance munition in accordance with an embodiment.

FIG. 30 illustrates a method 300 of guiding an ordnance munition in accordance with an embodiment. In block 3002, a processor in a first ordnance munition (e.g., rocket, mortar, missile, etc.) may determine an approximate location of the first ordnance munition (e.g., after the ordnance munition has been launch, in-flight, etc.). In block 3004, the processor may generate first location information based on the determined approximate location. In various embodiments, the first location information may include (or may be associated with) a latitude value, a longitude value, an altitude value, a velocity value, a relative bearing value, a confidence value, a precision value, a priority value, a rank value that may be used for conflict resolution, a waypoint, three-dimensional location information, and/or other similar location information. In some embodiments, the first ordnance munition may include or have access to terrain data and/or information identifying a targeting grid or a grid system. In some embodiments, the first ordnance munition may include coordinates of one or more targets, such as a primary target, a secondary target, or a target grid.

In block 3006, the processor may send the generated first location information to a wireless transceiver in close proximity to the first ordnance munition. For example, the processor may activate communication circuitry of the ordnance munition to transmit the generated first location information to a transceiver included in a second ordnance munition, an unmanned aerial vehicle (UAV), an unmanned combat aerial vehicle (UCAV), an unmanned spacecraft, a remote controlled unmanned space mission, an autonomous robotic spacecraft, a space probe, an unmanned ground vehicle (UGV), autonomous car, an unmanned surface vehicle (USV) suitable for operation on the surface of the water, an autonomous underwater vehicle (AUV), an unmanned undersea vehicle (UUV), a single or multirotor drone, a quadcopter, or any other type of drone unmanned vehicle. The transceiver may also be included in an eNodeB, a long term evolution component, a mobile cloud internet of things device, a narrow band internet of things device, a long range internet of things device, a component in a fixed private wireless network or in a private shared wireless network, a component in a public wireless network, a mobile vehicle, a server computing device that is configured to provide enhanced location based services, a hot air balloon, or a satellite. In an embodiment, the transceiver may be included in a device (e.g., UAV) that is guiding a second ordnance munition to a target.

In block 3008, the processor may receive location information from the wireless transceiver (e.g., in response to sending the generated first location information wireless transceiver). For example, processor may receive location information via an antenna system that is symmetrical over a body of the first ordnance munition. The received location information may include a waypoint, telemetry data, a confidence value, a precision value, a priority or rank value, and other similar information. In block 3010, the processor may determine a more precise location of the first ordnance munition based on the location information received from the wireless transceiver. In some embodiments (e.g., embodiments discussed above with reference to FIGS. 1 through 4C, etc.) determining the more precise location may include the first ordnance munition performing one or more enhanced location based trilateration operations.

In block 3012, the processor (and/or a targeting and guidance system of the ordnance munition) may generate second location information based on the determined more precise location. The second location information may be waypoint or location value that includes a confidence or precision value that is greater than the confidence or precision value associated with the first location information. In some embodiments, the second location information may include three-dimensional location information that corrects for microbursts, wind shear, and/or other errors or inaccuracies of the first location information. In various embodiments, the second location information may include (or may be associated with) a latitude value, a longitude value, an altitude value, a velocity value, a relative bearing value, a confidence value, a precision value, a priority value, a rank value that may be used for conflict resolution, a waypoint, three-dimensional location information, and/or other similar location information.

In block 3014, the processor (and/or a targeting and guidance system of the ordnance munition) may alter the flight path of the first ordnance munition based on the generated second location information. Altering the flight path may include the first ordnance munition changing the direction of its spoilers and/or expending fuel to self-correct its flight path, redirecting itself away from a primary target and towards a secondary target, redirect itself a location of a secondary target in response to determining that a primary target is not available, guide itself to a more accurate location of a primary target, guide itself to a new location of a mobile primary target. Altering the flight path may also include guiding the first ordnance munition inside a tunnel, a building or a below grade location, etc. Altering the flight path may further include the processor (and/or a targeting and guidance system of the ordnance munition) changing the direction of one or more spoilers on the first ordnance munition so as to avoid or minimize collateral damage.

In optional block 3014, the processor may send the generated second location information to the wireless transceiver, location based server, another ordnance munition, or other collaborative device that is in the same communication group, intelligent ordnance projectile delivery system, coordinated attack group, battery, etc. as the first ordnance munition.

In an embodiment, the first ordnance munition may be configured to perform enhanced location based trilateration operations that include receiving waypoints from a plurality of devices (e.g., external non-stationary devices, etc.), selecting two or more of received waypoints or waypoints from memory, and applying the selected waypoints to a kalman filter to generate the second location information. The first ordnance munition may also perform normalization operations to normalize the received waypoints, assign an overall ranking to each of the normalized waypoints, assign a device-specific ranking to each of the normalized waypoints, and store the normalized waypoints in the memory. In some embodiments, the first ordnance munition may select up to four current and previous waypoints (e.g., which may have been received from non-stationary devices) based on confidence values associated with the reported waypoints. The first ordnance munition may also be configured receive inputs from one or more external devices that provide location information, including global positing system data, assisted global positing system data, cell identifier data, WiFi identifier data, beacon data, and/or radio frequency identification data, any or all of which may be fed into the kalman filter to generate the second location information.

In an embodiment, the first ordnance munition may be configured to perform enhanced location based trilateration operations that include receiving first location based information from one or more first external sources, applying the received first location based information to a first Kalman filter to generate a first trilateration position value, generating dead reckoning information with sensors associated with the first ordnance munition, receiving second location based information from one or more second external sources, and applying first trilateration position value, the dead reckoning information and the second location based information to a second Kalman filter to generate the second location information.

In an embodiment, the first ordnance munition may be configured to use information collected from its internal sensors (e.g., accelerometer, gyroscope, magnetometer, pressure sensor, etc.) to generate dead reckoning information, and determine the approximate location and/or the more precise location based on the generated dead reckoning information.

In an embodiment, the wireless transceiver may be included in a second ordnance munition, and the first ordnance munition may be configured to collaborate with the second ordnance munition so as to cause the second ordnance munition to self-correct its flight path (e.g., based on information received from the first ordnance munition.) The first ordnance munition may also collaborate with any number of different types of additional devices, any or all of which may self-correcting their flight paths based on these collaborations.

In some embodiments, the first ordnance munition may be configured to group itself with the wireless transceiver, or otherwise join or form a communications group or coordinated attack group. For example, the first ordnance munition may form a communication group in response to determining that the wireless transceiver is within proximity of the first ordnance munition. The communications group or coordinated attack group may include a plurality of ordnance munitions, each ordnance munition may have a respective flight path and a known target location at a time of launch, and the flight paths for two or more of the ordnance munitions in the plurality of ordnance munitions may altered after the time of launch based on the second location information and/or communications received from one of a central command device or a forward observer device.

In some embodiments, the first ordnance munition may be configured to collaborate with the other devices to alter flight paths of one or more of the ordnance munitions in the plurality of ordnance munitions that are included in a coordinated attack group so that all of the ordnance munitions in the plurality of ordnance munitions travel towards the same target. The first ordnance munition may also collaborate with the other devices to alter flight paths of the ordnance munitions so that they all travel towards different targets. For example, the ordnance munitions collaborate and select their respective targets so that each of the plurality of ordnance munitions strike one of a plurality of different targets within a single area (e.g., within a building or fortified structure, inside a tunnel, an area that is below grade, etc.).

The target locations for the two or more of the ordnance munitions in the plurality of ordnance munitions may or may not be known or available to the ordnance munitions at the time of launch. As such, in some embodiments, the method may include each of the ordnance munitions in the plurality of ordnance munitions determining their target location after the time of launch, and altering their flight paths to strike the determined target location. The ordnance munitions for which the target locations are not known at the time of launch may be configured to determine their respective target locations based on information received from an ordnance munition in the plurality of ordnances that stores the target location at the time of launch, a remote location of a central command, a remote location of a forward observer using a targeting device, and/or an unmanned aerial vehicle (UAV).

In some embodiments, the first ordnance munition and/or the wireless transceiver may be configured to collect and/or relaying video or telemetry data to a command unit device or a local team device. In some embodiments, the first ordnance munition may be configured to use the generated second location information to identify a location of interest (e.g., an area inside a building, an interior portion of a tunnel, a below grade area, etc.). The first ordnance munition may collect reconnaissance information from the identified location of interest and send the collected reconnaissance information to a second ordnance munition and/or other devices in the same coordinated attack group.

In some embodiments, the first ordnance munition may be configured to receive additional location information that identifies a location of the first ordnance munition from the other ordnance munitions in the coordinated attack group. The first ordnance munition may determine whether the information received from the second ordnance munition is valid based on a result of comparing the first location information to the received additional location information and/or a difference between the first location information and the received additional location information exceeds a first threshold value. The first ordnance munition may determine whether the information received from the second ordnance munition is valid based on determination that a confidence value (CV) associated with the received additional location information exceeds a threshold value (e.g., CV=0.80, which exceeds threshold value of 0.78, etc.).

In some embodiments, the first ordnance munition may be configured to receive and synchronize location information and/or telemetry data from a plurality of wireless transceivers to a common time. In some embodiments, the first ordnance munition may be configured to compare the received location information and telemetry data received from each of a plurality of ordnance munitions to the location information and telemetry data from each of the other ordnance munitions in the plurality of ordnance munitions to generate a comparison result. The first ordnance munition may use the generated comparison result to rank the location information received from each of the plurality of ordnance munitions (or the ordnance munitions themselves), and apply the received location information to a Kalman filter based on the rankings to generate the second location information.

In some embodiments, the first ordnance munition may be configured to implement and use sounding techniques to determine a distance value that identifies a distance between the second ordnance munition and the first ordnance munition. As part of these operations, the first ordnance munition may use radio communications to determine a received signal strength indicator (RSSI) value or a time of flight (TOF) value. In some embodiments, the first ordnance munition may be configured to use the determined distance value to determine a confidence value for a location value associated with the second ordnance munition. The first ordnance munition may also use the determined distance value to determine a confidence value for the generated second location information. The confidence value may be a numeric value that indicative of a reliability of the generated second location information. The confidence value may also identify the likelihood that the generated second location information accurately identifies the location of the ordnance munition (e.g., to within one meter, ten meters, hundred meters, etc.). In various embodiments, the communication may be millimeter wave (short range) or involve and optical method in which the radio communication and sounding techniques utilize optical communication which can include lasers or leds arranged on the ordinance munition so that orientation on the ordinance munition does not impede the communication. In some embodiments, the first ordnance munition may be configured to use an optical communication in conjunction with radio communication where the radio communication is used in flight, and when closer to the desired target and optical method is used both for more avoiding detection of electromagnetic based communication.

In some embodiments (e.g., embodiment described above with reference to FIG. 6, etc.), the first ordnance munition may be configured to determine a distance value that identifies a distance between a second ordnance munition and the first ordnance munition by sending a request for position updates to the second ordnance munition. The request for position updates may cause the second ordnance munition to send position information and a time value (that identifies an amount of time between receiving the request for position updates and sending the position information) to the first ordnance munition. The first ordnance munition may determine a total elapse time value that identifies the amount of time, time period or duration between sending the request for position updates and receiving the time value. The first ordnance munition may compute the difference between the received time value from the total elapse time value, and use the computed difference value to determine the distance value.

In some embodiments, the first ordnance munition may include an encryption tag. The first ordnance munition may be configured to use the encryption tag to implement or use authenticated encryption (AE), Authenticated Encryption with Associated Data (AEAD), and/or other encryption techniques to encode, decode, verify and/or authenticate the location information received from the wireless transceiver.

In some embodiments, the first ordnance munition may include an identification system such as an identification friend or foe (IFF) system. An IFF system may be configured to enable military and national (civilian air traffic control) interrogation systems to identify aircraft, vehicles or forces as friendly and to determine their bearing and range from the interrogator. The first ordnance munition may use the IFF system to determine whether the primary target may be classified as friendly, and alter its flight path in response to determining that the primary target may not be classified as friendly. The first ordnance munition may use the IFF system to determine whether a soldier may be classified as active or non-active, and alter its flight path in response to determining that the soldier may (or may not) be classified as active.

Various embodiments include methods of determining a location of an ordnance munition, including receiving, by a processor of the ordnance munition, first location information from a plurality of other devices, using the received first location information to determine an approximate location of the ordnance munition to a first level of accuracy, grouping the ordnance munition with one or more wireless transceivers in proximity to the ordnance munition to form a communication group, sending the determined approximate location to the one or more wireless transceivers in the communication group, receiving second location information from the one or more wireless transceivers in the communication group in response to sending the determined approximate location, and using the received second location information to determine a more precise location of the ordnance munition to a second level of accuracy, in which the second level of accuracy is greater than the first level of accuracy. In an embodiment, using the received first location information to determine the approximate location of the ordnance munition to the first level of accuracy may include determining the approximate location of the ordnance munition based on information received from less than three other devices.

In a further embodiment, using the received first location information to determine the approximate location of the ordnance munition to the first level of accuracy may include using the received first location information to compute a first location value, determining a first confidence value for the first location value, determining whether the first confidence value is greater than or equal to one or more confidence values associated with one or more previously computed location values stored in memory, and selecting the first location value as the approximate location of the ordnance munition in response to determining that the first confidence value is greater than or equal to the one or more confidence values associated with the one or more previously computed location values stored in memory, and selecting a previously computed location value as the approximate location of the ordnance munition in response to determining that the first confidence value is not greater than or equal to the one or more confidence values associated with the one or more previously computed location values stored in memory.

In a further embodiment, using the received first location information to determine the approximate location of the ordnance munition to the first level of accuracy includes using the received first location information to compute a first location value, determining whether the ordnance munition is moving at a rate that is greater than or equal to a movement threshold value, selecting the first location value as the approximate location of the ordnance munition in response to determining that the ordnance munition is not moving at the rate that is greater than or equal to the movement threshold value, and computing an estimated future location value based on the rate and the received first location information, and selecting the computed estimated future location as the approximate location of the ordnance munition in response to determining that the ordnance munition is moving at the rate that is greater than or equal to the movement threshold value.

In a further embodiment, the method may include using information collected from sensors on the ordnance munition to perform sensor fusion operations to generate sensor fusion results, and in which the operations of using the received first location information to determine the approximate location of the ordnance munition to the first level of accuracy and using the received second location information to determine the more precise location of the ordnance munition to the second level of accuracy include determining the approximate location and the more precise location based on the sensor fusion results. In a further embodiment, using the received first location information to determine the approximate location of the ordnance munition to the first level of accuracy includes determining coordinate values, and determining a confidence value for the determined coordinate values.

In a further embodiment, the method may include sending information relating to the determined more precise location of the ordnance munition and the received location information to a server, receiving, on the ordnance munition, updated location information from the server, and re-computing the more precise location of the ordnance munition based on the updated location information received from the server. In a further embodiment, the ordnance munition is connected to a first telecommunication network and the wireless transceiver is connected to a second telecommunication network, and sending the determined approximate location to the one or more wireless transceivers in the communication group includes establishing a near field communication link between the ordnance munition and the wireless transceiver in response to grouping the ordnance munition with the one or more wireless transceivers to form the communication group, and sending the determined approximate location to the wireless transceiver via the established near field communication link.

In a further embodiment, receiving the second location information from the one or more wireless transceivers in the communication group in response to sending the determined approximate location includes receiving sensor information from a first wireless transceiver, and the received sensor information includes information collected from a first sensor in the first wireless transceiver, and a second sensor in a second wireless transceiver that is communicatively coupled to the first wireless transceiver. In a further embodiment, the method may include performing dead reckoning operations to generate a dead reckoning location value, in which using the received first location information to determine the approximate location of the ordnance munition to a first level of accuracy includes determining the approximate location of the ordnance munition based on the dead reckoning location value and the received first location information.

The various aspects include methods of determining a location of an ordnance munition via enhanced location based trilateration, the method including receiving, via a processor of the ordnance munition, location information from one or more external devices, the received location information including a waypoint from each of the one or more external devices, each waypoint including a coordinate value, an altitude value and a range value, the range value identifying a distance from a external device to the ordnance munition, determining the validity of each of the received waypoints, performing normalization operations to normalize the received valid waypoints, assigning an overall ranking to each of the normalized waypoints, assigning an device-specific ranking to each of the normalized waypoints, and storing the normalized waypoints in memory, selecting four waypoints from memory based on a combination of the overall ranking and the device-specific ranking associated with each waypoint, applying the four selected waypoints to a kalman filter to generate a final location waypoint, and using the generated final location waypoint to provide a location based service.

In an embodiment, receiving location information from one or more external devices may include receiving location information from one or more of an ordnance munition, a device having a Cell ID, a WiFi device, a Bluetooth device, an RFID device, a GPS device, a location beacon transmitting device, and external trilateration location information. In a further embodiment, determining the validity of each of the received waypoints may include determining a range value for each waypoint included in the received location information, and determining the validity of each of the received waypoints based on its corresponding range value. In a further embodiment, determining the validity of each of the received waypoints may include determining a confidence value for each waypoint included in the received location information, and determining the validity of each of the received waypoints based on its corresponding confidence value. In a further embodiment, receiving location information from one or more external devices may include establishing communication links to each of a plurality of external devices in a communication group, and receiving location information from only the external devices in the communication group.

In a further embodiment, selecting four waypoints from memory based on a combination of the overall ranking and the device-specific ranking associated with each waypoint may include selecting one of the waypoints included in the received location information and three previously generated waypoints from the memory. In a further embodiment, selecting four waypoints from memory based on a combination of the overall ranking and the device-specific ranking associated with each waypoint may include selecting two of the waypoints included in the received location information and two previously generated waypoints from the memory. In a further embodiment, selecting four waypoints from memory based on a combination of the overall ranking and the device-specific ranking associated with each waypoint may include selecting three of the waypoints included in the received location information and one previously generated waypoints from the memory.

The various aspects include methods of providing a location based service on an ordnance munition, which may include determining whether the first ordnance munition is able to establish a location fix based on information obtained via a geospatial system, collecting location information from a communication group in response to determining the first ordnance munition is unable to establish a location fix, in which the communication group includes at least an ordnance munition, computing a new three-dimensional location fix for the first ordnance munition based on the location information collected from the communication group, the new location information including three-dimensional location and position information, and providing location based service based on the new three-dimensional location fix.

In an aspect, collecting location information from the communication group may include receiving GPS timing information from a second ordnance munition in the communication group. In a further aspect, collecting location information from the communication group may include receiving, by the first ordnance munition, location information from a first member of the communication group that was forwarded to the first member from a second member of the communication group. In a further aspect, collecting location information from the communication group may include receiving, by the first ordnance munition, location information that was forwarded by the first member of the communication group from a device that is outside of the communication group.

In a further aspect, collecting location information may further include collecting three-dimensional location information from a network based location server. In a further aspect, determining whether the first ordnance munition is able to establish a location fix based on information obtained via a geospatial system may include determining whether a fixed infrastructure device (e.g., a cell tower antenna, an eNodeB, a small cell device, a femto cell device, a WiFi access node, a beacon device, etc.) is able to establish a location fix based on information obtained via a geospatial system. In some aspects, the first ordnance munition includes the geospatial system. In other aspects, the first ordnance munition does not include the geospatial system.

In a further aspect, the method may include determining whether information obtained via the geospatial system is accurate, collecting location information from a plurality of devices in the communication group response to determining that the information obtained via the geospatial system is not accurate, computing more precise location information (or a waypoint) based on the collected location information, the more precise location information including three-dimensional information, and using the computed more precise location information to provide the location based service.

In a further aspect, the method may include establishing a first connection to a data network, in which the first connection is not a cellular data uplink transmission path, obtaining location information for a current location of the first ordnance munition via the first connection, determining a variance between the received location information and a locally determined location, determining whether the variance exceeds a threshold value, collecting additional location information from a plurality of transceivers in the communication group in response to determining that the variance exceeds the threshold value, computing more precise location information (or a waypoint) based on the location information collected from the plurality of transceivers, and using the more precise location information to provide the location based service.

In a further aspect, the method may include collecting location information from a plurality of ordnance munitions in a communication group, computing more precise location information (or a waypoint) based on the location information collected from the plurality of ordnance munitions, and using the generated location and position information to provide the location based service, in which computing the more precise location information includes using horizontal data to determine a position relative to the Earth's surface, using vertical data to determine a height of the position relative to sea level, and generating three-dimensional information based on the determined position and the determined height.

The various aspects include methods of performing trilateration for a fixed infrastructure node (FIN) using enhanced location based information, including receiving, via a processor of a FIN device, a plurality of inputs from a plurality of devices (the received plurality of inputs including two or more of a global position system (GPS) data input, a network provided location based service (LBS) data input, an ordnance munition LBS data input, a dead reckoning data input collected during an initial positioning of the FIN, and an external device data input), using the received plurality of inputs to generate an initial positional fix, setting a current waypoint of the FIN based the initial positional fix, using the received plurality of inputs to generate updated location information for the FIN, and updating the current waypoint based on the generated updated location information.

In an aspect, receiving the plurality of inputs from the plurality of devices may include receiving location information from one or more external devices, the received location information may include a waypoint from each of the one or more external devices, each waypoint may include a coordinate value, an altitude value and a range value, and the range value may identify a distance from an external device to the ordnance munition. In a further aspect, the method may include determining the validity of each of the received waypoints, performing normalization operations to normalize the received valid waypoints, assigning an overall ranking to each of the normalized waypoints, assigning a ranking to each of the normalized waypoints, and storing the normalized waypoints in memory. In a further aspect, using the received plurality of inputs to generate updated location information for the FIN may include selecting at least three waypoints from memory based on the ranking associated with each waypoint, and applying the selected waypoints to a kalman filter to generate a final location waypoint.

In a further aspect, the method may include using the current waypoint to provide a location based service. In a further aspect, using the received plurality of inputs to generate the initial positional fix for the FIN includes determining an initial latitude value (X), an initial longitude value (Y), and an initial altitude value (Z). In a further aspect, receiving the plurality of inputs from the plurality of devices may include receiving external device data from at least one passive device. In a further aspect, receiving the plurality of inputs from the plurality of devices may include receiving external device data from at least one active device. In a further aspect, the method may include an initial latitude value (X), an initial longitude value (Y), an initial altitude value (Z), a change in latitude value (ΔX), a change in longitude value (ΔY), a change in altitude value (ΔZ), at least three confidence values (Cx, Cy, Cz), and a time value (Δt). In a further aspect, the method may include generating a Q matrix information structure based on a Kalman filter, generating an R matrix information structure based on the Kalman filter, predicting an updated coordinate value, determining a covariance value, computing Kalman gain with the Kalman filter, and updating the current waypoint based on the Kalman gain.

In a further aspect, the method may include determining a confidence value for each waypoint included in the received plurality of inputs, comparing each determined confidence value to a threshold value, and discarding each input that is associated with a confidence value that does not exceed the threshold value prior to using the received plurality of inputs to generate updated location information for the FIN. In a further aspect, using the received plurality of inputs to generate updated location information for the FIN includes applying waypoints included in the received plurality of inputs to a kalman filter to generate a final location waypoint, and updating the current waypoint based on the generated updated location information includes setting the current waypoint equal to the final location waypoint. In a further aspect, applying waypoints included in the received plurality of inputs to the kalman filter to generate the final location waypoint includes applying at least three waypoints to the kalman filter to generate the final location waypoint.

In a further aspect, receiving the plurality of inputs from the plurality of devices includes receiving at least one waypoint from an ordnance munition that includes time and range information, the method further including sending a request for position information from the FIN device to the ordnance munition, receiving, via the processor, the requested position information and a time value identifying an amount of time between a first time that the ordnance munition received the request and a second time that the ordnance munition began transmission of the position information, determining a total elapse time value, and subtracting the identified amount of time from the total elapse time. In a further aspect, the method may include determining whether new location information is available, estimating a variance value base on an accuracy of the generated updated location information in response to determining that new location information is available, and extrapolating a last known location value and increasing the variance value based on an age of the generated updated location information in response to determining that new location information is not available.

In a further aspect, at least one input in the received plurality of inputs include information for determining an angle of arrival (AOA) value, time of arrival (TOA) value, or observed time difference of arrival (OTDOA) value. In a further aspect, the inputs in the received plurality of inputs include network provided LBS data that includes multiple input multiple output (MIMO) configuration information. In a further aspect, the method may include determining whether information obtained via a geospatial system of the FIN is accurate, collecting location information from a plurality of devices in a communication group in response to determining that the information obtained via the geospatial system is not accurate, computing more precise location information for the FIN based on the location information collected from the plurality of fixed devices, the more precise location information including three-dimensional location information; and using the generated location information to provide a location based service.

In a further aspect, the method may include determining a new position based on initial latitude value (X), longitude value (Y), altitude value (Z), changes in latitude value ($\Delta X$), longitude value ($\Delta Y$), altitude value ($\Delta Z$), confidence values (Cx, Cy, Cz) and a time value $\Delta t$, initializing latitude value, longitude value, altitude value and an initial covariance value, determining whether the latitude value, longitude value, altitude value and an initial covariance value are available for trilateration, computing a Q matrix information structure and an R matrix information structure, predicting latitude values, longitude values and altitude values and covariance values at time equal to k−1, computing Kalman gain with a Kalman filter, and updating the latitude value, longitude value, altitude value and covariance value at time equal to k, in which the Q and R matrix information structures are associated with the Kalman filter.

Various embodiments may include methods of guiding a first ordnance munition that include determining, via a processor of the first ordnance munition, an approximate location of the first ordnance munition and generating first location information based on the determined approximate location, sending the generated first location information to a wireless transceiver in proximity to the first ordnance munition, receiving, in the first ordnance munition, location information from the wireless transceiver, determining, via the processor of the first ordnance munition, a more precise location of the first ordnance munition based on the location information received from the wireless transceiver and generating second location information based on the determined more precise location, and altering a flight path of the first ordnance munition based on the generated second location information. In an embodiment, a first confidence value associated with the first location information is less than a second confidence value associated with the second location information. In a further embodiment, a first precision value associated with the first location information is less than a second precision value associated with the second location information. In a further embodiment, the first ordnance munition is a rocket, mortar or missile.

In a further embodiment, determining the more precise location of the first ordnance munition based on the location information received from the wireless transceiver and generating second location information based on the determined more precise location includes generating location information that corrects for microbursts or wind shear. In a further embodiment, sending the generated first location information to the wireless transceiver in proximity to the first ordnance munition includes sending the generated first location information to a transceiver included in a second ordnance munition. In a further embodiment, altering the flight path of the first ordnance munition based on the second location information includes the first ordnance munition self-correcting its flight path, the method further including the second ordnance munition self-correcting its flight path based on information received from the first ordnance munition. In a further embodiment, the method may include grouping the first ordnance munition with the wireless transceiver to form a coordinated attack group in response to determining that the wireless transceiver is within proximity of the first ordnance munition.

In a further embodiment, the method may include the coordinated attack group includes a plurality of ordnance munitions, and each ordnance munition in the plurality of ordnance munitions has a respective flight path and a known target location at a time of launch, the flight paths for two or more of the ordnance munitions in the plurality of ordnance munitions are altered after the time of launch based on the second location information and communications received from one of a central command device or a forward observer device. In a further embodiment, the method may include the coordinated attack group includes a plurality of ordnance munitions, each of the plurality of ordnance munitions are launched at a time of launch, and target locations for the two or more of the ordnance munitions in the plurality of ordnance munitions are not known at the time of launch, and the method further includes each of the ordnance munitions in the plurality of ordnance munitions determining a new target location after the time of launch, and altering the flight path after launch and in response to determining the new target location.

In a further embodiment, the two or more of the ordnance munitions in the plurality of ordnance munitions for which the target locations are not known at the time of launch may be configured to determine their respective target locations based on information received from an ordnance munition in the plurality of ordnances that stores the target location at the time of launch, a remote location of a central command, a remote location of a forward observer using a targeting device, or an unmanned aerial vehicle (UAV). In a further embodiment, altering a flight path of the first ordnance munition based on the second location information includes guiding the first ordnance munition inside a tunnel, a building, or a below grade location.

Further embodiments may include an ordnance munition that includes a memory, and a processor coupled to the memory, in which the processor may be configured with processor-executable instructions to perform operations that include determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information. In an embodiment, the processor may be configured with processor-executable instructions to perform operations such that determining the more precise location of the first ordnance munition based on the location information received from the wireless transceiver and generating second location information based on the determined more precise location includes generating location information that corrects for microbursts or wind shear.

In a further embodiment, the processor may be configured with processor-executable instructions to perform operations such that sending the generated first location information to the wireless transceiver in proximity to the first ordnance munition includes sending the generated first location information to a transceiver included in a second ordnance munition. In a further embodiment, the processor may be configured with processor-executable instructions to perform operations such that altering the flight path of the first ordnance munition based on the second location information includes the first ordnance munition self-correcting its flight path. In a further embodiment, the processor may be configured with processor-executable instructions to perform operations further including grouping the first ordnance munition with the wireless transceiver to form a coordinated attack group in response to determining that the wireless transceiver is within proximity of the first ordnance munition. In a further embodiment, the processor may be configured with processor-executable instructions to perform operations such that altering a flight path of the first ordnance munition based on the second location information includes guiding the first ordnance munition inside a tunnel, a building, or a below grade location.

Further embodiments include a non-transitory computer readable storage medium having stored thereon processor-executable software instructions configured to cause a processor in an ordnance munition to perform operations that include determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information. In an embodiment, the stored processor-executable instructions may be configured to cause a processor to perform operations such that determining the more precise location of the first ordnance munition based on the location information received from the wireless transceiver and generating second location information based on the determined more precise location includes generating location information that corrects for microbursts or wind shear.

Various embodiments may also include methods of controlling a first ordnance munition that include determining, via a processor of the first ordnance munition, an approximate location of the first ordnance munition, generating, via the processor, first location information based on the determined approximate location, sending the generated first location information to a second ordnance munition in proximity to the first ordnance munition, receiving, in the first ordnance munition, information from the second ordnance munition, determining, via the processor, a more precise location of the first ordnance munition based on the information received from the second ordnance munition and generating second location information based on the determined more precise location, and altering, via the processor, a flight path of the first ordnance munition based on the generated second location information. In an embodiment, the method may include relaying video or telemetry data to a command unit device or a local team device.

In a further embodiment, the method may include using, by the first ordnance munition, the generated second location information to identify a location of interest, in which the identified location of interest includes an area inside a building, an interior portion of a tunnel, or a below grade area, collecting, via the first ordnance munition, reconnaissance information from the identified location of interest, and sending the collected reconnaissance information to a second ordnance munition. In a further embodiment, the method may include receiving additional location information that identifies a location of the first ordnance munition from the second ordnance munition, and determining whether the information received from the second ordnance munition is valid based on a result of comparing the first location information to the received additional location information, a difference between the first location information and the received additional location information exceeds a first threshold value, or a determination that a confidence value associated with the received additional location information exceeds a second threshold value.

In a further embodiment, the method may include in which receiving the information from the second ordnance munition includes receiving location information and telemetry data from a plurality of ordnance munitions, the method further including synchronizing the location information and telemetry data received from the plurality of ordnance munitions to a common time. In a further embodiment, receiving the information from the second ordnance munition includes receiving location information and telemetry data from a plurality of ordnance munitions, the method further including comparing the location information and telemetry data received from each of the plurality of ordnance munitions to the location information and telemetry data from each of the other ordnance munitions in the plurality of ordnance munitions to generate a comparison result, using the generated comparison result to rank the location information received from each of the plurality of ordnance munitions, and applying the received location information to a Kalman filter based on the rankings. In a further embodiment, the method may include using a sounding technique to determine a distance value that identifies a distance between the second ordnance munition and the first ordnance munition. In a further embodiment, using the sounding technique includes using radio communications to determine a received signal strength indicator (RSSI) value or a time of flight (TOF) value.

In a further embodiment, the method may include using the determined distance value to determine a confidence value for the generated second location information, in which the confidence value is a numeric value indicative of a reliability of the generated second location information. In a further embodiment, the method may include using the determined distance value to determine a confidence value for a location value associated with the second ordnance munition, in which the confidence value identifies the likelihood that the location value accurately identifies the location of the second ordnance munition to within one meter.

In a further embodiment, the method may include determining a distance value that identifies a distance between a second ordnance munition and the first ordnance munition by sending a request for position updates to the second ordnance munition, the second ordnance munition sending position information and a time value that identifies an amount of time between receiving the request for position updates and sending the position information, determining a total elapse time value identifying a duration between sending the request for position updates and receiving the time value, and using a difference between the received time value from the total elapse time value to determine the distance value.

Further embodiments may include an ordnance munition that includes a memory and a processor coupled to the memory, in which the processor may be configured with processor-executable instructions to perform operations that include determining an approximate location of the ordnance munition, generating first location information based on the determined approximate location, sending the generated first location information to a second ordnance munition in proximity to the ordnance munition, receiving information from the second ordnance munition, determining a more precise location of the ordnance munition based on the information received from the second ordnance munition and generating second location information based on the determined more precise location, and altering a flight path of the ordnance munition based on the generated second location information. In an embodiment, the processor may be configured with processor-executable instructions to perform operations further including relaying video or telemetry data to a command unit device or a local team device.

In a further embodiment, the processor may be configured with processor-executable instructions to perform operations further including using the generated second location information to identify a location of interest, in which the identified location of interest includes an area inside a building, an interior portion of a tunnel, or a below grade area, collecting reconnaissance information from the identified location of interest, and sending the collected reconnaissance information to a second ordnance munition. In a further embodiment, the processor may be configured with processor-executable instructions to perform operations further including receiving additional location information that identifies a location of the ordnance munition from the second ordnance munition, and determining whether the information received from the second ordnance munition is valid based on a result of comparing the first location information to the received additional location information, a difference between the first location information and the received additional location information exceeds a first threshold value, or a determination that a confidence value associated with the received additional location information exceeds a second threshold value.

In a further embodiment, the processor may be configured with processor-executable instructions to perform operations such that receiving the information from the second ordnance munition includes receiving location information and telemetry data from a plurality of ordnance munitions, and the processor may be configured with processor-executable instructions to perform operations further including synchronizing the location information and telemetry data received from the plurality of ordnance munitions to a common time. In a further embodiment, the processor may be configured with processor-executable instructions to perform operations such that receiving the information from the second ordnance munition includes receiving location information and telemetry data from a plurality of ordnance munitions, the processor may be configured with processor-executable instructions to perform operations further including comparing the location information and telemetry data received from each of the plurality of ordnance munitions to the location information and telemetry data from each of the other ordnance munitions in the plurality of ordnance munitions to generate a comparison result, using the generated comparison result to rank the location information received from each of the plurality of ordnance munitions, and applying the received location information to a Kalman filter based on the rankings.

In a further embodiment, the processor may be configured with processor-executable instructions to perform operations further including using a sounding technique to determine a distance value that identifies a distance between the second ordnance munition and the ordnance munition, in which using the sounding technique includes using radio communications to determine a received signal strength indicator (RSSI) value or a time of flight (TOF) value, and using the determined distance value to determine a first confidence value for the generated second location information, in which the first confidence value is a numeric value indicative of a reliability of the generated second location information. In a further embodiment, the processor may be configured with processor-executable instructions to perform operations further including determining a distance value that identifies a distance between a second ordnance munition and the ordnance munition by sending a request for position updates to the second ordnance munition, the second ordnance munition sending position information and a time value that identifies an amount of time between receiving the request for position updates and sending the position information, determining a total elapse time value identifying a duration between sending the request for position updates and receiving the time value, and using a difference between the received time value from the total elapse time value to determine the distance value.

Further embodiments may include a non-transitory computer readable storage medium having stored thereon processor-executable software instructions configured to cause a processor in an ordnance munition to perform operations including determining an approximate location of the ordnance munition, generating first location information based on the determined approximate location, sending the generated first location information to a second ordnance munition in proximity to the ordnance munition, receiving information from the second ordnance munition, determining a more precise location of the ordnance munition based on the information received from the second ordnance munition and generating second location information based on the determined more precise location, and altering a flight path of the ordnance munition based on the generated second location information.

The various embodiments may also include methods of controlling a first ordnance munition that include determining, via a processor of the first ordnance munition, an approximate location of the first ordnance munition, generating, via the processor, first location information based on the determined approximate location, forming, via the processor, a communication group with a wireless transceiver in proximity to the first ordnance munition, sending the generated first location information to the wireless transceiver, receiving, in the first ordnance munition, information from the wireless transceiver, determining, via the processor, a more precise location of the first ordnance munition based on the information received from the wireless transceiver and generating second location information based on the determined more precise location, and altering, via the processor, a flight path of the first ordnance munition based on the generated second location information. In an embodiment, forming the communication group with the wireless transceiver in proximity to the first ordnance munition includes joining a coordinated attack group that includes a plurality of other ordnance munitions.

In an embodiment, the method may include altering flight paths of one or more of the ordnance munitions in the plurality of ordnance munitions in the communication group so that all of the ordnance munitions in the plurality of ordnance munitions travel towards the same target. In an embodiment, the method may include altering flight paths of one or more of the ordnance munitions in the plurality of ordnance munitions in the communication group so that each of the ordnance munitions in the plurality of ordnance munitions travels towards a different target. In a further embodiment, altering the flight paths of one or more of the ordnance munitions in the plurality of ordnance munitions in the communication group so that each of the ordnance munitions in the plurality of ordnance munitions travels towards a different target area includes altering the flight paths so that the plurality of ordnance munitions strike a plurality of different targets within a single area. In a further embodiment, the plurality of different targets are located inside a building, inside a tunnel, or below grade.

In a further embodiment, the first ordnance munition includes a primary target at the time of launch, and altering the flight path of the first ordnance munition based on the generated second location information includes redirecting the first ordnance munition towards a secondary target. In a further embodiment, the secondary target is not available to the first ordnance munition at launch time. In a further embodiment, determining the more precise location of the first ordnance munition based on the information received from the wireless transceiver and generating second location information based on the determined more precise location includes performing an enhanced location based trilateration operation.

In a further embodiment, performing the enhanced location based trilateration operation includes receiving a waypoint from a plurality of devices, each waypoint including a coordinate value, an altitude value and a range value, the range value identifying a distance from a device to the first ordnance munition, selecting waypoints, and applying the selected waypoints to a kalman filter to generate the second location information. In a further embodiment, selecting the waypoints includes selecting four waypoints that are stored in memory, the method further including performing normalization operations to normalize the received waypoints, assigning an overall ranking to each of the normalized waypoints, assigning a device-specific ranking to each of the normalized waypoints, and storing the normalized waypoints in the memory. In a further embodiment, selecting the waypoints includes selecting current and previous waypoints received from non-stationary devices based on a confidence of the reported waypoints.

In an embodiment, the method may include receiving inputs from one or more external devices that provide location information, the received inputs including one or more of global positing system data, assisted global positing system data, cell identifier data, WiFi identifier data, beacon data, or radio frequency identification data. In a further embodiment, performing the enhanced location based trilateration operation includes receiving first location based information from one or more first external sources, applying the received first location based information to a first Kalman filter to generate a first trilateration position value, generating dead reckoning information with sensors associated with the first ordnance munition, receiving second location based information from one or more second external sources, and applying first trilateration position value, the dead reckoning information and the second location based information to a second Kalman filter to generate the second location information.

Further embodiments may include an ordnance munition that includes a memory and a processor coupled to the memory, in which the processor may be configured with processor-executable instructions to perform operations that include determining an approximate location of the ordnance munition, generating first location information based on the determined approximate location, forming a communication group with a wireless transceiver in proximity to the ordnance munition, sending the generated first location information to the wireless transceiver, receiving information from the wireless transceiver, determining a more precise location of the ordnance munition based on the information received from the wireless transceiver and generating second location information based on the determined more precise location, and altering a flight path of the ordnance munition based on the generated second location information.

In an embodiment, the processor may be configured with processor-executable instructions to perform operations such that forming the communication group with the wireless transceiver in proximity to the ordnance munition includes joining a coordinated attack group that includes a plurality of other ordnance munitions. In a further embodiment, the processor may be configured with processor-executable instructions to perform operations further including altering flight paths of one or more of the ordnance munitions in the plurality of ordnance munitions in the communication group so that all of the ordnance munitions in the plurality of ordnance munitions travel towards the same target. In a further embodiment, the processor may be configured with processor-executable instructions to perform operations further including altering flight paths of one or more of the ordnance munitions in the plurality of ordnance munitions in the communication group so that each of the ordnance munitions in the plurality of ordnance munitions travels towards a different target.

In a further embodiment, the processor may be configured with processor-executable instructions to perform operations such that altering the flight paths of one or more of the ordnance munitions in the plurality of ordnance munitions in the communication group so that each of the ordnance munitions in the plurality of ordnance munitions travels towards a different target area includes altering the flight paths so that the plurality of ordnance munitions strike a plurality of different targets within a single area. In a further embodiment, the processor may be configured with processor-executable instructions to perform operations such that the ordnance munition includes a primary target at the time of launch, and altering the flight path of the ordnance munition based on the generated second location information includes redirecting the ordnance munition towards a secondary target.

In a further embodiment, the processor may be configured with processor-executable instructions to perform operations such that determining the more precise location of the ordnance munition based on the information received from the wireless transceiver and generating second location information based on the determined more precise location includes performing an enhanced location based trilateration operation. In a further embodiment, the processor may be configured with processor-executable instructions to perform operations such that performing the enhanced location based trilateration operation includes receiving a waypoint from a plurality of devices, each waypoint including a coordinate value, an altitude value and a range value, the range value identifying a distance from a device to the ordnance munition, selecting waypoints, and applying the selected waypoints to a kalman filter to generate the second location information.

In a further embodiment, the processor may be configured with processor-executable instructions to perform operations such that selecting the waypoints includes selecting four waypoints that are stored in memory, the method further including performing normalization operations to normalize the received waypoints, assigning an overall ranking to each of the normalized waypoints, assigning a device-specific ranking to each of the normalized waypoints, and storing the normalized waypoints in the memory.

In a further embodiment, the processor may be configured with processor-executable instructions to perform operations such that selecting the waypoints includes selecting current and previous waypoints received from non-stationary devices based on a confidence of the reported waypoints. In a further embodiment, the processor may be configured with processor-executable instructions to perform operations further including receiving inputs from one or more external devices that provide location information, the received inputs including one or more of global positing system data, assisted global positing system data, cell identifier data, WiFi identifier data, beacon data, or radio frequency identification data. In a further embodiment, the processor may be configured with processor-executable instructions to perform operations such that performing the enhanced location based trilateration operation includes receiving first location based information from one or more first external sources, applying the received first location based information to a first Kalman filter to generate a first trilateration position value, generating dead reckoning information with sensors associated with the ordnance munition, receiving second location based information from one or more second external sources, and applying first trilateration position value, the dead reckoning information and the second location based information to a second Kalman filter to generate the second location information.

Further embodiments may include a non-transitory computer readable storage medium having stored thereon processor-executable software instructions configured to cause a processor in an ordnance munition to perform operations that may include determining an approximate location of the ordnance munition, generating first location information based on the determined approximate location, forming a communication group with a wireless transceiver in proximity to the ordnance munition, sending the generated first location information to the wireless transceiver, receiving information from the wireless transceiver, determining a more precise location of the ordnance munition based on the information received from the wireless transceiver and generating second location information based on the determined more precise location, and altering a flight path of the ordnance munition based on the generated second location information.

Further embodiments may include methods of guiding a first ordnance munition that include determining, via a processor of the first ordnance munition, an approximate location of the first ordnance munition, generating, via the processor, first location information based on the determined approximate location, sending the generated first location information to a wireless transceiver, receiving, in the first ordnance munition, information from the wireless transceiver in response to sending the generated first location information, determining, via the processor, a more precise location of the first ordnance munition based on the information received from the wireless transceiver and generating second location information based on the determined more precise location, and altering, via the processor, a flight path of the first ordnance munition based on the generated second location information. In an embodiment, determining the more precise location of the first ordnance munition based on the information received from the wireless transceiver and generating the second location information based on the determined more precise location includes generating a three-dimensional location value.

In a further embodiment, the generated first and second location information each include a latitude value, a longitude value, an altitude value, a velocity value and a relative bearing value. In a further embodiment, sending the generated first location information to the wireless transceiver includes sending the generated first location information to an eNodeB, a long term evolution component, a mobile cloud internet of things device, a narrow band internet of things device, and a long range internet of things device. In a further embodiment, sending the generated first location information to the wireless transceiver includes sending the generated first location information to a component in a fixed private wireless network or in a private shared wireless network. In a further embodiment, sending the generated first location information to the wireless transceiver includes sending the generated first location information to a component in a public wireless network.

In a further embodiment, sending the generated first location information to the wireless transceiver includes sending the generated first location information to a mobile vehicle. In a further embodiment, sending the generated first location information to a mobile vehicle includes sending the generated first location information to an unmanned aerial vehicle, unmanned combat aerial vehicle, drone, unmanned spacecraft, balloon, satellite, unmanned ground vehicle, unmanned surface vehicle suitable for operation on the surface of water, autonomous underwater vehicle, or unmanned undersea vehicle. In a further embodiment, the method may include sending the generated second location information and the information received from the wireless transceiver to a server computing device that is configured to provide enhanced location based services. In a further embodiment, the method may include using internal sensors of the first ordnance munition to generate dead reckoning information in the first ordnance munition, in which determining the more precise location of the first ordnance munition based on the information received from the wireless transceiver and generating the second location information includes determining the more precise location based on the generated dead reckoning information.

Further embodiments may include an ordnance munition that includes a memory and a processor coupled to the memory, in which the processor is configured with processor-executable instructions to perform operations that include determining an approximate location of the ordnance munition, generating first location information based on the determined approximate location, sending the generated first location information to a wireless transceiver, receiving information from the wireless transceiver in response to sending the generated first location information, determining a more precise location of the ordnance munition based on the information received from the wireless transceiver and generating second location information based on the determined more precise location, and altering a flight path of the ordnance munition based on the generated second location information. In an embodiment, the processor is configured with processor-executable instructions to perform operations such that determining the more precise location of the ordnance munition based on the information received from the wireless transceiver and generating the second location information based on the determined more precise location includes generating a three-dimensional location value.

In a further embodiment, the processor is configured with processor-executable instructions to perform operations such that the generated first and second location information each include a latitude value, a longitude value, an altitude value, a velocity value and a relative bearing value. In a further embodiment, the processor is configured with processor-executable instructions to perform operations such that sending the generated first location information to the wireless transceiver includes sending the generated first location information to an eNodeB, a long term evolution component, a mobile cloud internet of things device, a narrow band internet of things device, and a long range internet of things device. In a further embodiment, the processor is configured with processor-executable instructions to perform operations such that sending the generated first location information to the wireless transceiver includes sending the generated first location information to a component in a fixed private wireless network or in a private shared wireless network. In a further embodiment, the processor is configured with processor-executable instructions to perform operations such that sending the generated first location information to the wireless transceiver includes sending the generated first location information to a component in a public wireless network.

In a further embodiment, the processor is configured with processor-executable instructions to perform operations such that sending the generated first location information to the wireless transceiver includes sending the generated first location information to a mobile vehicle. In a further embodiment, the processor is configured with processor-executable instructions to perform operations such that sending the generated first location information to a mobile vehicle includes sending the generated first location information to an unmanned aerial vehicle, unmanned combat aerial vehicle, drone, unmanned spacecraft, balloon, satellite, unmanned ground vehicle, unmanned surface vehicle suitable for operation on the surface of water, autonomous underwater vehicle, or unmanned undersea vehicle. In a further embodiment, the processor is configured with processor-executable instructions to perform operations further including sending the generated second location information and the information received from the wireless transceiver to a server computing device that is configured to provide enhanced location based services. In a further embodiment, the processor is configured with processor-executable instructions to perform operations further including using internal sensors of the ordnance munition to generate dead reckoning information in the ordnance munition, in which determining the more precise location of the ordnance munition based on the information received from the wireless transceiver and generating the second location information includes determining the more precise location based on the generated dead reckoning information.

Further embodiments may include a non-transitory computer readable storage medium having stored thereon processor-executable software instructions configured to cause a processor in an ordnance munition to perform operations that include determining an approximate location of the ordnance munition, generating first location information based on the determined approximate location, sending the generated first location information to a wireless transceiver, receiving information from the wireless transceiver in response to sending the generated first location information, determining a more precise location of the ordnance munition based on the information received from the wireless transceiver and generating second location information based on the determined more precise location, and altering a flight path of the ordnance munition based on the generated second location information.

The various embodiments may also include methods of guiding a first ordnance munition that include determining, via a processor of the first ordnance munition, an approximate location of the first ordnance munition and generating first location information based on the determined approximate location, sending the generated first location information to a wireless transceiver in proximity to the first ordnance munition, receiving, in the first ordnance munition, location information from the wireless transceiver, determining, via the processor of the first ordnance munition, a more precise location of the first ordnance munition based on the location information received from the wireless transceiver and generating second location information based on the determined more precise location, and altering a flight path of the first ordnance munition based on the generated second location information. In an embodiment, the method may include collecting sensor information from internal sensors of the first ordnance munition, the internal sensors including an accelerometer, a gyroscope, a magnetometer or a pressure sensor.

In a further embodiment, determining the approximate location of the first ordnance munition and generating the first location information based on the determined approximate location includes using the collected sensor information to determine the approximate location of the first ordnance munition. In a further embodiment, determining the more precise location of the first ordnance munition based on the location information received from the wireless transceiver and generating the second location information based on the determined more precise location includes using the collected sensor information to determine the more precise location of the first ordnance munition. In a further embodiment, sending the generated first location information to a wireless transceiver in proximity to the first ordnance munition includes sending the generated first location information to a mobile vehicle via an antenna system that is symmetrical over a body of the first ordnance munition.

In a further embodiment, altering the flight path of the first ordnance munition based on the generated second location information includes altering the flight path of the first ordnance munition to a more accurate location of a primary target, or altering the flight path of the first ordnance munition to a new location of a mobile primary target. In a further embodiment, altering the flight path of the first ordnance munition based on the generated second location information includes altering the flight path of the first ordnance munition to a location of a secondary target in response to determining that a primary target is not available.

In a further embodiment, altering the flight path of the first ordnance munition based on the generated second location information includes changing the direction of one or more spoilers on the first ordnance munition. In a further embodiment, sending the generated first location information to the wireless transceiver in proximity to the first ordnance munition includes sending the generated first location information to an unmanned aerial vehicle, the unmanned aerial vehicle guiding a second ordnance munition to a target. In a further embodiment, the first ordnance munition includes an encryption tag, and the method further includes using the encryption tag to implement authenticated encryption and authenticate the location information received from the wireless transceiver.

In a further embodiment, the first ordnance munition includes a primary target and an identification friend or foe (IFF) system. In a further embodiment, the method may include using the IFF system to determine whether the primary target may be classified as friendly, in which altering the flight path of the first ordnance munition based on the generated second location information includes altering the flight path in response to determining that the primary target may not be classified as friendly. In a further embodiment, the method may include using the IFF system to determine whether a soldier may be classified as active or non-active, in which altering the flight path of the first ordnance munition based on the generated second location information includes altering the flight path in response to determining that the soldier may be classified as active. In a further embodiment, altering the flight path of the first ordnance munition based on the generated second location information includes altering the flight path to avoid collateral damage.

Further embodiments include an ordnance munition that includes a memory, and a processor coupled to the memory, in which the processor may be configured with processor-executable instructions to perform operations that include determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information. In an embodiment, the processor may be configured with processor-executable instructions to perform operations further including collecting sensor information from internal sensors of the ordnance munition, the internal sensors including an accelerometer, a gyroscope, a magnetometer or a pressure sensor.

In an embodiment, the processor may be configured with processor-executable instructions to perform operations such that determining the approximate location of the ordnance munition and generating the first location information based on the determined approximate location includes using the collected sensor information to determine the approximate location of the ordnance munition. In a further embodiment, the processor may be configured with processor-executable instructions to perform operations such that determining the more precise location of the ordnance munition based on the location information received from the wireless transceiver and generating the second location information based on the determined more precise location includes using the collected sensor information to determine the more precise location of the ordnance munition.

In a further embodiment, the processor may be configured with processor-executable instructions to perform operations such that sending the generated first location information to a wireless transceiver in proximity to the ordnance munition includes sending the generated first location information to a mobile vehicle via an antenna system that is symmetrical over a body of the ordnance munition. In a further embodiment, the processor may be configured with processor-executable instructions to perform operations such that altering the flight path of the ordnance munition based on the generated second location information includes altering the flight path of the ordnance munition to a more accurate location of a primary target, or altering the flight path of the ordnance munition to a new location of a mobile primary target. In a further embodiment, the processor may be configured with processor-executable instructions to perform operations such that altering the flight path of the ordnance munition based on the generated second location information includes altering the flight path of the ordnance munition to a location of a secondary target in response to determining that a primary target is not available.

In a further embodiment, the processor may be configured with processor-executable instructions to perform operations such that altering the flight path of the ordnance munition based on the generated second location information includes changing the direction of one or more spoilers on the ordnance munition. In a further embodiment, the processor may be configured with processor-executable instructions to perform operations such that sending the generated first location information to the wireless transceiver in proximity to the ordnance munition includes sending the generated first location information to an unmanned aerial vehicle, the unmanned aerial vehicle guiding a second ordnance munition to a target. In a further embodiment, the ordnance munition includes an encryption tag, and the processor may be configured with processor-executable instructions to perform operations further including using the encryption tag to implement authenticated encryption and authenticate the location information received from the wireless transceiver. In a further embodiment, the ordnance munition includes a primary target and an identification friend or foe (IFF) system. In a further embodiment, the processor may be configured with processor-executable instructions to perform operations further including using the IFF system to determine whether the primary target may be classified as friendly, in which altering the flight path of the ordnance munition based on the generated second location information includes altering the flight path in response to determining that the primary target may not be classified as friendly. In a further embodiment, the processor may be configured with processor-executable instructions to perform operations further including using the IFF system to determine whether a soldier may be classified as active or non-active, in which altering the flight path of the ordnance munition based on the generated second location information includes altering the flight path in response to determining that the soldier may be classified as active. In a further embodiment, in which the processor may be configured with processor-executable instructions to perform operations such that altering the flight path of the ordnance munition based on the generated second location information includes altering the flight path to avoid collateral damage.

Further embodiments may include a non-transitory computer readable storage medium having stored thereon processor-executable software instructions configured to cause a processor in an ordnance munition to perform operations including determining an approximate location of the ordnance munition and generating first location information based on the determined approximate location, sending the generated first location information to a wireless transceiver in proximity to the ordnance munition, receiving location information from the wireless transceiver, determining a more precise location of the ordnance munition based on the location information received from the wireless transceiver and generating second location information based on the determined more precise location, and altering a flight path of the ordnance munition based on the generated second location information.

Further embodiments may include an ordnance munition having a processor configured with processor-executable instructions to perform various operations corresponding to any of the methods discussed above. Further embodiments may include an ordnance munition having various means for performing functions corresponding to any of the method operations discussed above. Further embodiments may include a non-transitory processor-readable storage medium having stored thereon processor-executable instructions configured to cause a processor to perform various operations corresponding to any of the method operations discussed above.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile ordnance system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched teleordnance network (PSTN), Wi-Fi Protected Access I & II (WPA, WPA2), Bluetooth®, integrated digital enhanced network (iden), and land mobile radio (LMR). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

A number of different methods, technologies, solutions, and/or techniques (collectively "solutions") are currently available for determining the location of a device, any or all of which may be implemented by, included in, and/or used by the various embodiments. Such solutions include, e.g., global positioning system (GPS) based solutions, assisted GPS (A-GPS) solutions, and cell-based positioning solutions such as cell of origin (COO), time of arrival (TOA), observed time difference of arrival (OTDOA), advanced forward link trilateration (AFLT), and angle of arrival (AOA). In various embodiments, such solutions may be implemented in conjunction with one or more wireless communication technologies and/or networks, including wireless wide area networks (WWANs), wireless local area networks (WLANs), wireless personal area networks (WPANs), and other similar networks or technologies. By way of example, a WWAN may be a Code Division Multiple Access (CDMA) network, a Frequency Division Multiple Access (FDMA) network, an OFDMA network, a 3GPP LTE network, a WiMAX (IEEE 802.16) network, and so on. The WPAN may be a Bluetooth network, an IEEE 802.15x network, and so on. A WLAN may be an IEEE 802.11x network, and so on. A CDMA network may implement one or more radio access technologies (RATs) such as CDMA2000, Wideband-CDMA (W-CDMA), and so on.

When implemented in a 3GPP-LTE network, the various embodiments may include an E-SMLC component configured to send and receive location information (e.g., latitude, longitude, altitude, velocity, etc.) to and from the devices, which may be achieved both on-net and off-net. The location information may be delivered in standard formats, such as those for cell-based or geographical co-ordinates, together with the estimated errors (uncertainty) of the location, position, altitude, and velocity of an ordnance munition and, if available, the positioning method (or the list of the methods) used to obtain the position estimate.

To aid in the determination of the locations of ordnance munitions, 3GPP-LTE networks have standardized several reference signals. Various embodiments may use these reference signals for timing based location and positioning solutions. Such reference signals may include the primary and secondary synchronization signals and the cell specific reference signals.

The term "runtime system" may be used in this application to refer to software and/or hardware resources in an ordnance munition that collectively support the execution of an application program in that ordnance munition. As examples, a runtime system may include all or portions of the ordnance munition's processing resources, operating systems, library modules, schedulers, processes, threads, stacks, counters, and/or other similar components. A runtime system may be responsible for allocating computational resources to an application program, for controlling the allocated resources, and for performing the operations of the application program. The runtime system may execute or perform all or portions of a software application in one or more hardware processing units (e.g., processor, a processing core, etc.) via processes or threads.

An ordnance munition may include a single processor, multiple heterogeneous processors, multiple homogenous processors, multicore processors and/or systems-on-chip. The inclusion of multiple independent cores on a single chip, and the sharing of memory, resources, and power architecture between cores, gives rise to a control, processing, and power management issues not present in distributed multiprocessing systems.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of guiding a first ordnance munition, comprising:
    determining, via a processor of the first ordnance munition, an approximate location of the first ordnance munition and generating first location information based on the determined approximate location;
    sending, via an antenna system that is symmetrical over a body of the first ordnance munition, the generated first location information to a mobile vehicle in proximity to the first ordnance munition;
    receiving, in the first ordnance munition, location information from the mobile vehicle;
    determining, via the processor of the first ordnance munition, a more precise location of the first ordnance munition based on the location information received from the mobile vehicle and generating second location information based on the determined more precise location; and
    altering a flight path of the first ordnance munition based on the generated second location information.

2. The method of claim 1, further comprising collecting sensor information from internal sensors of the first ordnance munition, the internal sensors including an accelerometer, a gyroscope, a magnetometer or a pressure sensor.

3. The method of claim 2, wherein determining the approximate location of the first ordnance munition and generating the first location information based on the determined approximate location comprises using the collected sensor information to determine the approximate location of the first ordnance munition.

4. The method of claim 2, wherein determining the more precise location of the first ordnance munition based on the location information received from the mobile vehicle and generating the second location information based on the determined more precise location comprises using the collected sensor information to determine the more precise location of the first ordnance munition.

5. The method of claim 1, wherein altering the flight path of the first ordnance munition based on the generated second location information comprises:
    altering the flight path of the first ordnance munition to a more accurate location of a primary target; or
    altering the flight path of the first ordnance munition to a new location of a mobile primary target.

6. The method of claim 1, wherein altering the flight path of the first ordnance munition based on the generated second location information comprises altering the flight path of the first ordnance munition to a location of a secondary target in response to determining that a primary target is not available.

7. The method of claim 1, wherein altering the flight path of the first ordnance munition based on the generated second location information comprises changing the direction of one or more spoilers on the first ordnance munition.

8. The method of claim 1, wherein sending the generated first location information to the mobile vehicle in proximity to the first ordnance munition comprises sending the generated first location information to an unmanned aerial vehicle, the unmanned aerial vehicle guiding a second ordnance munition to a target.

9. The method of claim 1, wherein the first ordnance munition includes an encryption tag, the method further comprising:
    using the encryption tag to implement authenticated encryption and authenticate the location information received from the mobile vehicle.

10. The method of claim 1, wherein the first ordnance munition includes a primary target and an identification friend or foe (IFF) system.

11. The method of claim 10, further comprising using the IFF system to determine whether the primary target may be classified as friendly, wherein altering the flight path of the first ordnance munition based on the generated second location information comprises altering the flight path in response to determining that the primary target may not be classified as friendly.

12. The method of claim 10, further comprising using the IFF system to determine whether a soldier may be classified as active or non-active, wherein altering the flight path of the first ordnance munition based on the generated second location information comprises altering the flight path in response to determining that the soldier may be classified as active.

13. The method of claim 1, wherein altering the flight path of the first ordnance munition based on the generated second location information comprises altering the flight path to avoid collateral damage.

14. An ordnance munition, comprising:
    an antenna system that is symmetrical over a body of the ordnance munition;
    a memory; and
    a processor coupled to the antenna system and memory, wherein the processor is configured with processor-executable instructions to perform operations comprising:
        determining an approximate location of the ordnance munition and generating first location information based on the determined approximate location;
        sending, via the antenna system, the generated first location information to a mobile vehicle in proximity to the ordnance munition;
        receiving location information from the mobile vehicle;
        determining a more precise location of the ordnance munition based on the location information received from the mobile vehicle and generating second location information based on the determined more precise location; and
        altering a flight path of the ordnance munition based on the generated second location information.

15. The ordnance munition of claim 14, wherein the processor is configured with processor-executable instructions to perform operations further comprising collecting sensor information from internal sensors of the ordnance munition, the internal sensors including an accelerometer, a gyroscope, a magnetometer or a pressure sensor.

16. The ordnance munition of claim 15, wherein the processor is configured with processor-executable instructions to perform operations such that determining the approximate location of the ordnance munition and generating the first location information based on the determined approximate location comprises using the collected sensor information to determine the approximate location of the ordnance munition.

17. The ordnance munition of claim 15, wherein the processor is configured with processor-executable instructions to perform operations such that determining the more precise location of the ordnance munition based on the location information received from the mobile vehicle and generating the second location information based on the determined more precise location comprises using the collected sensor information to determine the more precise location of the ordnance munition.

18. The ordnance munition of claim 14, wherein the processor is configured with processor-executable instructions to perform operations such that altering the flight path of the ordnance munition based on the generated second location information comprises:
   altering the flight path of the ordnance munition to a more accurate location of a primary target; or
   altering the flight path of the ordnance munition to a new location of a mobile primary target.

19. The ordnance munition of claim 14, wherein the processor is configured with processor-executable instructions to perform operations such that altering the flight path of the ordnance munition based on the generated second location information comprises altering the flight path of the ordnance munition to a location of a secondary target in response to determining that a primary target is not available.

20. The ordnance munition of claim 14, wherein the processor is configured with processor-executable instructions to perform operations such that altering the flight path of the ordnance munition based on the generated second location information comprises changing the direction of one or more spoilers on the ordnance munition.

21. The ordnance munition of claim 14, wherein the processor is configured with processor-executable instructions to perform operations such that sending the generated first location information to the mobile vehicle in proximity to the ordnance munition comprises sending the generated first location information to an unmanned aerial vehicle, the unmanned aerial vehicle guiding a second ordnance munition to a target.

22. The ordnance munition of claim 14, wherein:
   the ordnance munition includes an encryption tag; and
   the processor is configured with processor-executable instructions to perform operations further comprising:
      using the encryption tag to implement authenticated encryption and authenticate the location information received from the mobile vehicle.

23. The ordnance munition of claim 14, wherein the ordnance munition includes a primary target and an identification friend or foe (IFF) system.

24. The ordnance munition of claim 23, wherein the processor is configured with processor-executable instructions to perform operations further comprising using the IFF system to determine whether the primary target may be classified as friendly, wherein altering the flight path of the ordnance munition based on the generated second location information comprises altering the flight path in response to determining that the primary target may not be classified as friendly.

25. The ordnance munition of claim 23, wherein the processor is configured with processor-executable instructions to perform operations further comprising using the IFF system to determine whether a soldier may be classified as active or non-active, wherein altering the flight path of the ordnance munition based on the generated second location information comprises altering the flight path in response to determining that the soldier may be classified as active.

26. The ordnance munition of claim 14, wherein the processor is configured with processor-executable instructions to perform operations such that altering the flight path of the ordnance munition based on the generated second location information comprises altering the flight path to avoid collateral damage.

27. A non-transitory computer readable storage medium having stored thereon processor-executable software instructions configured to cause a processor in an ordnance munition to perform operations comprising:
   determining an approximate location of the ordnance munition and generating first location information based on the determined approximate location;
   sending, via an antenna system that is symmetrical over a body of the first ordnance munition, the generated first location information to a mobile vehicle in proximity to the ordnance munition;
   receiving location information from the mobile vehicle;
   determining a more precise location of the ordnance munition based on the location information received from the mobile vehicle and generating second location information based on the determined more precise location; and
   altering a flight path of the ordnance munition based on the generated second location information.

* * * * *